(12) United States Patent
Smith et al.

(10) Patent No.: US 11,687,328 B2
(45) Date of Patent: Jun. 27, 2023

(54) METHOD AND SYSTEM FOR SOFTWARE ENHANCEMENT AND MANAGEMENT

(71) Applicant: C Squared IP Holdings LLC, Scottsdale, AZ (US)

(72) Inventors: Scott Andrew Smith, Ocala, FL (US); Christopher Graham Smith, Aurora, CO (US); Kevin David Howard, Mesa, AZ (US)

(73) Assignee: C SQUARED IP HOLDINGS LLC, Scottsdale, AZ (US)

( * ) Notice: Subject to any disclaimer, the term of this patent is extended or adjusted under 35 U.S.C. 154(b) by 0 days.

(21) Appl. No.: 17/887,402

(22) Filed: Aug. 12, 2022

(65) Prior Publication Data
US 2023/0051527 A1 Feb. 16, 2023

Related U.S. Application Data

(60) Provisional application No. 63/232,576, filed on Aug. 12, 2021.

(51) Int. Cl.
*G06F 8/41* (2018.01)
*G06F 9/455* (2018.01)

(52) U.S. Cl.
CPC .......... *G06F 8/4441* (2013.01); *G06F 8/4434* (2013.01); *G06F 8/45* (2013.01); *G06F 9/455* (2013.01)

(58) Field of Classification Search
CPC ........ G06F 8/4441; G06F 8/4434; G06F 8/45; G06F 9/455
See application file for complete search history.

(56) References Cited

U.S. PATENT DOCUMENTS

| | | |
|---|---|---|
| 5,812,987 A | 9/1998 | Luskin et al. |
| 6,857,004 B1 | 2/2005 | Howard et al. |
| 7,133,950 B2 | 11/2006 | Olukotun |
| 7,418,470 B2 | 8/2008 | Howard et al. |
| 7,426,488 B1 | 9/2008 | Gompers et al. |
| 7,730,121 B2 | 6/2010 | Howard et al. |
| 7,941,479 B2 | 5/2011 | Howard et al. |

(Continued)

FOREIGN PATENT DOCUMENTS

| | | |
|---|---|---|
| WO | 2001001219 A2 | 1/2001 |
| WO | 2003060748 A2 | 7/2003 |

(Continued)

*Primary Examiner* — Wei Y Zhen
*Assistant Examiner* — Amir Soltanzadeh
(74) *Attorney, Agent, or Firm* — Skaar Ulbrich Macari, P.A.

(57) ABSTRACT

A software enhancement and management system (E&M System) can include two ways to decompose existing software such that new functionality can be added: functional decomposition and time-affecting linear pathway (TALP) decomposition. Functional decomposition captures the inputs and outputs of the existing software's functions and attaches the new algorithmic constructs presented as other functions that receive the outputs of the existing software's functions. TALP decomposition allows for the generation of time-prediction polynomials that approximate time-complexity functions, speedup, and automatic dynamic loop-unrolling-based parallelization for each TALP.

20 Claims, 47 Drawing Sheets

(56) References Cited

U.S. PATENT DOCUMENTS

| | | |
|---|---|---|
| 7,958,194 B2 | 6/2011 | Howard |
| 8,108,512 B2 | 1/2012 | Howard et al. |
| 8,325,761 B2 | 12/2012 | Howard et al. |
| 8,386,356 B2 | 2/2013 | Saccone |
| 8,499,025 B2 | 7/2013 | Howard |
| 8,762,946 B2 | 6/2014 | Howard |
| 8,843,879 B2 | 9/2014 | Howard |
| 8,949,796 B2 | 2/2015 | Howard |
| 8,959,494 B2 | 2/2015 | Howard |
| 9,098,638 B2 | 8/2015 | Howard |
| 9,146,709 B2 | 9/2015 | Howard |
| 9,158,502 B2 | 10/2015 | Howard |
| 9,170,909 B2 | 10/2015 | Howard |
| 9,229,688 B2 | 1/2016 | Howard |
| 9,280,320 B2 | 3/2016 | Howard |
| 9,292,263 B2 | 3/2016 | Howard |
| 9,324,126 B2 | 4/2016 | Howard |
| 9,335,974 B2 | 5/2016 | Howard |
| 9,395,954 B2 | 7/2016 | Howard |
| 9,424,168 B2 | 8/2016 | Howard |
| 9,626,329 B2 | 4/2017 | Howard |
| 9,747,080 B2 | 8/2017 | Howard |
| 9,851,949 B2 | 12/2017 | Howard |
| 9,977,655 B2 | 5/2018 | Howard |
| 10,009,168 B2 | 6/2018 | Howard |
| 10,148,425 B2 | 12/2018 | Howard |
| 10,216,692 B2 | 2/2019 | Howard |
| 10,496,514 B2 | 12/2019 | Howard |
| 10,943,299 B2 | 3/2021 | Byun |
| 2005/0256793 A1 | 11/2005 | Hamilton et al. |
| 2007/0100743 A1 | 5/2007 | Barge et al. |
| 2007/0168270 A1 | 7/2007 | De Diego Arozamena et al. |
| 2008/0228663 A1 | 9/2008 | Smith |
| 2010/0251259 A1 | 9/2010 | Howard |
| 2011/0029457 A1 | 2/2011 | Axelrad et al. |
| 2012/0036399 A1 | 2/2012 | Howard |
| 2012/0101929 A1 | 4/2012 | Howard |
| 2013/0325750 A1 | 12/2013 | Howard |
| 2013/0325860 A1 | 12/2013 | Howard |
| 2013/0332903 A1 | 12/2013 | Howard |
| 2014/0025430 A1 | 1/2014 | Howard |
| 2014/0068464 A1 | 3/2014 | Howard et al. |
| 2014/0198196 A1 | 7/2014 | Howard et al. |
| 2014/0298286 A1 | 10/2014 | Howard |
| 2014/0310678 A1 | 10/2014 | Howard |
| 2014/0310680 A1 | 10/2014 | Howard |
| 2015/0149535 A1 | 5/2015 | Howard |
| 2017/0052960 A1* | 2/2017 | Alizadeh-Shabdiz ....................... G06F 16/285 |
| 2018/0101910 A1 | 4/2018 | Smith et al. |
| 2019/0370308 A1 | 12/2019 | Riggs et al. |
| 2020/0097951 A1 | 3/2020 | Abramson et al. |
| 2020/0151682 A1 | 5/2020 | Hurry et al. |
| 2020/0210162 A1* | 7/2020 | Howard ............ G06F 16/24558 |
| 2020/0242268 A1* | 7/2020 | Epasto .................... G06N 5/04 |
| 2020/0342539 A1* | 10/2020 | Doney ................ G06Q 20/389 |
| 2021/0019158 A1 | 1/2021 | Howard |
| 2021/0064639 A1* | 3/2021 | Wang ................... G06F 16/285 |
| 2021/0142143 A1 | 5/2021 | Howard |
| 2021/0397703 A1* | 12/2021 | Stocks ................... G06F 21/53 |
| 2022/0076346 A1 | 3/2022 | Smith et al. |

FOREIGN PATENT DOCUMENTS

| | | |
|---|---|---|
| WO | 2005111843 A2 | 11/2005 |
| WO | 2012021523 A2 | 2/2012 |
| WO | 2012024435 A2 | 2/2012 |
| WO | 2013036824 A2 | 3/2013 |
| WO | 2013184952 A1 | 12/2013 |

* cited by examiner

| | Parallel Flag | List of Processing Elements | Number of Cores | Economic Conditions | Processors | Servers |
|---|---|---|---|---|---|---|
| Parallel Information | | | | | | |
| Merge Data | Merge Flag | | | List of rRAVs | | |
| Proposed Fund Structure | Percentage of Cash Flow to GPs | Percentage of Asset Sale to GPs | List of Prioritized Units Per Fund | Prioritized Unit Data | | |
| Acceptance Criteria | Asset Type | Asset Type Quarterly Risk Max | Asset Type Quarterly Cash Flow Min | Asset Type Start Date | Asset Type Maturity Date | ... |

System Operator (General Partner Screen)

FIG. 17

METHOD AND SYSTEM FOR SOFTWARE ENHANCEMENT AND MANAGEMENT

RELATED APPLICATIONS

This application claims priority to and the benefit of U.S. Provisional Patent Application No. 63/232,576, filed Aug. 12, 2021, which is fully incorporated herein by reference in its entirety.

BACKGROUND

There exist many software products that analyze streams of input data and generate predictive outcomes or take user requests and analyze data for patterns. Examples include disease-spreading analysis systems like Airfinity's Cardio Metabolic & Vascular™ product, traffic analysis software like the TRANSOFT SOLUTIONS Vehicle Turn Simulation™ product, and investment analysis and fund or portfolio management systems like multiple products from IBM's MorningStar™.

Technology is a major part of the United States economy, with software playing a major role. By 2020, software alone accounted for $933 billion dollars of the US technology economy's $1.9 trillion dollars, which is 49%. The domination of software in technology will likely continue for the foreseeable future as almost every US company generates and uses software. Consider that in 2022, the average software engineer earns $127,342 per year, with an expected shortfall of 1.2 million software engineers by 2026. This means organizations will need to use non-software engineering personnel to meet their software creation, update, and repair needs. This, in turn, implies a need for new software tools and management techniques to automatically extend existing software functionality using new algorithmic solutions without sacrificing processing performance.

SUMMARY OF THE INVENTION

The present invention comprises a software enhancement and management system (E&M System) including two ways to decompose existing software such that new functionality can be added: traditional functional decomposition and time-affecting linear pathway (TALP) decomposition. Functional decomposition captures the inputs and outputs of the existing software's functions and attaches the new algorithmic constructs presented as other functions that receive the outputs of the existing software's functions. TALP decomposition allows for the generation of time-prediction polynomials that approximate time-complexity functions, space-complexity polynomials that approximate the data transformation functions, advanced speedup and automatic dynamic loop-unrolling-based parallelization for each TALP. This technology uses the approximated time-complexity and space-complexity functions to join the outputs of existing processes to the inputs of the TALPs, enhancing the functionality of the existing application.

To increase deployment flexibility, some or all of the methods of this invention need to be able to access an existing software's inputs and outputs or alternatively be able to automatically be embedded within the source code of existing software.

Various systems and methods of the present invention comprise inputting software application source codes; decomposing the one or more software application source codes of a set of software applications into sets of TALPs, each associated with input variable attribute value ranges and timings; selecting TALPS based on acceptance criteria comprising of input and output value ranges and timings; constructing time and space complexity for each TALP using value ranges; optionally parallelizing each TALP using time complexity; modeling outcomes with actual expected input data values using space and time complexity for each TALP; and defining optimum TALP groupings for solution sets.

Various systems and methods of the present invention comprise the functional decomposition of both the existing system software and the enhancement software into functions, which are then linked using the outputs of the existing system functions as the inputs to the enhancement software functions.

Various systems and methods of the present invention comprise the decomposition of both existing software source codes and the enhancement software codes into TALPs that become merged TALPs. The input value ranges of the decomposed TALPs are then used to approximate the processing times and advanced speedup of the TALPs. The advanced speedup can then be used in the parallelization of these merged TALPs.

The software enhancement and management system of the present invention can be used in multiple commercial activities to enhance and manage the software applications used in these commercial activities, including those used in laboratory data analysis, general corporate applications, no-code low-code software development applications, and financial management systems.

Nowhere is US software dominance more critical to maintaining trade advantages than in financial systems. Rather than merely adding particular algorithms or new data structures to such systems, the present invention as a software E&M System will instead automatically modify existing software to be able to service new markets, decrease error margins (called risk in financial systems), and automatically control system performance with or without using dynamic parallel processing techniques. There are two primary methods used to automatically modify existing codes: traditional functional decomposition within the wrapper model and TALP decomposition within the merged TALP model.

Particular embodiments of the present invention are directed to diminishing the probability that the output of an enhancement to the existing system will lie outside of an acceptable error margin. This is accomplished using a TALP's maximum error generation component as shown in U.S. Patent Publication No. 2020/0210162 (Computer Processing and Outcome Prediction Systems and Methods). If the existing software in question is financial software, then this would translate into decreased financial risk. Other particular embodiments of the present invention are directed to increasing some output value. If the existing software in question is financial software, then this could translate into increased financial returns.

The above and other aspects of the embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and enable a person skilled in the pertinent art to make and use the embodiments disclosed herein. In the drawings, like reference numbers indicate identical or functionally similar elements.

FIG. 17 shows an example of the input data from the system operator, in accordance with embodiments of the present invention.

DETAILED DESCRIPTION OF PREFERRED EMBODIMENTS

Figure 1:
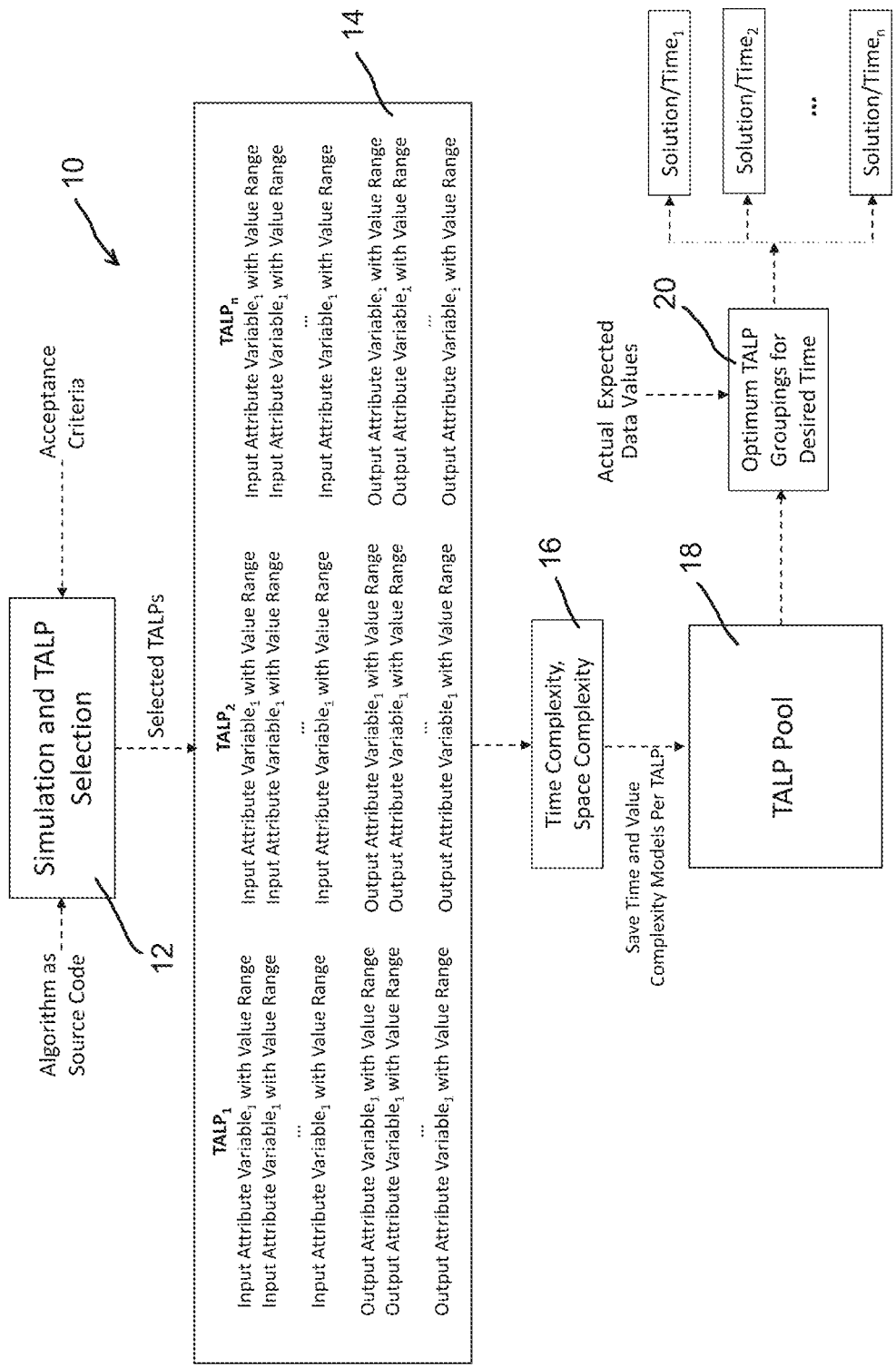
FIG. 1 is a diagram of the primary processes of a general software E&M system and method that meets certain value and/or timing goals using multiple TALPs, in accordance with embodiments of the present invention.

The present invention has the ability to meet some value and/or timing goals using multiple time-affecting linear pathways (TALPs). Various embodiments can comprise a software enhancement and management system (E&M System) describing two ways to decompose existing software such that new functionality can be added: traditional functional decomposition and TALP decomposition. Functional decomposition captures the inputs and outputs of the existing software's functions and attaches the new algorithmic constructs presented as other functions that receive the outputs of the existing software's functions. U.S. Patent Publication No. 2020/0210162 (Computer Processing and Outcome Prediction Systems and Methods) describes TALP decomposition, which allows for the generation of time-prediction polynomials that approximate time-complexity functions, advanced speedup and automatic dynamic loop-unrolling-based parallelization for each TALP. This technology uses the approximated time-complexity and space-complexity functions to join the outputs of existing processes to the inputs of the TALPs, enhancing the functionality of the existing application, as disclosed in U.S. Provisional Patent Application 63/328,115. Per these aforementioned patent references, to be useful these techniques are combined with various error boundary management and modeling techniques to allow existing systems to be automatically upgraded. The patent application references and disclosures cited in this paragraph, and elsewhere herein, are hereby fully incorporated herein by reference.

A TALP is an execution pathway through an algorithm or software code which includes looping structures. TALPs allow for the direct and automatic selection of a pathway through an algorithm or software code via the examination of the values of input non-loop-control variable attributes. Time prediction for TALPs occurs through varying the input loop control variable attributes and generating a time prediction polynomial. This means that examining the values of input loop control variable attributes is enough to know the processing time of a TALP.

The output value prediction of a TALP occurs through varying the attribute domain of the input variable attributes that affect output values forming an output prediction polynomial. This means that it is possible to know the output values of a TALP through the examination of the input variables. In order to generate the various polynomials used by a TALP, the separate input variable attributes contributions time or output are automatically generated. Thus, the optimization of software codes, including the elimination of control statements and the identification and manipulation of key variables for either time or output values, can be automatically performed using TALPs and their associated analytical tools. Since processing time for a TALP can be manipulated through changes in input variable attribute values, automatic strong parallelization can be performed using TALPs.

Work for a computer algorithm executing on a particular piece of computer hardware is the amount of processing time the algorithm's execution requires. Since a TALP automatically determines the effect of changing input variable attributes on processing time, it is possible to decompose the input variable attribute values into a set of parallel attributes simultaneously executing on multiple TALPs, with the total processing time being the processing time of any of the parallel executing TALPs plus any time required to agglomerate the values for the final answer. In addition, TALPs make it possible to automatically identify when cross-communication between the multiple simultaneously executing TALPs must take place along with what kind of cross communication must be used. Thus, the ability to detect when parallel processing will yield a significant decrease in processing time can be automatically detected and the automatic parallelization of the code performed, using TALPs.

To increase deployment flexibility of the E&M System, some or all of the systems and methods of the present invention need to be able to access, as a non-embedded system, an existing software's inputs and outputs without changing the source code of that existing software. Alternatively, the systems and methods are able to be automatically embedded within the source code of existing software.

The non-embedded E&M System enhances existing software systems using the traditional wrapper model that automatically performs functional decomposition on the existing software system to obtain the inputs and outputs of its component functions. It then connects the inputs and outputs of these functions to those of functions that are generated outside of the existing system, extending the functionality of the existing software system.

The embedded E&M System enhances existing software systems using the merged TALP model, which first decomposes the existing software system into TALPs. The functions used to extend the functionality of the existing software system are also decomposed into TALPs. The output of existing software TALPs are linked to the inputs of the functionality extension TALPs, creating a new set of linked TALPs with extended capability.

Embodiments of the present invention convert an existing system software application into TALPs and automatically generate a time prediction polynomial which approximates the time complexity function, and thus advanced speedup, of an existing software system's TALPs. Once the performance is determined, the existing software system's code automatically parallelizes the TALPs using dynamic loop unrolling, which matches the input dataset with the number of processing elements required to meet some performance goal. The outputs associated with the existing software system are used as the inputs to a set of enhancement TALPs, linking them together. A time-prediction polynomial approximating a time complexity function and advanced speedup are then created for each linked TALP. Dynamic loop unrolling uses advanced speedup to link the input variable attributes to the number of loop iterations, which allows for automatic parallelization.

Various devices or computing systems can be included and adapted to process and carry out the aspects, computations, and algorithmic processing of the software systems and methods of the present invention. Computing systems, devices, or appliances of the present invention may include a computer system, which may include one or more microprocessors, one or more processing cores, and/or one or more circuits, such as an application-specific integrated circuit (ASIC), field-programmable gate arrays (FPGAs), graphics processing units (GPU), general purpose graphics processing units (GPGPU), etc. Any such device or computing system is defined as a processing element herein. A server or cloud processing system for use by or connected with the systems of the present invention may include a processor, which may include one or more processing elements. Further, the devices can include a network interface or a bus system in cases where the processing elements are within the same chip. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the devices include a microprocessor, computer-readable program code may be stored in a computer-readable medium or memory, such as but not limited to magnetic media (e.g., a hard disk), optical media (e.g., an OVO), memory devices (e.g., random access memory, flash memory), etc. The computer program or software code can be stored on a tangible, or non-transitive, machine-readable medium or memory. In some embodiments, computer-readable program code is configured such that when executed by a processing element, the code causes the device to perform the steps described above and herein. In other embodiments, the device is configured to perform steps described herein without the need for code.

It will be recognized by one skilled in the art that these operations, algorithms, logic, method steps, routines, subroutines, components, and modules may be implemented in software, in firmware, in special purpose digital logic, and any combination thereof without deviating from the spirit and scope of the present invention as recited within the claims attached hereto.

The devices, appliances, or computing devices may include an input device. The input device is configured to receive an input from either a user (e.g., admin, user, etc.) or a hardware or software component as disclosed herein in connection with the various user interface or automatic data inputs. Examples of an input device include data ports, keyboards, a mouse, a microphone, scanners, sensors, touch screens, game controllers, and software enabling interaction with a touch screen, etc. The devices can also include an output device. Examples of output devices include monitors, televisions, mobile device screens, tablet screens, speakers, remote screens, screen less 3D displays, data ports, HUDs, etc. An output device can be configured to display images, media files, text, or video, or play audio to a user through speaker output.

The term communication network includes one or more networks such as a data network, wireless network, a telephony network, or any combination thereof. It is contemplated that the data network may be any local area network (LAN), metropolitan area network (MAN), wide area network (WAN), the internet, cloud computing platform, or any other suitable packet-switched network, such as a commercially owned, proprietary packet-switched network, e.g., a proprietary cable or fiber-optic network. In addition, the wireless network may be, for example, a cellular network and may employ various technologies including global system for mobile communications (GSM), internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WIFI), satellite, mobile ad-hoc network (MANET), and the like.

FIG. 1 shows a general process, system, and method 10 that meets certain value and/or timing goals using multiple TALPs, in accordance with embodiments of the present invention. The general process and workflow is configured to reach an output variable value and/or processing timing goal. To accomplish goal matching, the system and method 10 first receives one or more algorithms in source code form and decomposes those algorithms into TALPs with input and output attribute value ranges at block 12. If a TALP meets the targeted acceptance criteria in terms of a range of certain input variables, then the TALP is gathered with other TALPs for further processing at block 14. Using the associated value ranges, the time and space complexity function estimation polynomials are generated for each TALP at block 16. The TALPs plus the time and space complexity estimation polynomials are saved in a pool of TALPs at block 18.

Input data variable values are discretized and spread over multiple TALPs such that a specific goal is reached at block 20, whether that goal is timing, output variable values or a combination of both. If a goal cannot be reached, then the multi-TALP configuration that comes closest to the goal is used. This is called optimum (for some goal) TALP time/value generation.

The acceptance criteria can contain one or more of the following: 1) acceptable range of input variable values, 2) acceptable range of output variable values, and 3) acceptable projected timing values from the time complexity of a TALP. This can function to gather some or all software codes used by an organization or entity for which there is source code. Software codes for which increased performance would benefit the organization are selected and the organization-beneficial software codes that can be decomposed into TALPs are selected.

Figure 1A:
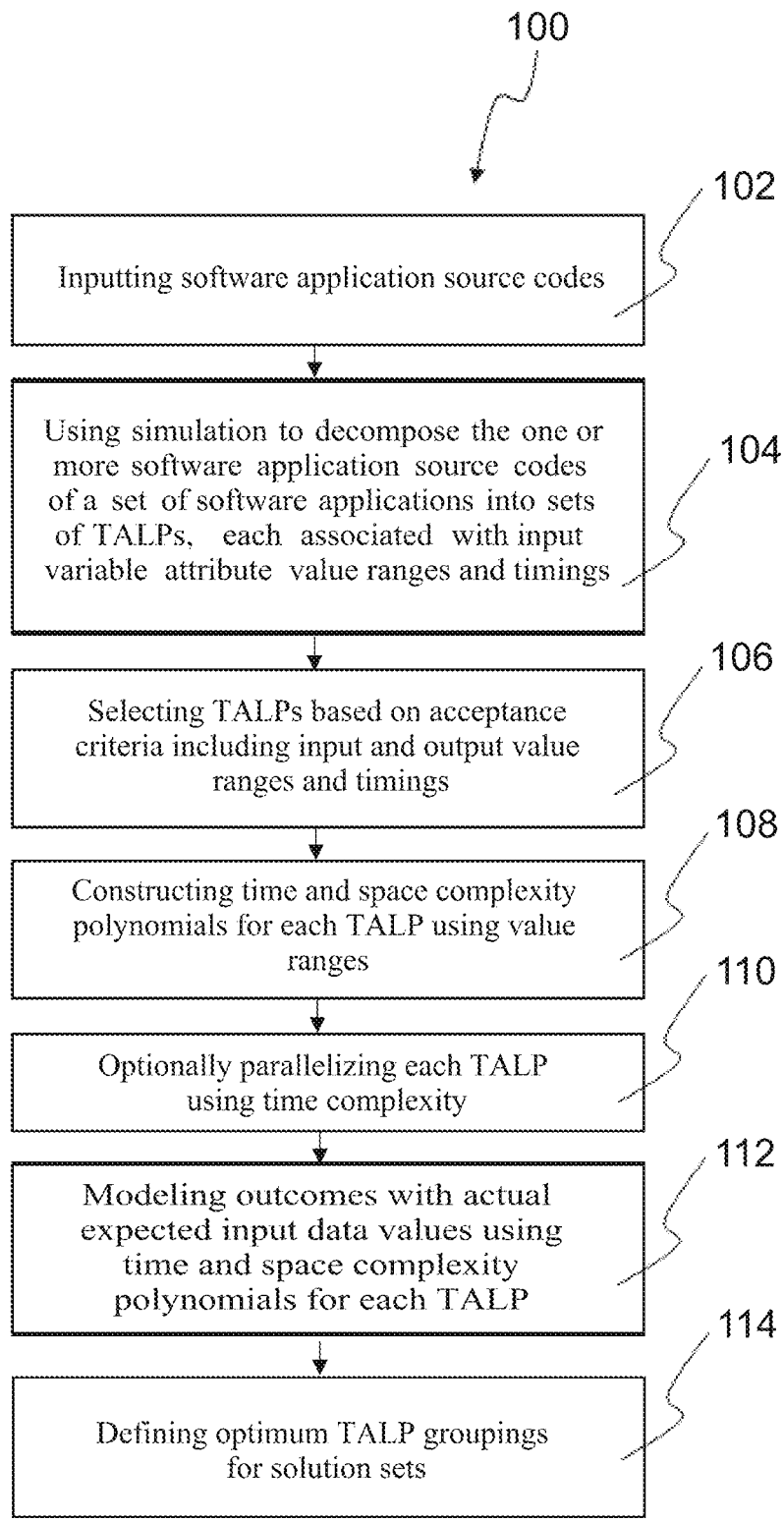
FIG. 1A is a flow diagram of a general software E&M system and method, in accordance with embodiments of the present invention.

Referring to FIG. 1A, with this and other concepts, systems, and methods of the present invention, a method 100 comprises inputting software application source codes 102; using simulation to decompose the one or more software application source codes of a set of software applications into sets of TALPs, each associated with input variable attribute value ranges and timings 104; selecting TALPs based on acceptance criteria comprising input and output value ranges and timings 106; constructing time and space complexity polynomials for each TALP using value ranges 108; optionally parallelizing each TALP using time complexity 110; modeling outcomes with actual expected input data values using time and space complexity polynomials for each TALP 112; and defining optimum TALP groupings for solution sets 114.

Figure 2:
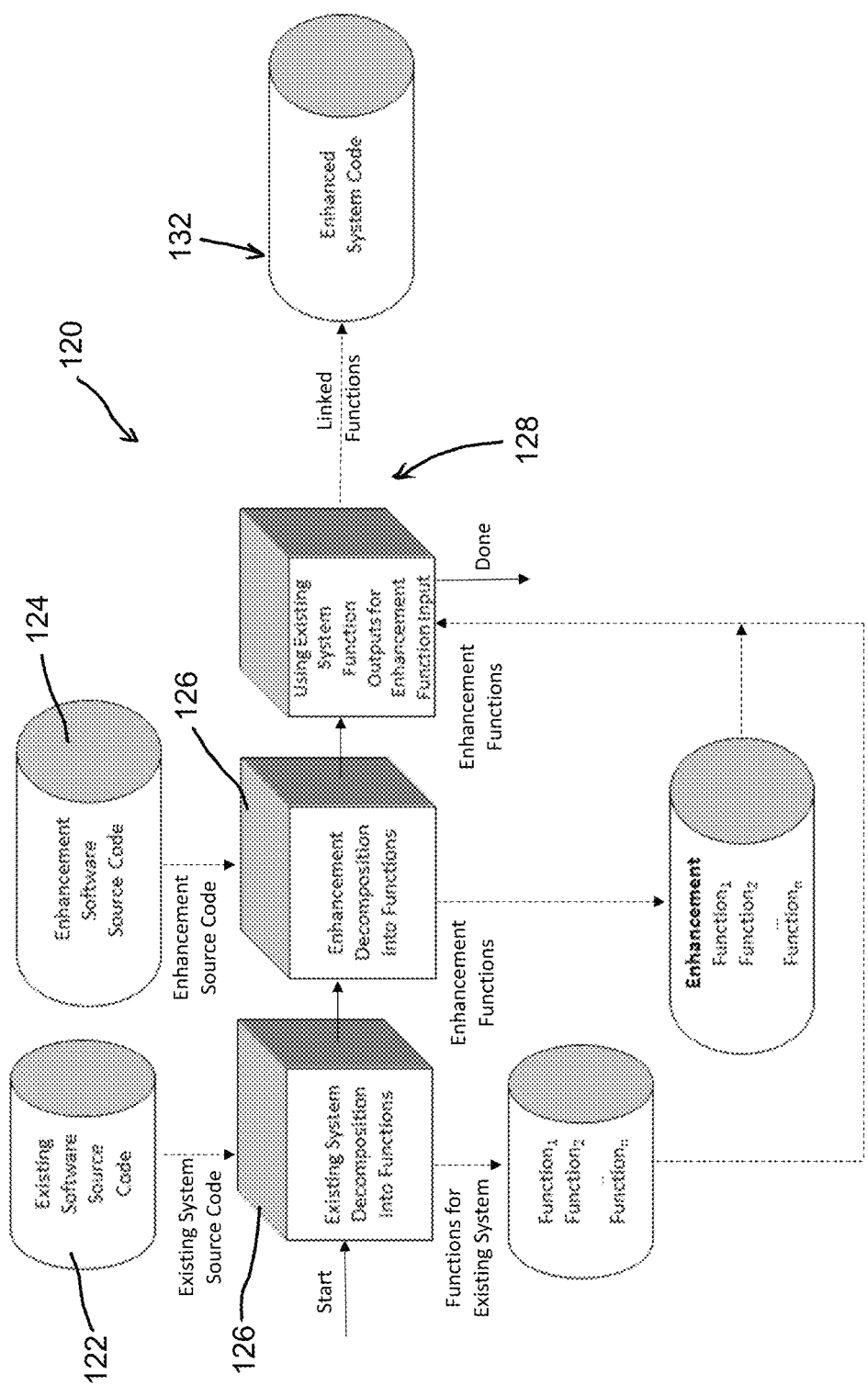
FIG. 2 is a diagram showing the functional decomposition of both existing system software and enhancement software into function, which are then merged using the outputs of the existing system functions as the inputs to the enhancement software functions, in accordance with embodiments of the present invention.

Referring to FIG. 2, a software system and method of functional decomposition 120 of both the existing system source code 122 and the enhancement source code 124 is provided. The decomposed functions 126 are then linked 128 using the outputs of the existing system functions as the inputs to the enhancement software functions 130. This linking represents a wrapper functionality 132 that enhances existing software and extends its functionality without changing the source code of the original software code 122.

Figure 3:
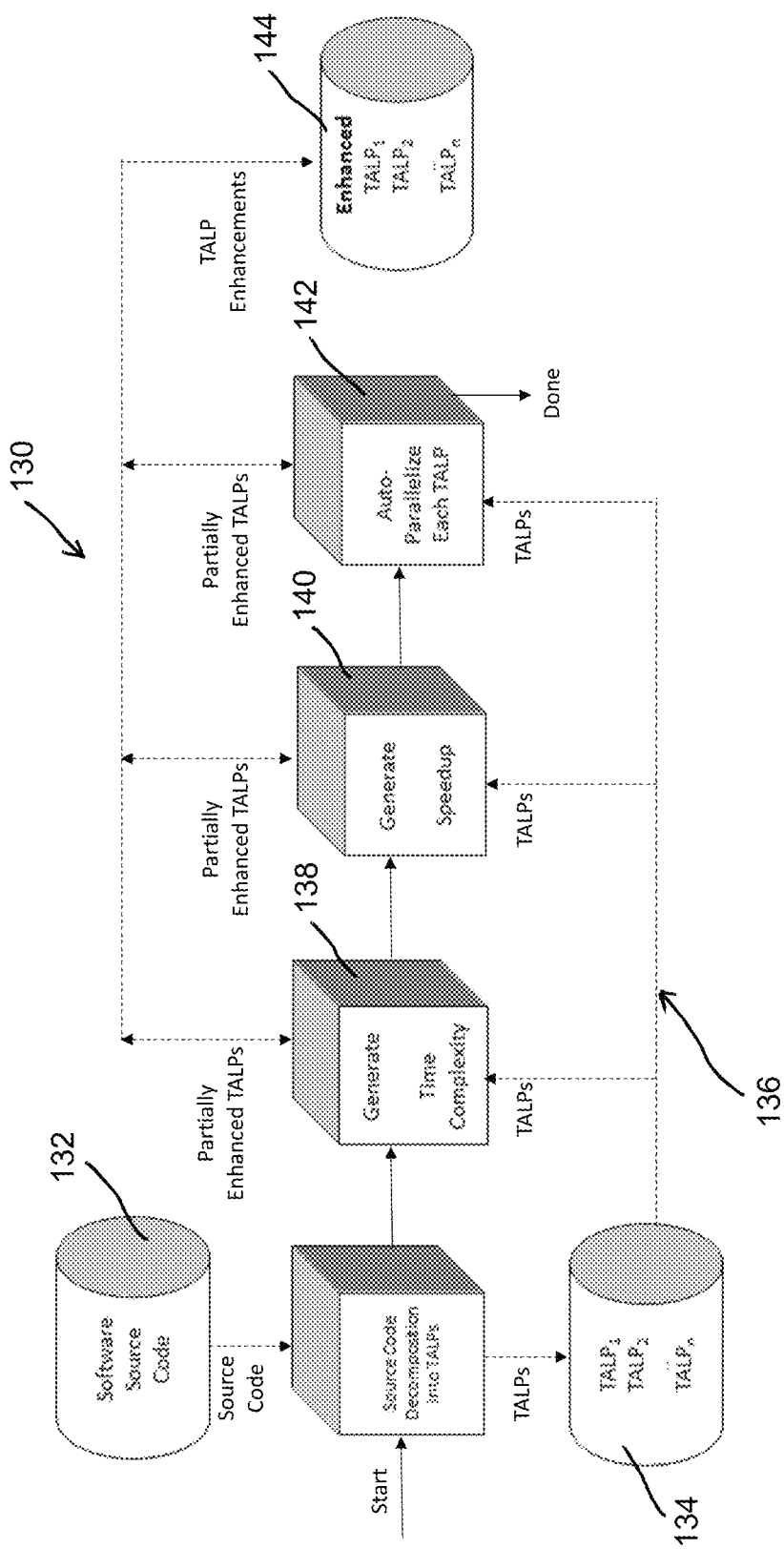
FIG. 3 is a diagram showing the decomposition of both existing software source codes and the enhancement software codes into TALPs that become merged TALPs. The input value ranges of the decomposed TALPs are then used to approximate the processing times and advanced speedup of the TALPs. The advanced speedup can then be used in the parallelization of these merged TALPs.

Referring to FIG. 3, a software system and method 130 is provided for the decomposition of both existing software source code 132 and the enhancement software code into TALPs 134. The system links or merges the outputs of TALPs 136 from the existing software with the inputs of the TALPs of the enhancement software. TALP linking or merging occurs at the code block level, meaning that the source code is changed by the addition of code blocks along an execution path. Once merged, time complexity 138 and advanced speedup 140 can be determined for each merged TALP, as referenced in the venture control component herein. The advanced speedup 140 is used in the parallelization 142 of these merged TALPs. TALP enhancements 144 are thereby created or generated.

Figure 4:
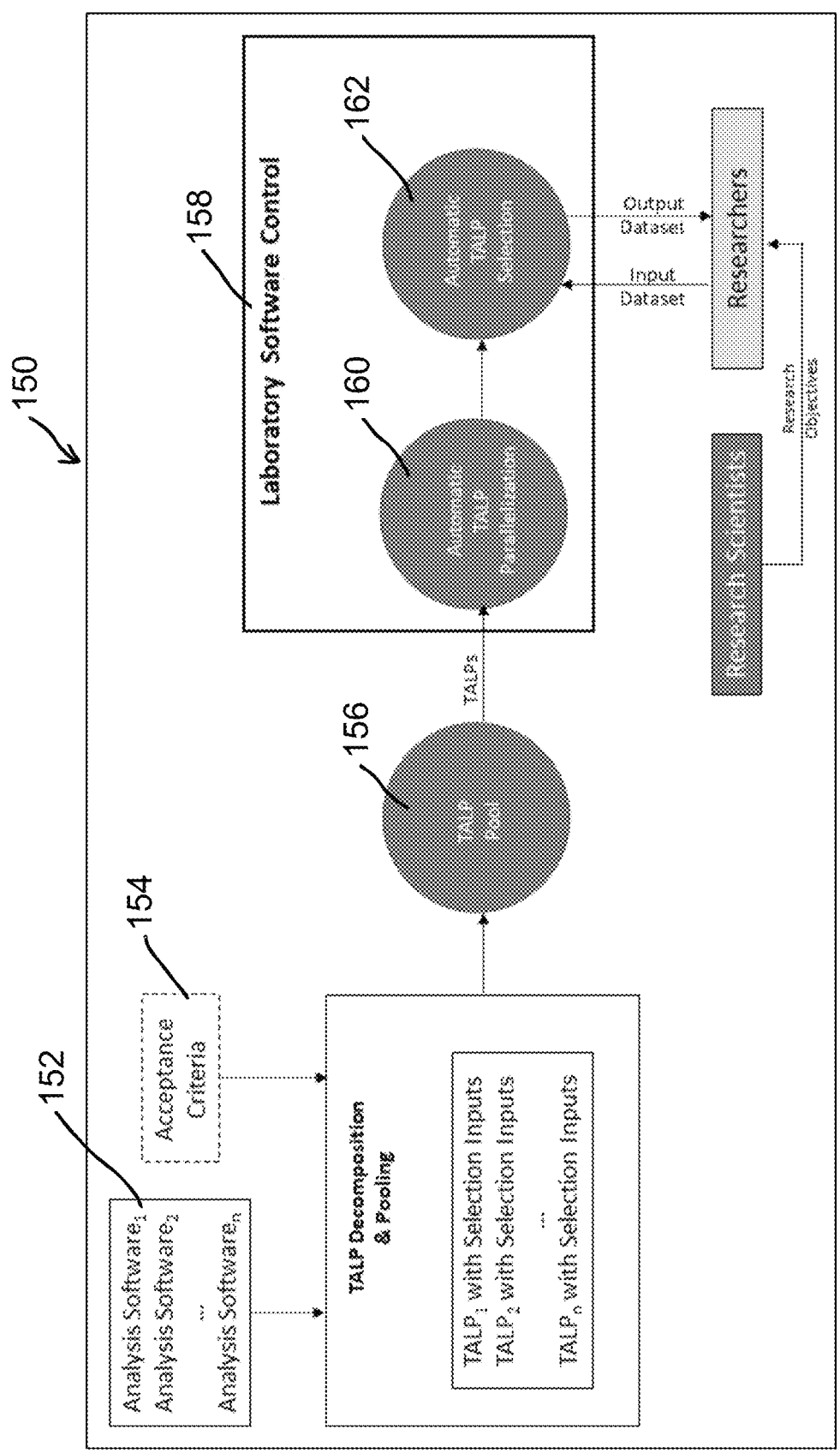
FIG. 4 is a process flow diagram of a general software E&M system and method for existing specialty laboratory data analysis software and the enhancement of that software, in accordance with embodiments of the present invention.

FIG. 4 demonstrates an embodiment of a software system and method 150 for existing specialty laboratory data analysis software 152, which creates a set of TALPs from the laboratory data analysis software using TALP decomposition. Using acceptance criteria 154, decomposed TALPs that meet this criteria are pooled 156. The pooled TALPs are presented to the laboratory software control component 158 which then automatically parallelizes those TALPs 160. Researchers present the laboratory software control component their input dataset which is used by the laboratory software control component to automatically find the correct parallelized TALP required to process their data 162.

Figure 5:
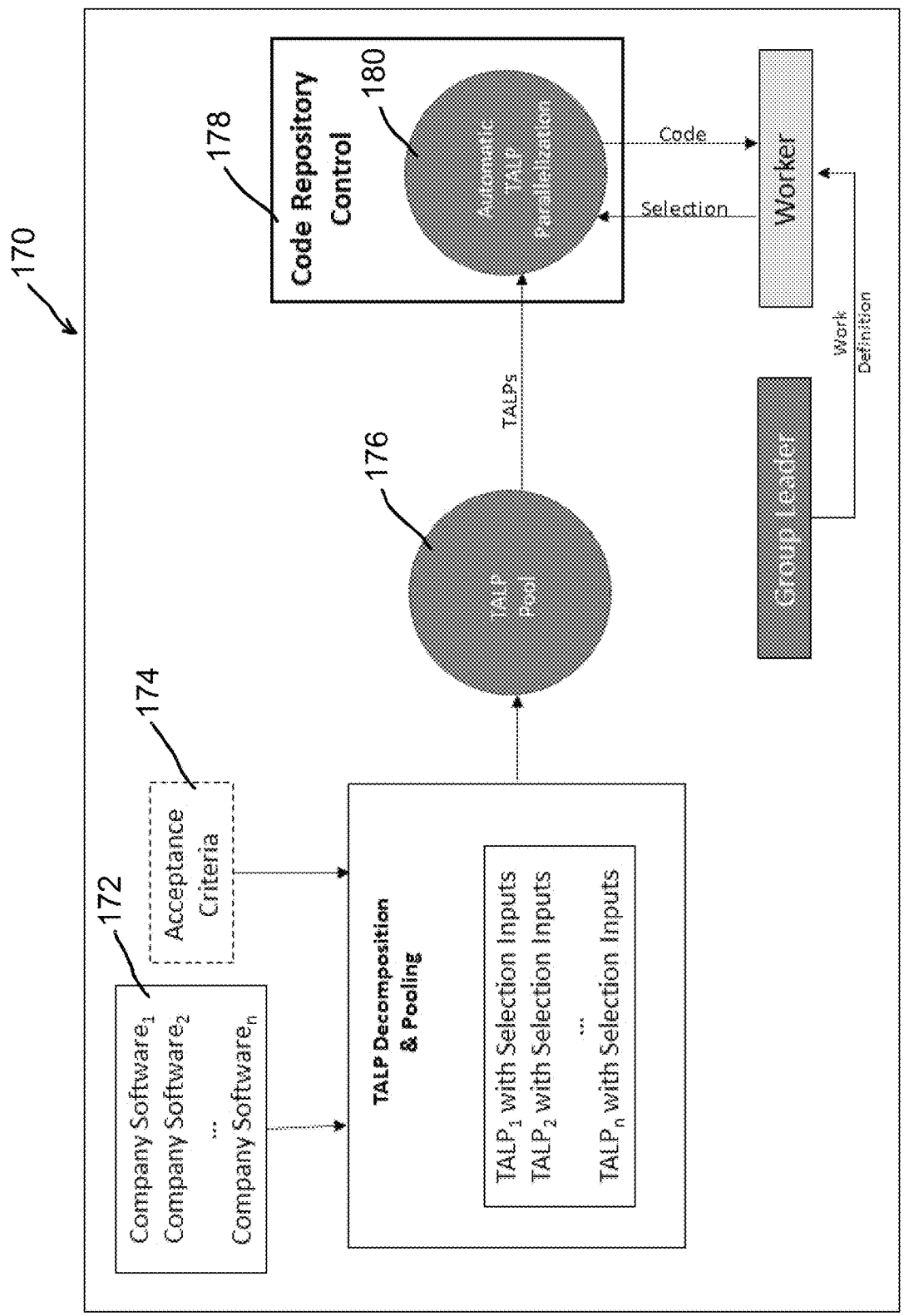
FIG. 5 is a process flow diagram of a general software E&M system and method for existing corporate software and the enhancement of that existing software, in accordance with embodiments of the present invention.

FIG. 5 demonstrates an embodiment of a software system and method using TALP decomposition 170 for existing corporate software 172 and the automatic enhancement of that existing software. Using acceptance criteria 174, decomposed TALPs that meet this criteria are pooled 176. The pooled TALPs are presented to the code repository control component 178 which then automatically parallelizes those TALPs 180. Workers can select the parallelized code that best suits their needs.

Figure 6:
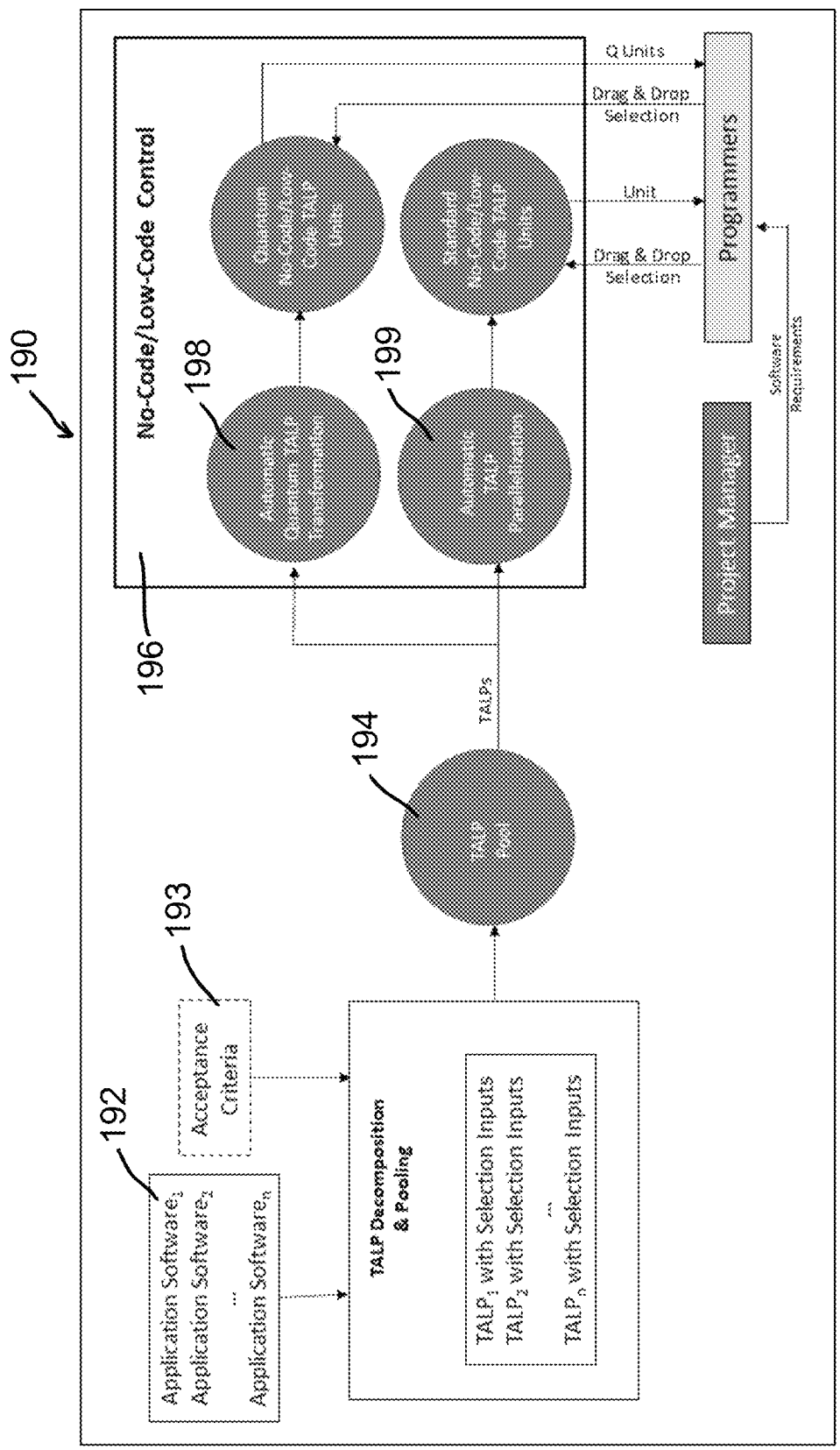
FIG. 6 is a process flow diagram of a general software E&M system and method for the transformation of standard application software into a series of enhanced no-code/low-code programming TALP units, in accordance with embodiments of the present invention.

FIG. 6 demonstrates an embodiment of a software system and method using TALP decomposition 190 of existing application software 192 and the automatic enhancement of that software. Using acceptance criteria 193, decomposed TALPs that meet this criteria are pooled 194. The pooled TALPs are presented to the no-code/low-code control component 196 to process automatic quantum TALP transformation 198 and/or automatic TALP parallelization 199 such that the no-code/low-code programming TALP units are made available to programmers as standard and/or quantum code units.

Referring generally to FIGS. 7-36J, existing software systems, herein below represented by fund management software systems, are used to store and retrieve data concerning various fund investors, ventures that are capitalized via the fund, and the fund operators. The typical fund management software contains information on a venture's risk, return on investment, milestones, milestone progress, capital on hand, capital requirements, and maturity. This information is at least accessible to the system operator. The system operator's interface, or a dedicated interface if available, can be used by the present inventive systems to access this same information.

The wrapper embodiments, using traditional functional decomposition, of the present invention show how new risks and returns are constructed using information from conventional fund management software, and thus, these systems and methods bypass the need to rewrite or replace such existing fund management software. In merged TALP embodiments of the present invention, components of the invention are embedded within the source code of conventional fund management software, using linked TALPs, to achieve diminished risk and enhanced returns. In each case, unmanaged financial assets can be combined with those financial assets managed using existing fund management software. By parallelizing the resultant aggregation of existing software plus enhancements using dynamic loop unrolling, it is possible that the original, unenhanced software processing performance is maintained or in some cases increased.

For financial software, standard information, such as a fund's underlying venture capital requirements, anticipated risk, native investment units (stocks), and anticipated return on investment, is used by the E&M System to generate a fund structure that allows for the creation of a set of risk/returns based on the venture's native risk/returns instantiated as a set of derived investment units called prioritized units. These prioritized units are associated with a set of native assets, thus allowing the standard fund management software to continue in its traditional role. The prioritized units are then associated with a new set of funds and bonds that are used to leverage the return on investment of the prioritized units and therefore the underlying native values.

It is possible to construct multiple types of prioritized units, each having its own risk/return values and its own minimum and maximum investment level. Since two of the primary distinguishers for different categories of investors are risk/returns and minimum/maximum values, it is now possible to have different categories of investors within the same fund, even if the fund is already structured.

Figure 7:
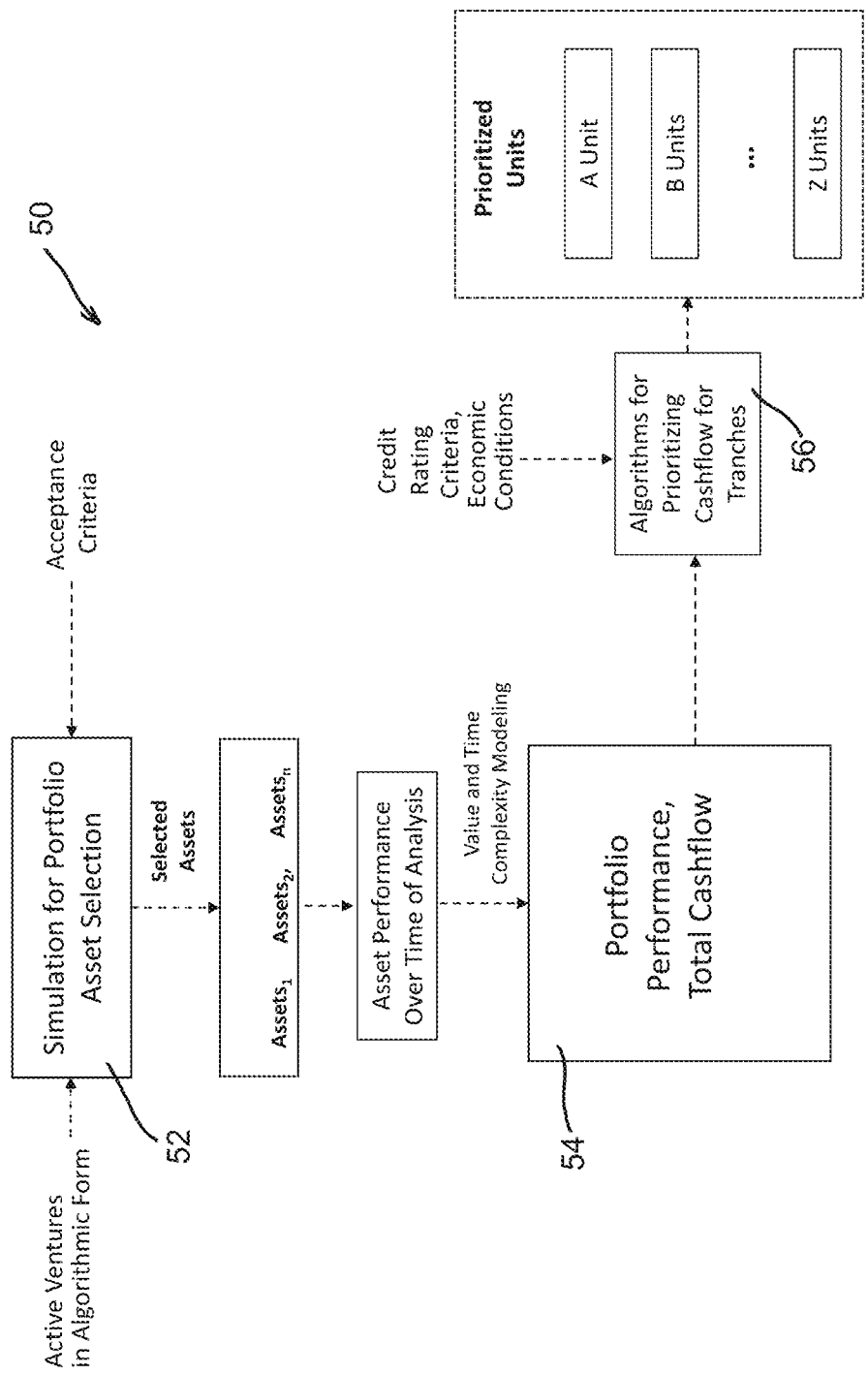
FIG. 7 is a diagram of the primary processes of an E&M system and method used to enhance and manage ventures in an equity fund, in accordance with embodiments of the present invention.

As shown in FIG. 7, the previously described general processing and workflow of FIGS. 1-1A can be applied to provide specific cases, systems, and methods. For example, a system and method 50 of reaching an output variable and/or maturity goals of a private equity fund is disclosed. Multiple active investment ventures in algorithmic form, that is, that the processes associated with the venture are represented as a data transformation algorithm, are input into the system. Using simulation, these ventures in algorithmic form are decomposed into their inherent TALPs with input variable value ranges (or assets) at block 52. Using these values ranges and some predefined acceptance criteria, such as return on investment within certain maturity criteria, TALPS are selected. Time and space complexity estimation polynomials are generated for each TALP (asset) then the TALPs with associated polynomials are gathered into a pool (portfolio) at block 54. Economic conditions and credit rating criteria are discretized and spread over multiple TALPs at block 56 such that a given specific goal is reached. If a goal cannot be reached, then the TALP configuration which produces the closest values to the projected asset performance at various times can be generated. The optimum solutions for a set of TALPs are considered prioritized units.

Figure 8:
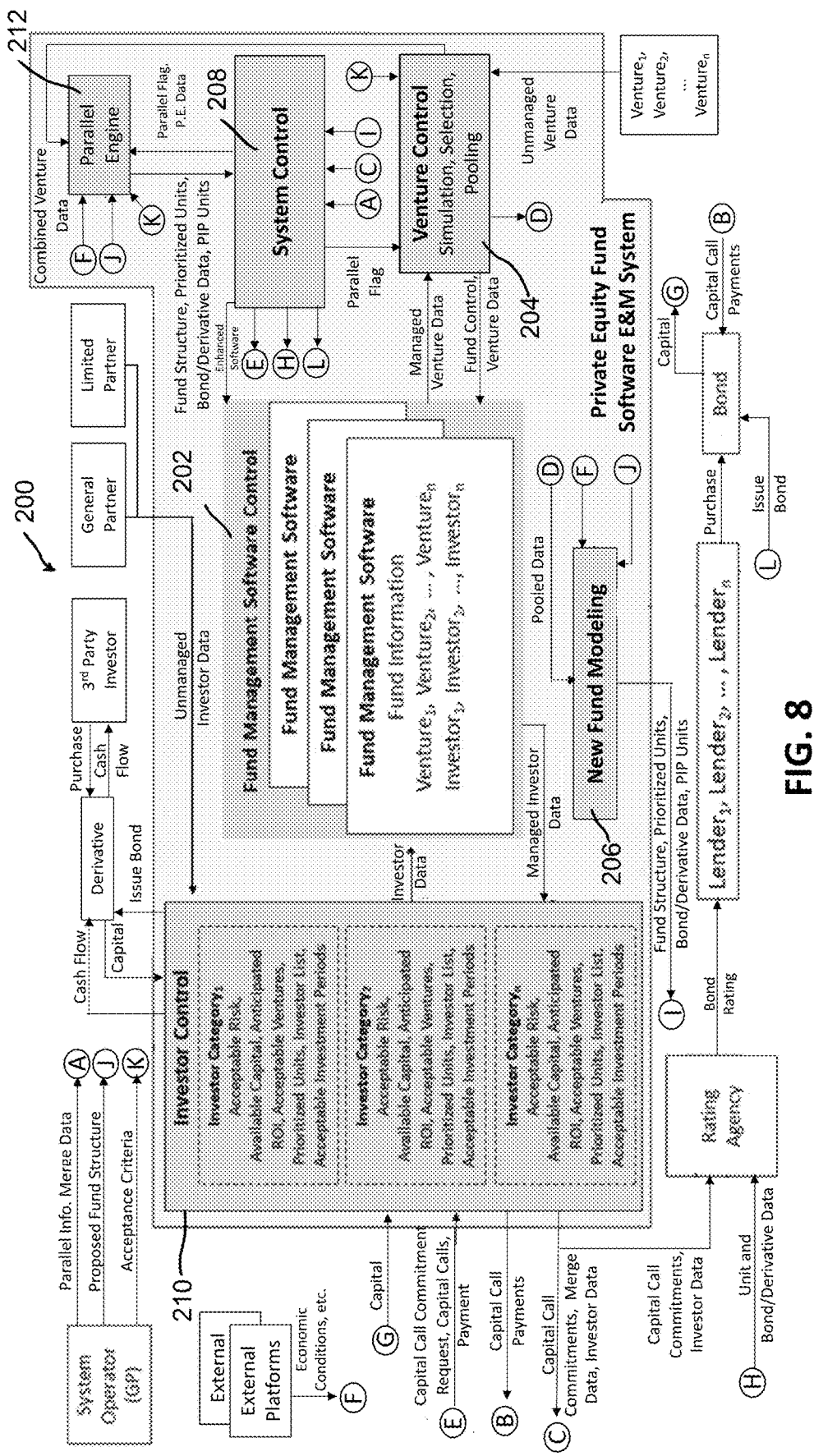
FIG. 8 is a block diagram of an external software E&M system that decreases the risks and enhances the returns of private equity funds that would be managed using conventional systems, in accordance with embodiments of the present invention. This embodiment uses the functional decomposition shown in FIG. 2.

FIG. 8 is a detailed block diagram of the software enhancement and management system 200 as a non-embedded wrapper-based software system, herein exemplified by a software E&M System composed of six primary components: fund management software control 202, venture control 204, new fund modeling 206, system control 208, investor control 210, and a parallel engine 212. The users of the system generate the inputs, consume the outputs of the system, and are referred to as actors. There are nine primary actors that use this embodiment of the system: existing fund management software, general partners, junior limited partners, senior limited partners, lenders, rating agencies, venture principals (CEOs, organization presidents, etc.), external platforms, 3$^{rd}$ party investors, and system operators. The E&M System 200 offers a unique way for these actors to interact to enhance the investment returns generated by conventional fund management software and reduce the investment risk associated with funds managed in the conventional manner. Analogous to how an assembler or compiler receives source code and converts that source code into a new form that can cause electronic hardware to follow a set of given rules, the E&M System takes fund, venture, and investor information and converts it into a risk reduction, return enhancement form that causes cash flows to follow a new set of financial rules, to the benefit of the actors that use the system.

The alphabetic references (e.g., A, B, C, D . . . n) in FIGS. 8-8A, 14-15, 30-32 and FIGS. 36A-36J are line connectors, referencing data inputs and/or outputs within each separate figure; that is, an alphabetic reference on one figure does not correspond to the same alphabetic reference on another figure.

Since the outputs of some existing system represent input to the new enhancement code, then (for a fund management software system) both venture and investor information can be obtained as managed data from the code of some existing fund management software. This does not mean that data cannot be obtained directly from input data screens. Such directly inputted data is considered unmanaged data as it has not been subject to prior processing. Similarly, data from existing software outputs is considered managed data, having been subject to prior processing. Being able to automatically take advantage of some prior processing decreases the code required by the enhancement.

The managed and unmanaged data is combined for either ventures or investors. Cash flows and risk from input venture assets are simulated then selected using acceptance criteria for inclusion in an investment pool. Given economic conditions, investment pool data, and a proposed fund structure, modeling is performed to generate a fund structure, prioritized units, bond/derivative data, and principal invested in the portfolio (PIP) units. PIP units are associated with prioritized units, which are structured fund ownership units to be obtained by general and limited partners.

Bonds may be used to purchase PIP assets that are associated with prioritized units, in which case the limited partners provide a capital call commitment to increase the bond rating. The percentage of PIP ownership, the capital call order, and the preference or payment order associated with the different prioritized unit types that are associated with the various investor categories allow for multiple risks and returns to be associated with the same private equity fund.

Figure 8A:
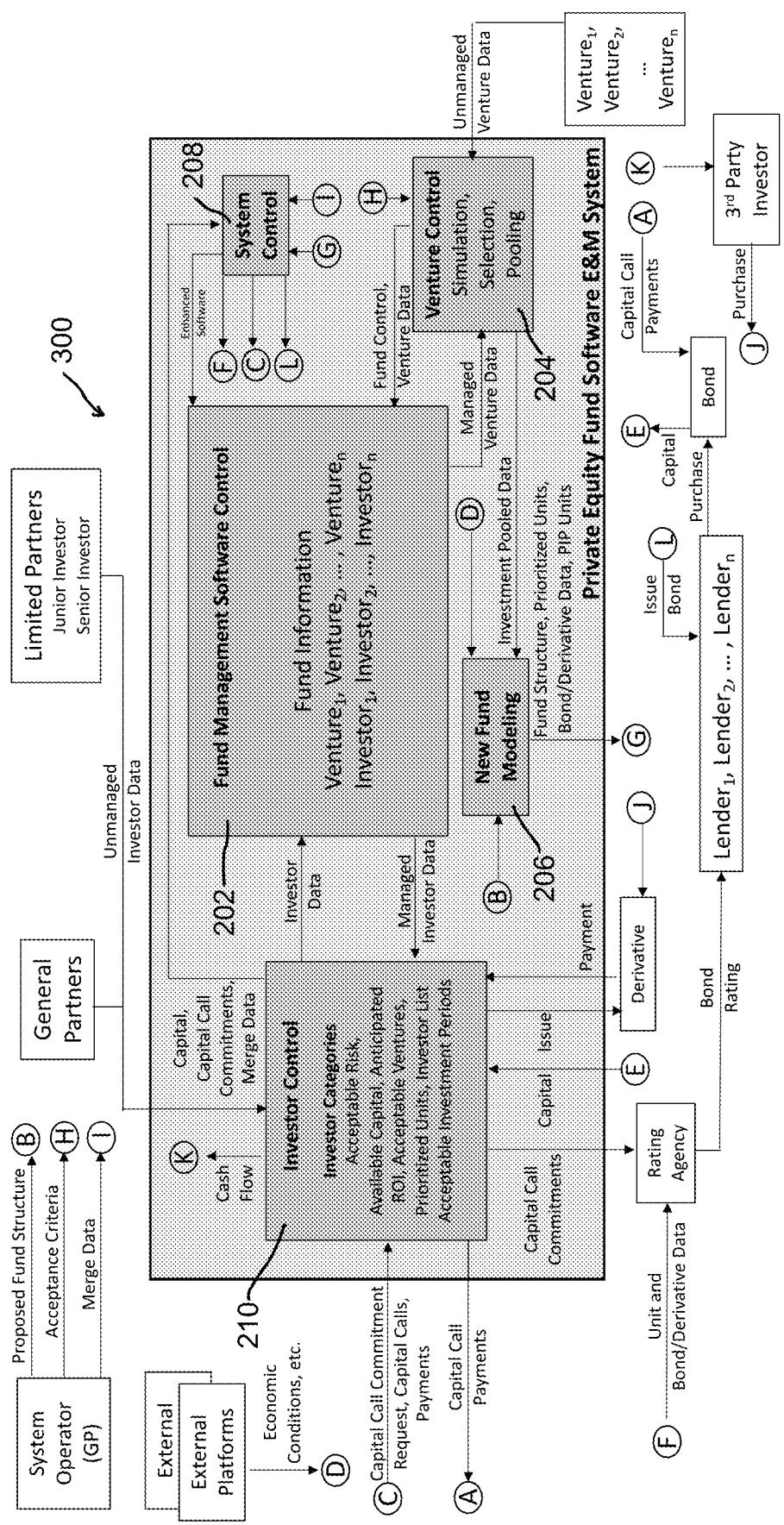
FIG. 8A is a block diagram of an embedded software E&M system, where some or all of its elements are embedded within the source code of the conventional fund management software, in accordance with embodiments of the present invention. The fund management software control shown in this figure uses the TALP decomposition shown in FIG. 3.

The E&M System 300 shown in FIG. 8A is an embedded or TALP-based system where some or all of its components are embedded within an existing private equity fund management software system. Embedding is automatically accomplished by the E&M System using TALP decomposition followed by TALP linkage. Once TALP decomposition has been accomplished, any such decomposed codes can be automatically parallelized using advanced speedup with loop-unrolling techniques as disclosed in incorporated U.S. Patent Publication No. 2020/0210162. Underlying the two high-level embodiments (external and embedded) are four deployment embodiments: stand-alone (FIG. 25), centralized client-server (FIG. 26), decentralized cloud-based (FIG. 27), and decentralized ad hoc (FIG. 28).

Figure 9:
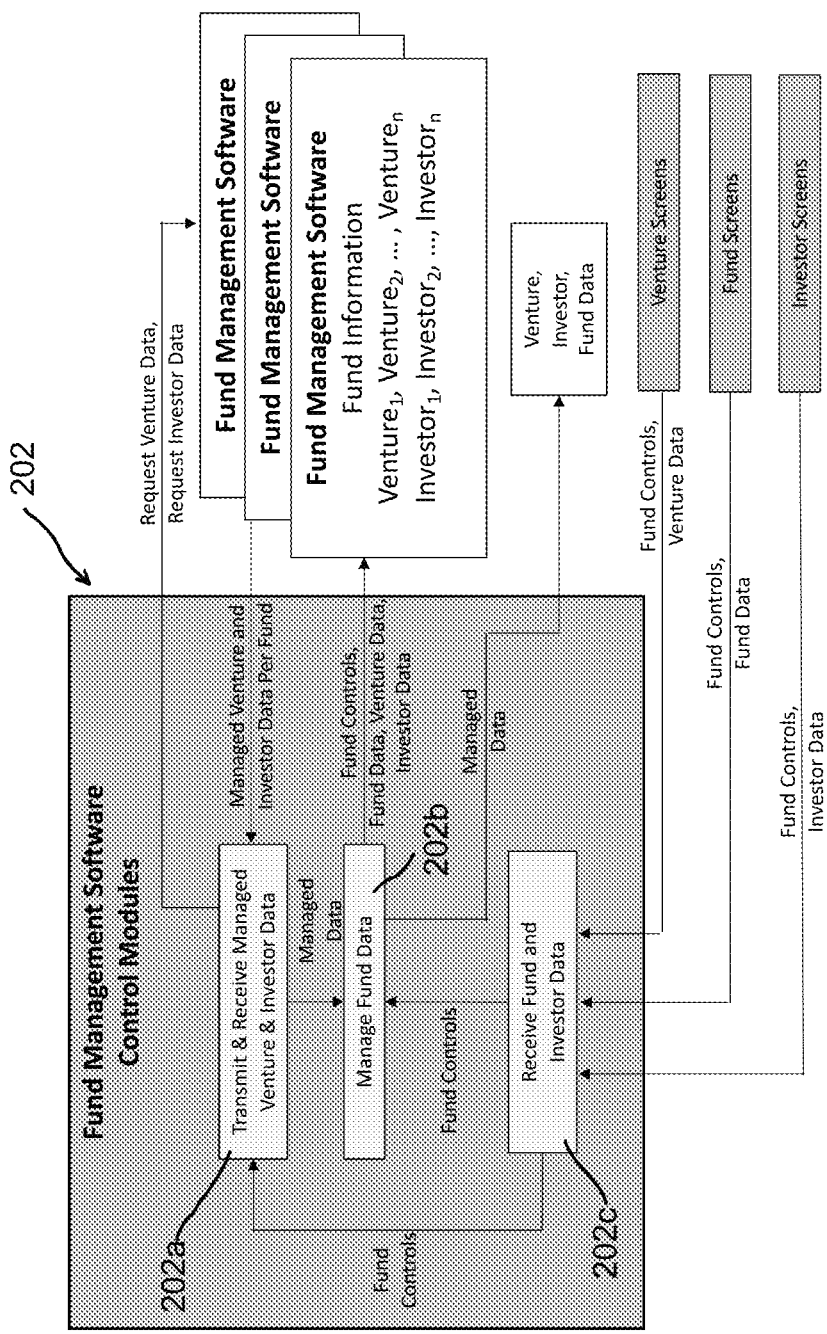
FIG. 9 is a block diagram of a fund management software control component of a software E&M system that manages the fund management software of conventional software, in accordance with embodiments of the present invention.
Figure 24:
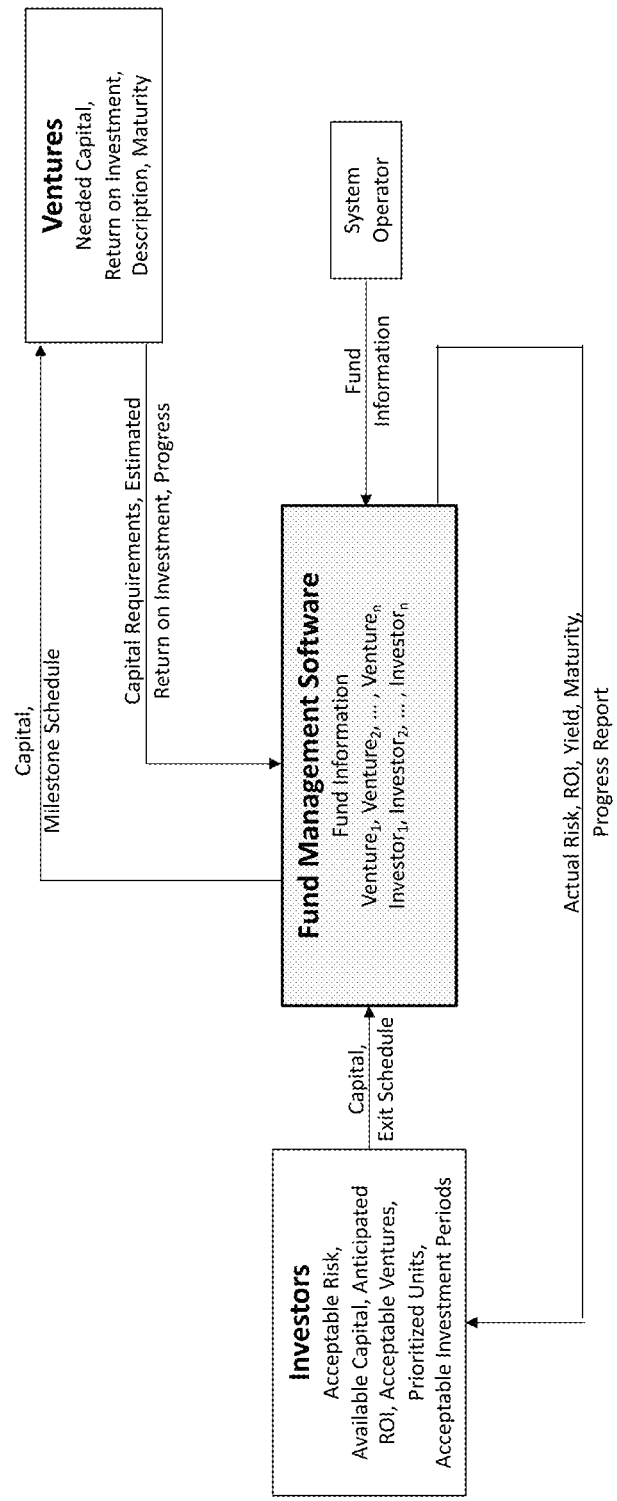
FIG. 24 is a block diagram of existing equity fund management software inputs and outputs of the type that can be associated with embodiments of the present invention.

The fund management software control component 202, as shown in FIG. 9, directly interfaces with conventional fund management software and includes three modules: transmit and receive managed venture and investor data 202a, manage fund data 202b, and receive fund and investor data 202c. The fund management software (conventional) venture and investor data associated with a selected fund is sent upon request to fund management software control. Since this data is already associated with an existing fund, it is considered managed data. New fund, venture, and investor data is received from input data screens (as shown in FIGS. 18-22), saved, and transmitted to the fund management software. The relevant managed data from fund management software can also be transmitted to investor control and venture control. FIG. 24 shows a diagram of existing equity fund management software inputs and outputs of the type that can be associated with embodiments of the present invention.

Figure 10:
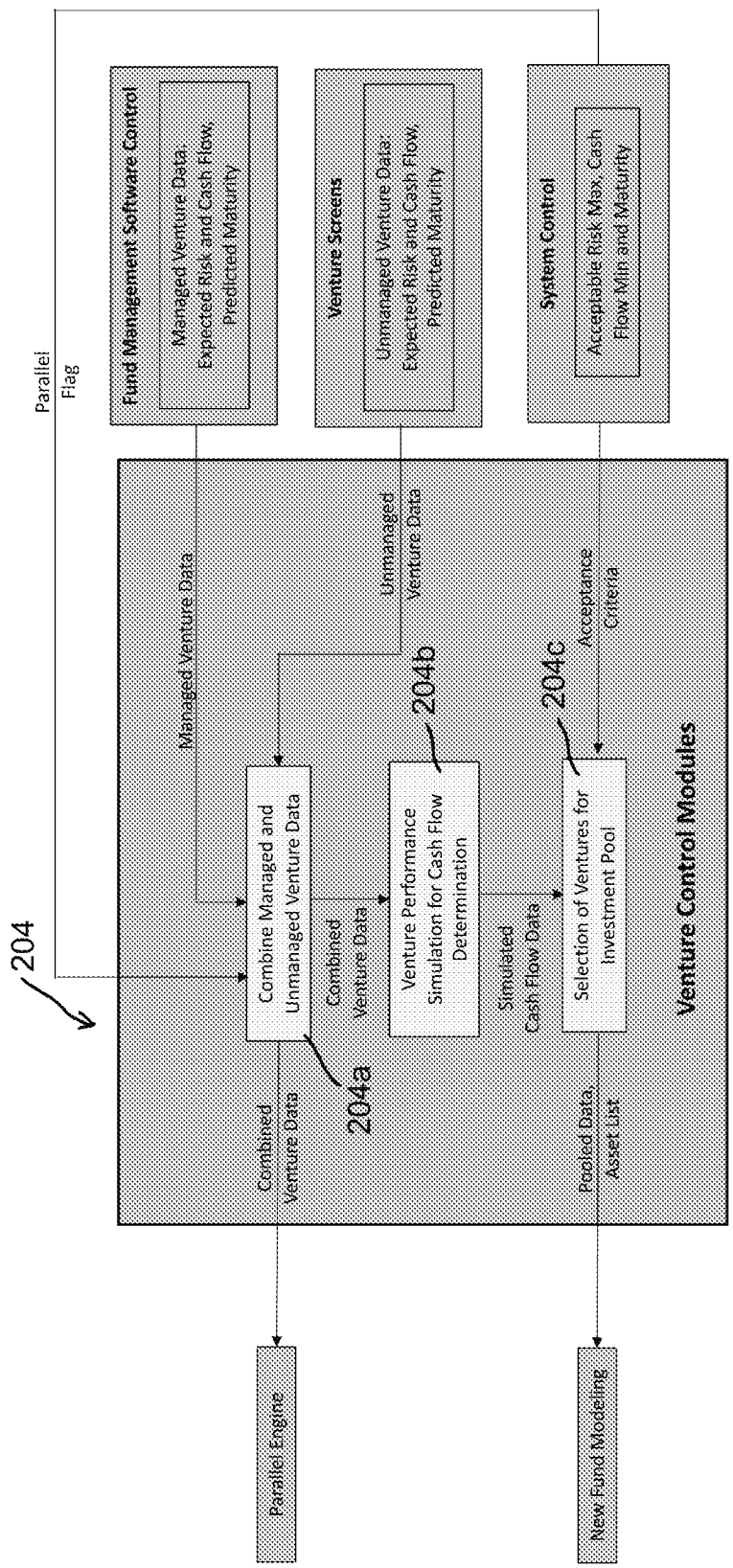
FIG. 10 is a block diagram of the venture control component of the software E&M system that combines managed and unmanaged venture data and either sends this combined data to the parallel engine or uses the data to simulate and select ventures for an investment pool, in accordance with embodiments of the present invention.
Figure 11:
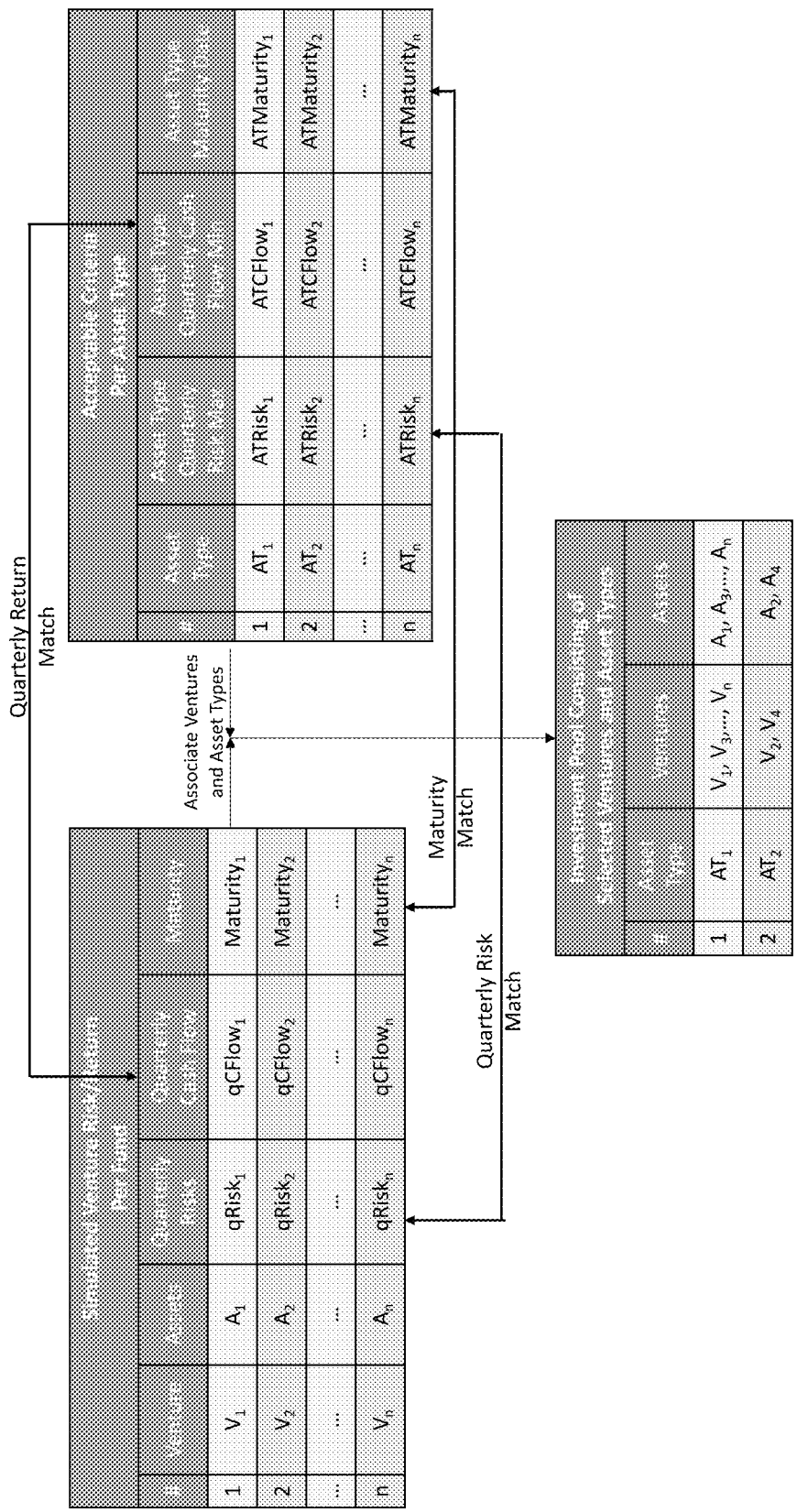
FIG. 11 is an information flow diagram of the venture control component of a software E&M system after the simulation of venture data that shows the use of the simulated venture risk/return data and acceptable criteria from the system operator to select and pool venture assets, in accordance with embodiments of the present invention.
Figure 19:
FIG. 19 shows an example of an input data screen used to gather junior investor information, in accordance with embodiments of the present invention.
Figure 20:
FIG. 20 shows an example of an input data screen used to gather investment fund information, in accordance with embodiments of the present invention.
Figure 21:
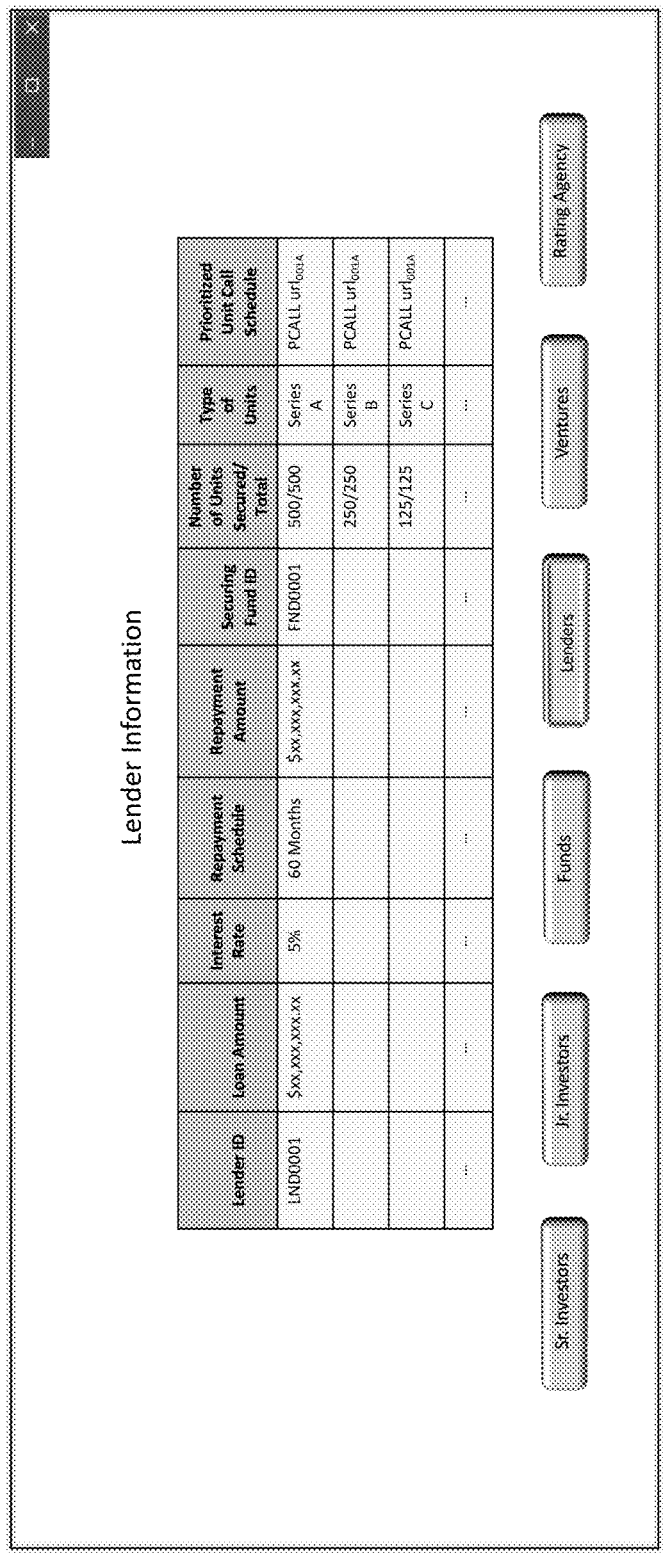
FIG. 21 shows an example of an input data screen used to gather lender information, in accordance with embodiments of the present invention.
Figure 22:
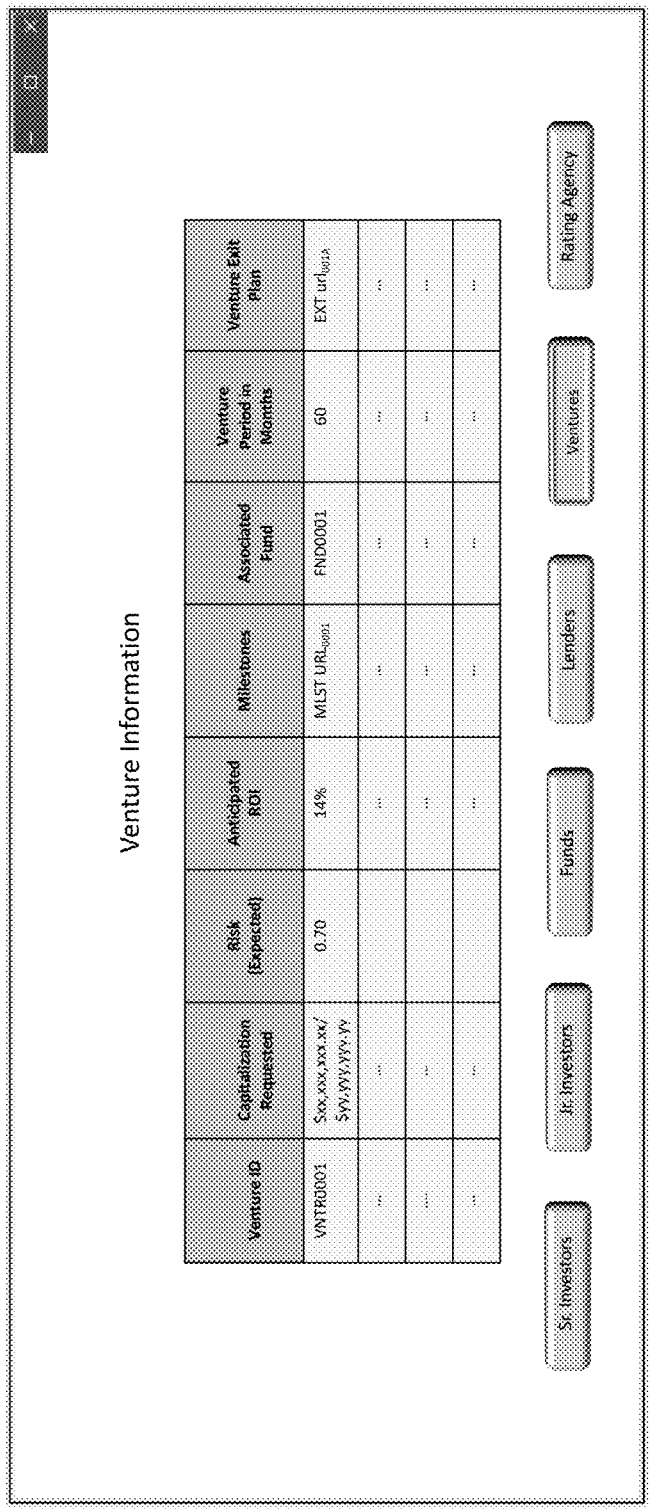
FIG. 22 shows an example of an input data screen used to gather venture information, in accordance with embodiments of the present invention.
Figure 23:
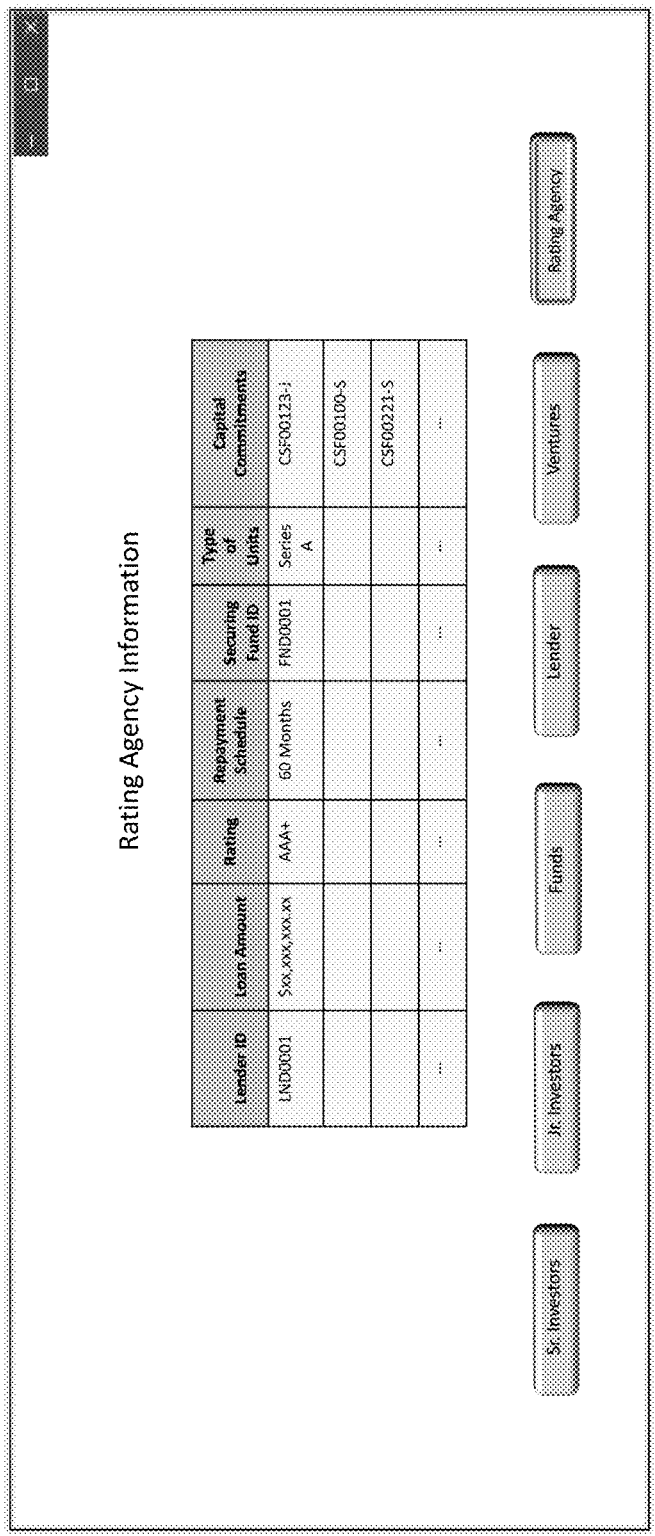
FIG. 23 shows an example of an input data screen used to gather rating agency information, in accordance with embodiments of the present invention.

The venture control component 204, as shown in FIG. 10, receives managed venture data from fund management software control and unmanaged venture data from the direct interface with the principals of a venture using venture screens, as shown in FIG. 19. The venture control component includes three modules: combine managed and unmanaged venture data 204a, venture performance simulation for cash flow determination 204b, and selection of ventures for investment pool 204c. The managed and unmanaged venture data is combined. If the parallel flag is set to true, the combined venture data is sent directly to the parallel engine component 212. If the parallel flag is set to false, the combined venture data is sent to the "venture performance simulation for cash flow determination" module where the cash flow generated by each venture from the start date until the maturity date of the venture is simulated. The simulation output data is sent to the "selection of ventures for investment pool" module where it is compared to system operator-given acceptance criteria to select the ventures to be included in the investment pool, as shown in FIG. 11.

The simulation and selection process can be implemented using either conventional software techniques or conventional or known artificial intelligence techniques. Regardless of which technique is used, the present invention can convert the underlying codes into TALPs for parallelization. The selected pooled data with associated assets is then sent to the new fund modeling component.

Figure 12:
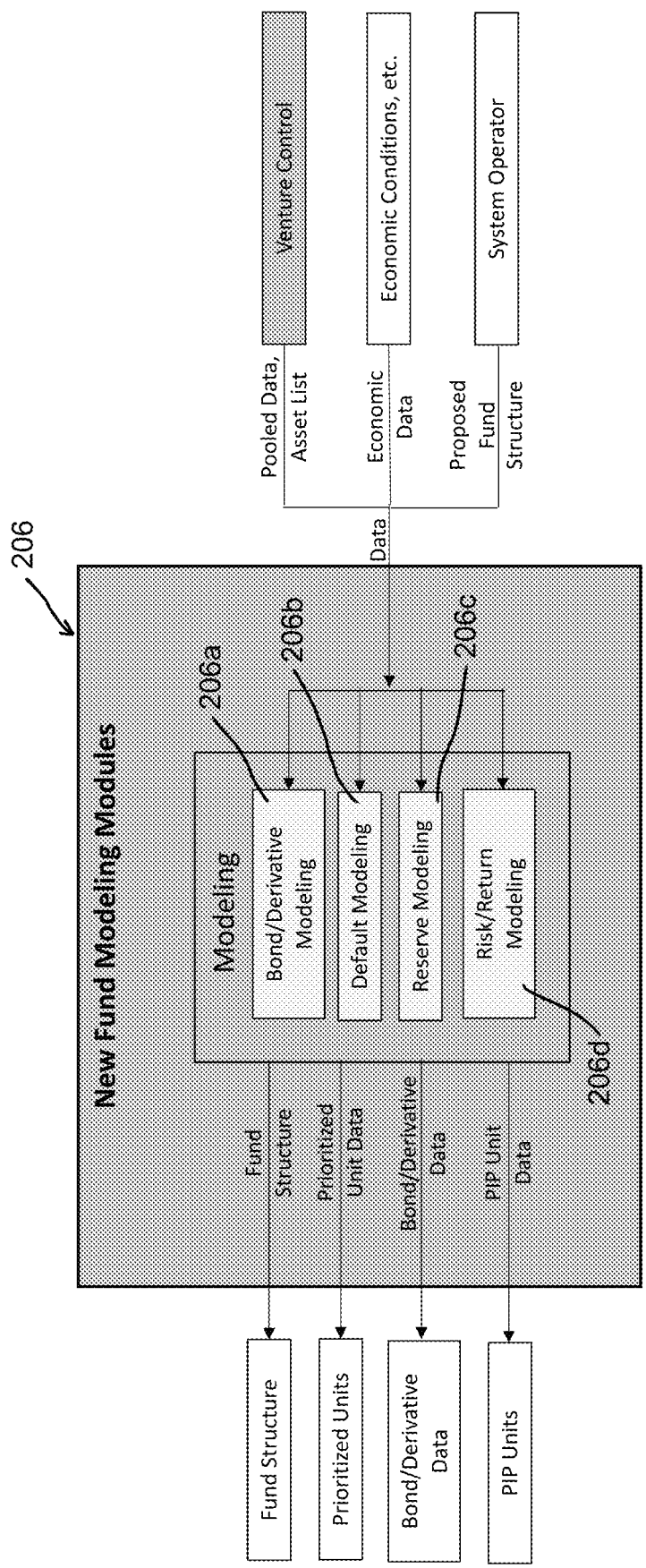
FIG. 12 is a block diagram of the new fund modeling component of a software E&M system that uses investment pool data, economic data and a proposed fund structure for bond/derivative, default, reserve, and risk/return modeling, in accordance with embodiments of the present invention.
Figure 13:
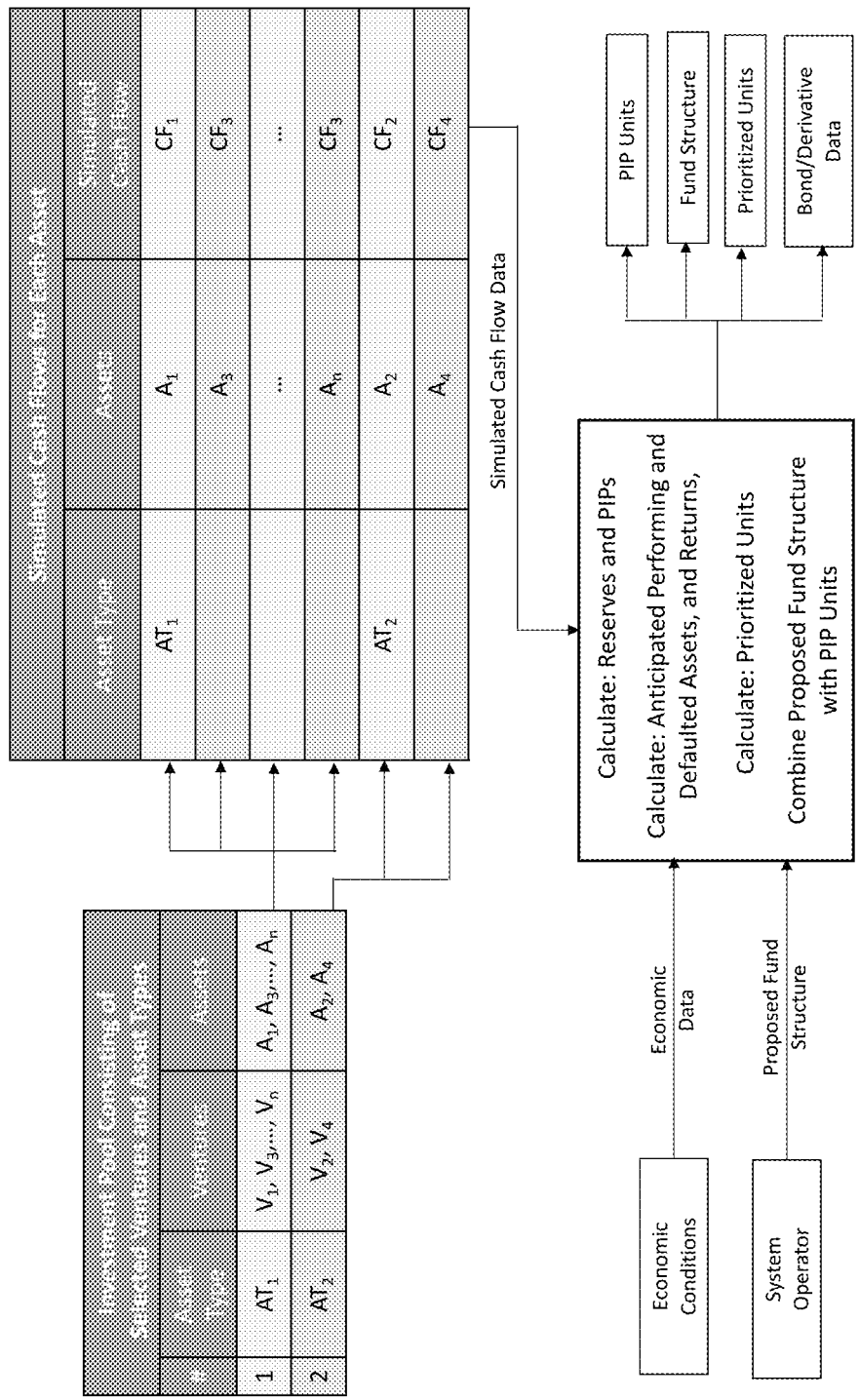
FIG. 13 is an information flow diagram of a new fund modeling component of the software E&M system that uses investment pool data, economic data and a proposed fund structure for bond/derivative, default, reserve, and risk/return modeling, in accordance with embodiments of the present invention.

As shown in FIG. 12, the new fund modeling component 206 includes four modules: bond/derivative modeling 206a, default modeling 206b, reserve modeling 206c, and risk/return modeling 206d. Pooled data with associated assets, economic data, and a system operator-given proposed fund structure are used for bond/derivative, default, reserve, and risk/return modeling to generate the fund structure and associated prioritized units and PIP units as well as bond and derivative data. The modeling and structuring process can be implemented using either conventional software techniques or conventional or known artificial intelligence techniques. Regardless of which technique is used, the present invention can convert the underlying codes into TALPs for parallelization. FIG. 13 shows the mechanics of this modeling in greater detail, using the equations below:

$$R = PIR + OR + FR + BRR \quad \text{Equation 1—Total Reserves}$$

Where R=total reserves
PIR=pre-invested reserves
OR=over-head reserves
FR=follow-up reserves
BRR=bond repayment reserves $$PIP = CR - R \quad \text{Equation 2—PIP (Simplified)}$$

Where PIP=principal invested in portfolio
CR=capital raised $$PA = PIP - DA \quad \text{Equation 3—Performing Assets}$$

Where DA=defaulted assets $$DA = PIP \times DR \quad \text{Equation 4—Defaulted Assets}$$

Where DR=default rate $$PA = PIP - (PIP \times DR \times (EV/(RV-COR))) \quad \text{Equation 5—Performing Assets}$$

Where PA=performing assets
EV=exposure value
RV=recovery value
COR=cost of recovery Conservatively, EV/(RV−COR) may be simplified as "one" in terms of its numerical value, and therefore PA equals PIP−DR as shown in Equation 3.

The return on investment (ROI) for the capital raised (CR) is calculated. In a simplified form, this may be modeled as shown in Equation 6.

$$CR_{ROI} = PIP_{ROI} \times (PIP/CR) \quad \text{Equation 6—ROI for Capital Raised (Simplified)}$$

Where $CR_{ROI}$=return on investment on the capital raised
$PIP_{ROI}$=return on investment on the principal invested portfolio Below is a more detailed model of ROI for capital raised, Equation 7:

$$CR_{ROI} = (PIP) - (PIP \times DR \times (EV/RV-COR)) \times ROI \times (PIP/CR) \quad \text{Equation 7—ROI for Capital Raised (Detailed)}$$

Where ROI=return on investment Equation 8 expands Equation 2, PIP (Simplified), into a more detailed model.

$$CR_{ROI} = CR - PIR - OR - FR - BRR - ((CR - PIR - FR - BRR) \times (EV/(RV-COR))) \times ROI \times (PIP/CR) \quad \text{Equation 8—PIP (Detailed)}$$

The return on investment on the equity raised ($EQ_{ROI}$) is shown in Equation 9.

$$EQ_{ROI} = (CR_{ROI} - COD) \times (CR/PE) \quad \text{Equation 9—ROI on Equity Raised}$$

Where $EQ_{ROI}$=return on investment on equity raised
COD=cost of debt

When multiple classes of debt (bonds) are included in the fund, each may have its own cost of debt (COD) which is expressed as $COD_1$, $COD_2$, and so on. The effect of multiple classes of debt upon the rate of return to the equity class is modeled in Equation 10.

$$EQ_{ROI} = (CR_{ROI} - COD_1 \times (D_1/CR) - COD_2 \times (D_2/CR) - \ldots - COD_n \times (D_n/CR)) \times (CR/EQ_{RD}) \quad \text{for Multiple Classes of Debt}$$

Where $D_x$=the principal amounts of each class x of debt
Where $D_1$ and $D_2$ represent two classes of debt in a fund, if $CR_{ROI}$ is 20%, $COD_1$ is 10%, $D_1$ represents $50M, CR is $100M, $COD_2$ is 12%, and $D_2$ represents $25M, then Equation 10 is used to determine $EQ_{ROI}$ as follows:

$$EQ_{ROI} = (0.2 - 0.1(50,000,000/100,000,000) - 0.12(25,000,000/100,000,000)) \times (100,000,000/(100,000,000 - 50,000,000 - 25,000,000))$$

Which gives:

$$EQ_{ROI} = (0.2 - 0.1(0.5) - 0.12(0.25)) \times (100/(100 - 50 - 25))$$

Which is:

$$EQ_{ROI} = (0.2 - 0.05 - 0.03) \times 4 = 48\%$$

Figure 14:
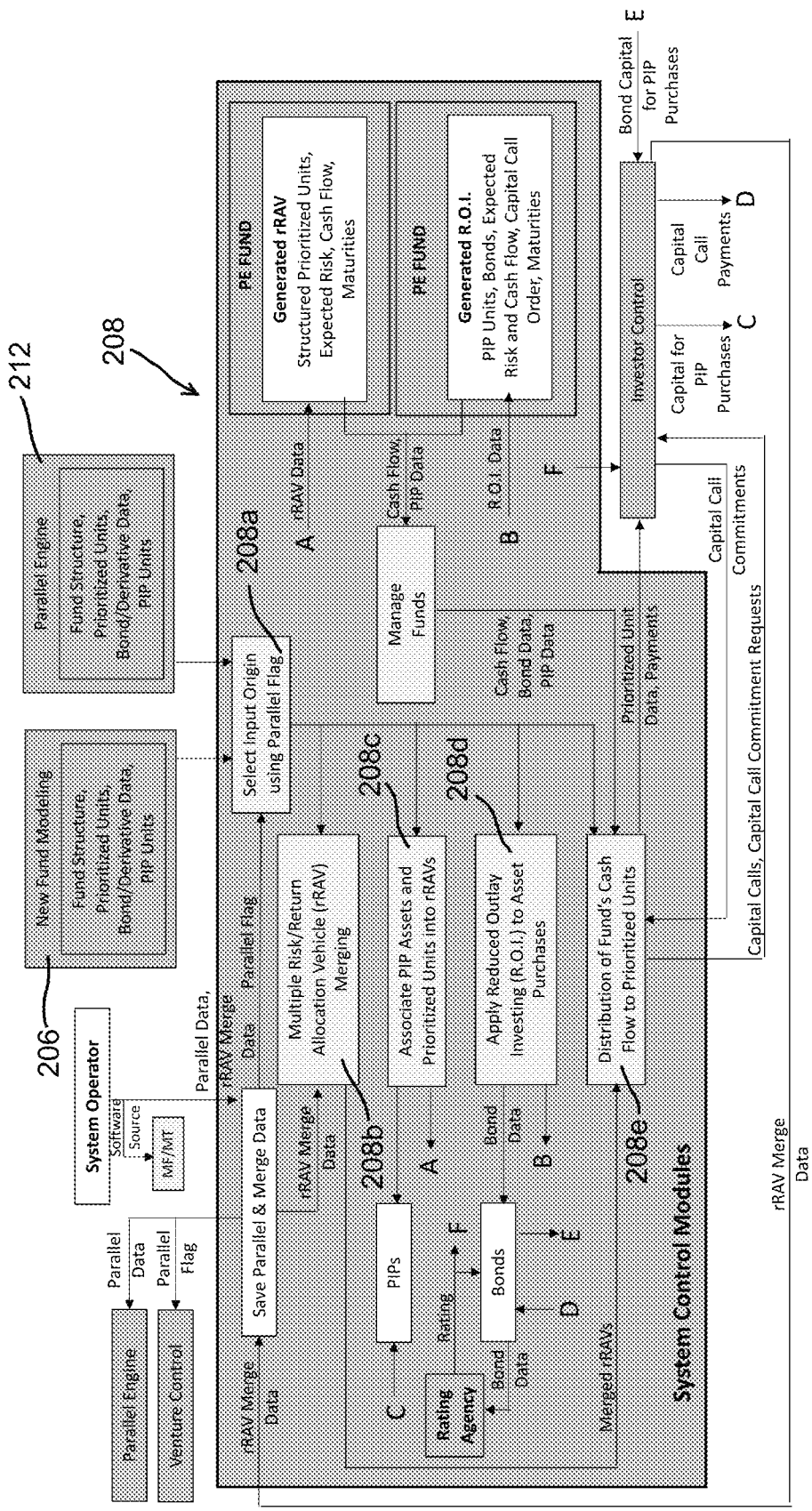
FIG. 14 is a block diagram of the system control component of the software E&M system that uses the modeled data to generate structured private equity funds and manage any bonds associated with the funds, in accordance with embodiments of the present invention. This component is also where the existing software functionality is extended.

As shown in FIG. 14, the system control component 208 includes six modules: select input origin using parallel flag 208a, multiple risk/return allocation vehicle merging 208b, associate PIP assets and prioritized units into risk/return allocation vehicles (rRAVs) 208c, apply reduced outlay investing (R.O.I.) to asset purchases 208d, and distribution of fund's cash flow to prioritized units 208e. The system operator instructs the system via inputs to use parallel processing techniques while simulating and modeling. Setting the parallel flag to true instructs both venture control and parallel engine control that multiple instances of the code, that is, parallel processing, are to be used. With a true parallel flag, venture control sends combined venture data to parallel engine control instead of proceeding to simulation and selection. A parallel flag set to true also tells the "select input origin using parallel flag" module to receive data from parallel engine control; if set to false, data is received from the new fund modeling component. This data (fund structure, prioritized units, bond/derivative data, and PIP units), received from either parallel engine or new fund modeling control, is used to generate rRAV-based and/or R.O.I.-based funds that are managed by system control. If either the system operator or investor control sets the merge flag to true, merge data, consisting of a list of rRAVs to be merged, received from either source is used to merge specific rRAVs into a single new rRAV for use in cash flow distribution. The "distribution of fund's cash flow to prioritized units" module uses cash flow, bond data, and PIP data from the "manage funds" module and the merged rRAV data from the "multiple rRAV merging" module to generate payments that are sent to the investor control component.

Figure 15:
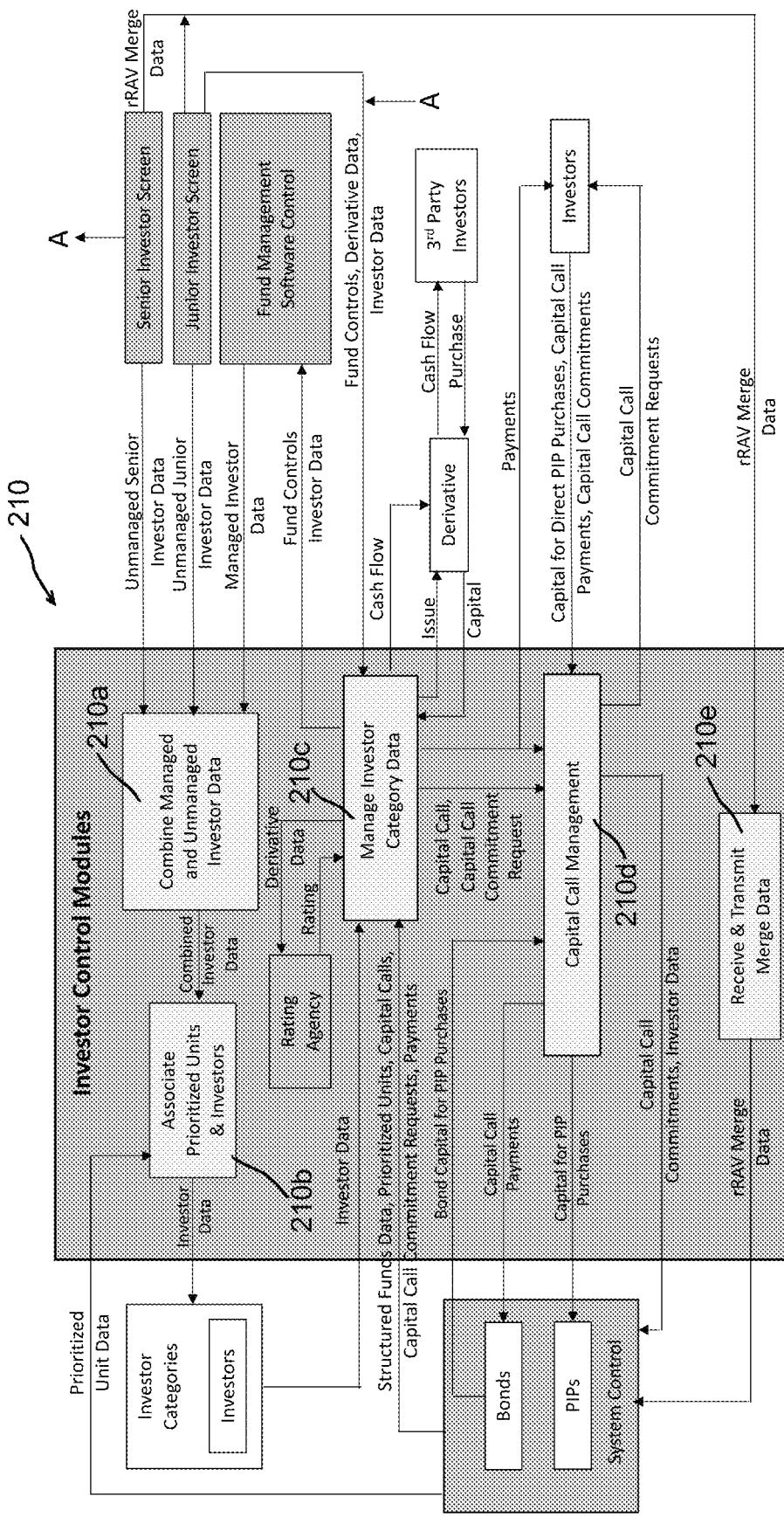
FIG. 15 is a block diagram of the investor control component of the software E&M system that combines managed and unmanaged investor data and manages capital calls, direct principal invested in the portfolio (PIP) purchases, and payment distributions to investors or capital call payments to bonds, in accordance with embodiments of the present invention.
Figure 18:
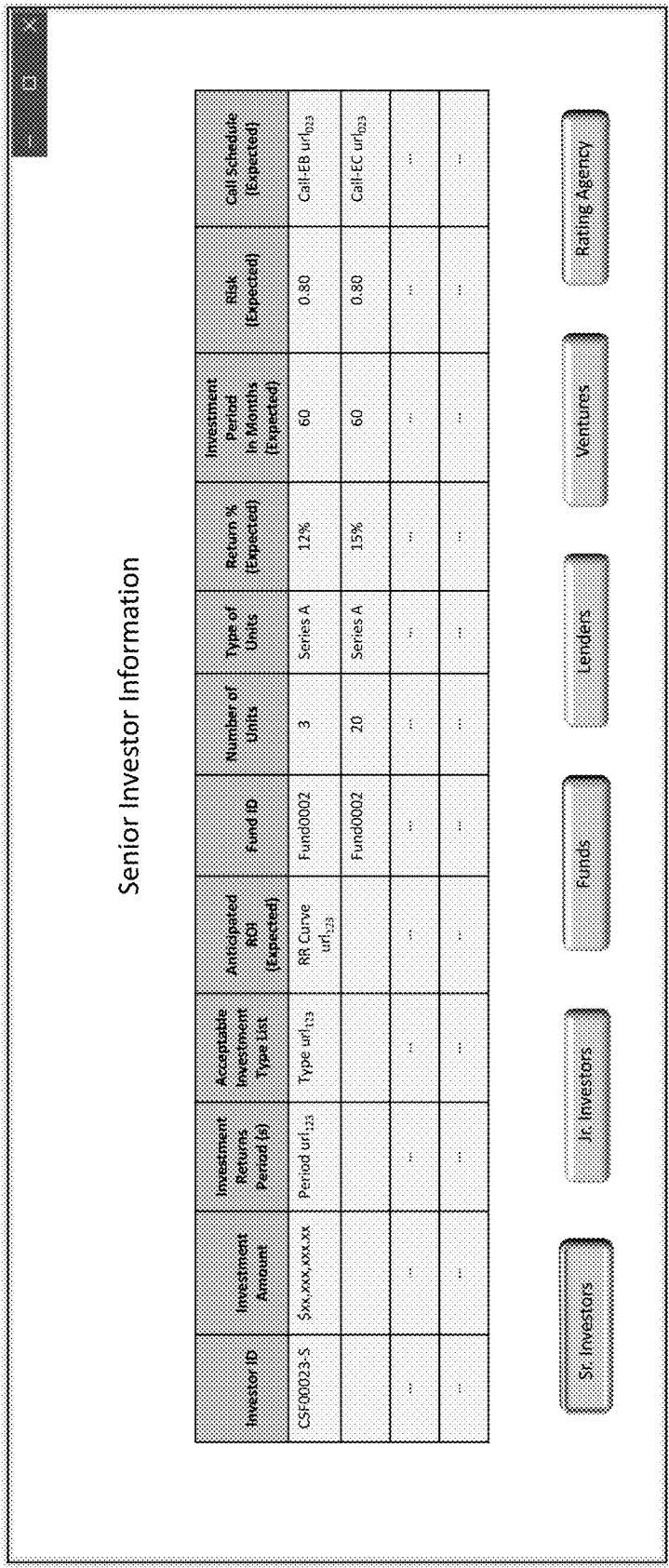
FIG. 18 shows an example of an input data screen used to gather senior investor information, in accordance with embodiments of the present invention.

The investor control component 210, as shown in FIG. 15, receives managed investor data from fund management software control and unmanaged investor data from senior and junior investor screens, as illustrated in FIGS. 18-19. The investor control component 210 includes five modules: combine managed and unmanaged investor data 210a, associate prioritized units and investors 210b, manage investor category data 210c, capital call management 210d, and receive and transmit merge data 210e. The managed and unmanaged data is combined and sent to the "associate prioritized units and investors" module where the combined investor data is associated with prioritized unit data from system control and stored in investor categories. The "manage investor category data" module manages investor categories and receives structured fund, capital call, capital call commitment request, and payment data from system control then sends capital call and commitment requests to capital call management and payments to both capital call management and investors. New or updated investor data from the junior or senior investor screens can be received directly by the "manage investor category data" module. Capital call commitments and payments requests and capital for direct PIP purchases are received by capital call management from investors and transmitted to system control. Bond capital for PIP purchases is received by capital call management and also used to purchase PIP units. If an investor directs the merging of rRAVs, the merge data, consisting of a merge flag and a list of the rRAVs to be merged, is received by the "merge data" module and sent to system control.

Figure 16:
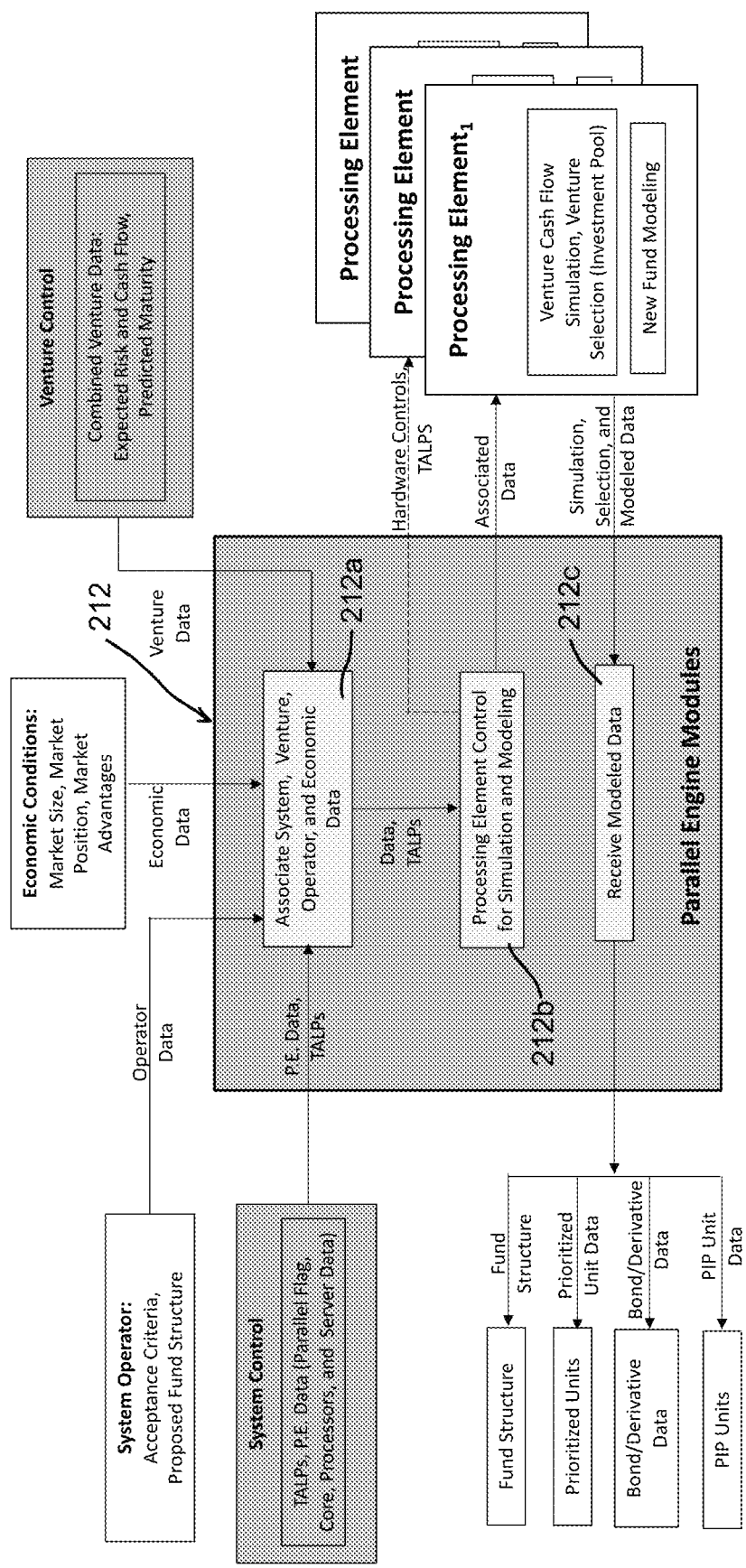
FIG. 16 is a block diagram of the parallel engine component of the software E&M system that uses combined venture data, acceptance criteria, and economic conditions to simulate, pool, and model data using parallel processing techniques, in accordance with embodiments of the present invention.

Since only TALPs are parallelized, the parallel engine component 212 performs TALP parallel management—the allocation and deallocation of processing elements, setup of any required cross-communication, management of the discretization of data across the various processing elements, and the performance of the required scatter/gather of the initial and final datasets—unlike other parallel systems, which manage modules or threads. The parallel engine component 212, as shown in FIG. 16, includes three modules: associate system, venture, operator, and economic data 212a; processing element control for simulation and modeling 212b (using parallel TALP selection); and receive modeled data 212c. Processing element data, including parallel flag, core, processor, and server data, is received from system control; acceptance criteria and a proposed fund structure is received from a system operator; economic data, including market size, position, and advantages, is received from an external platform; and venture data, including expected risk and cash flow and predicted maturity, is received from venture control. This data is associated then discretized by using the association of input variable attributes to the loop iteration count and required number of processing elements. The system automatically generates the beginning and ending values of the data for each particular processing element and transmits it to the processing elements of the parallel processing hardware using a scatter technique. Simulation of the venture data from the fund start date to the fund maturity date is performed. Using the acceptance criteria and simulated data enables the automatic selection of specific ventures for inclusion in an investment pool. Investment pool data, economic conditions, and a proposed fund structure are then used for bond/derivative, default, reserve, and risk/return modeling to generate a new fund structure, prioritized units, bond and derivative data, and PIP units. Once the modeling is complete, the processing elements send both the simulation and modeling results to the parallel engine component, using a gather technique, which then sends all data to system control.

Consider that the parallelization used by the present invention uses the relationship between the input variable attributes and their ability to change the number of loop iterations within the code. This means that the system can automatically adjust the number of processing elements and thus the processing time on the fly. This can be overridden by the system operator to not spawn any additional instances of the parallelized code, which is exactly the same as using the single processing element version of the system.

Figure 25:
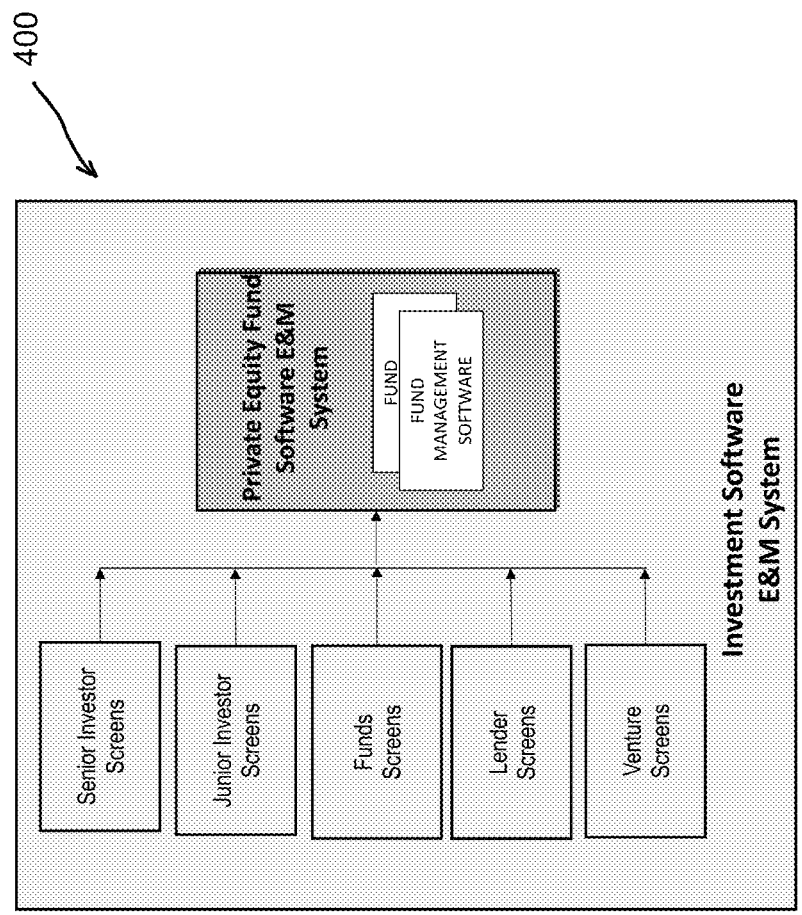
FIG. 25 is a block diagram of a stand-alone software E&M system where the user interface is in the same computing hardware as the computational and data storage portions of the system, in accordance with embodiments of the present invention.

As shown in FIG. 25, the stand-alone deployment embodiment 400 includes all input and output data screens (e.g., FIGS. 18-23) as well as any system-required memory or data storage and any conventional private equity fund management software all on the same hardware platform. Typically, this hardware platform is a laptop or desktop computer system. Communication between the stand-alone E&M System and more than one investor takes place external to the E&M System, making this deployment model too simple for most private equity funds. This embodiment is primarily used to enhance the investment strategy of high-net-worth individuals. It is particularly effective if the individual is already participating in a fund, but neither starting from scratch nor leaving an existing fund is required.

Figure 26:
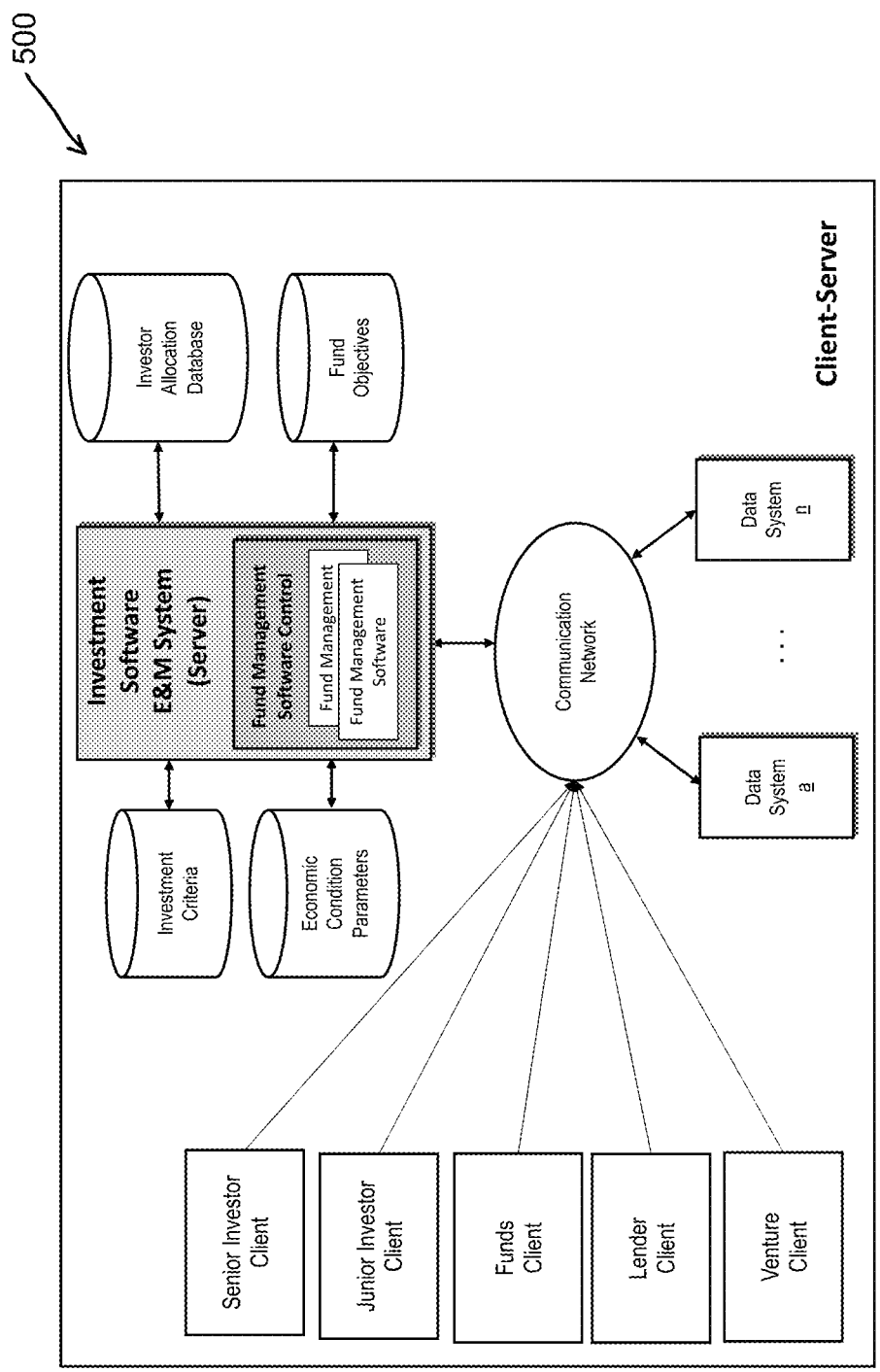
FIG. 26 is a block diagram of a centralized client-server-based software E&M system where the user interface occurs using one or more network-attached computing devices or appliances and whose computation and data storage occur in a centralized server system, in accordance with embodiments of the present invention.

Referring to FIG. 26, the centralized deployment embodiment 500, FIG. 26 is a client-server system with all required actors accessing the system using client software and a communication network. Although a client-server-based centralized systems offers good performance and reasonable scaling, it does not offer global scaling. Because the computation and data storage can take place on the server, it is possible for the input-output screens to be placed on very small devices, like laptops, tablets/pads, and cell phones while any computationally intense processing such as simulation or modeling can occur on the servers. Typically, the clients are connected to the server or servers via a private network. Data storage for the system is stored primarily on the server side, and the data storage of the client side is used to cache already accessed data so that the performance of the overall system is increased and the bandwidth requirements are decreased. Splitting the processing into parallelizable and static components (as disclosed in U.S. Pat. No. 10,496,514, which is fully incorporated herein by reference) also means that mundane (static) tasks can be performed using the client application hardware, freeing up processor bandwidth at the server level for parallel tasks. Medium-sized organizations that have accessible centralized data or compute resources benefit the most from this embodiment.

Figure 27:
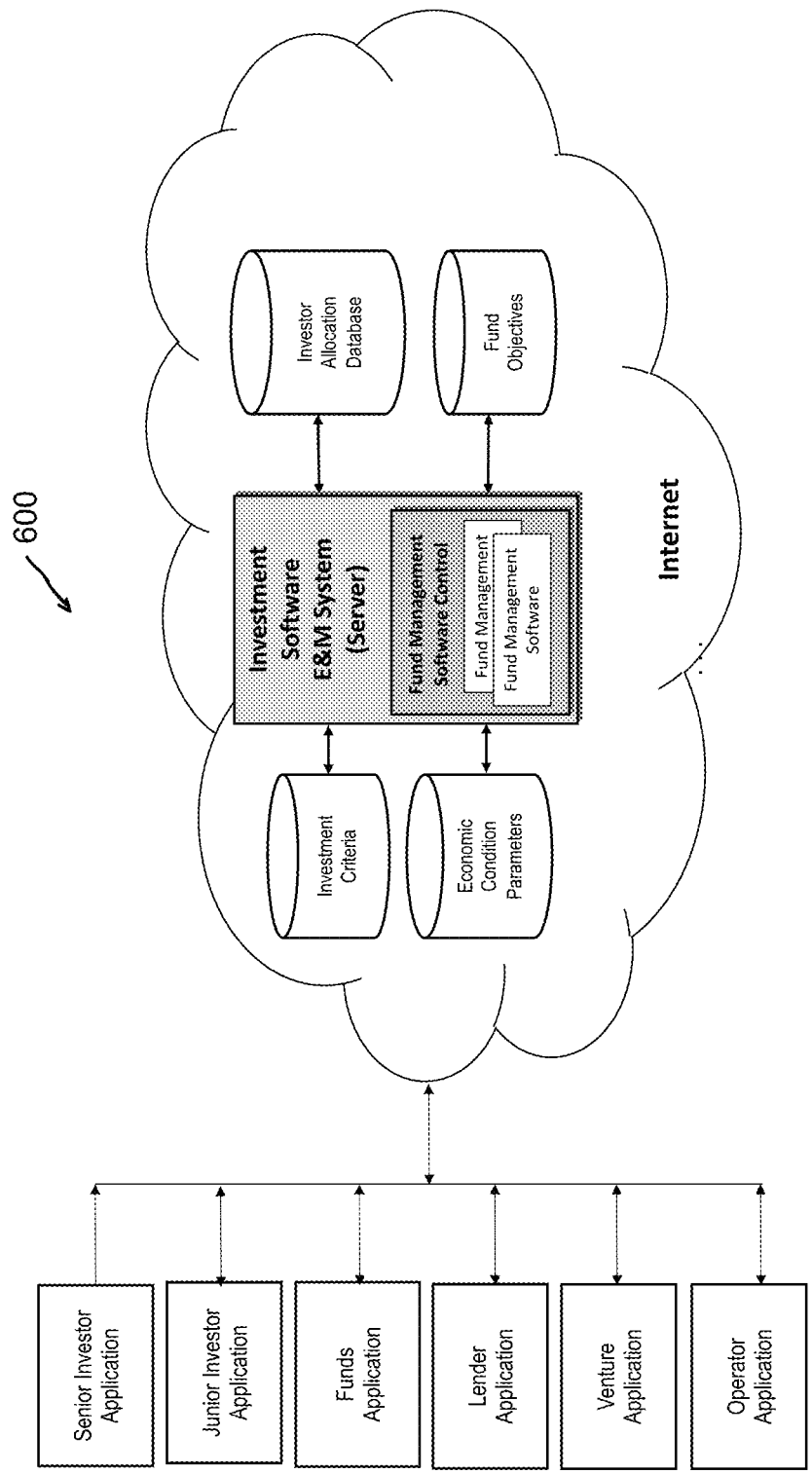
FIG. 27 is a block diagram of a decentralized cloud-based software E&M system where user interface and local data storage occur in one or more application programs that reside on one or more computing devices or appliances and either the primary storage and/or the primary computation and storage occurs on one or more servers, in accordance with embodiments of the present invention.
Figure 28:
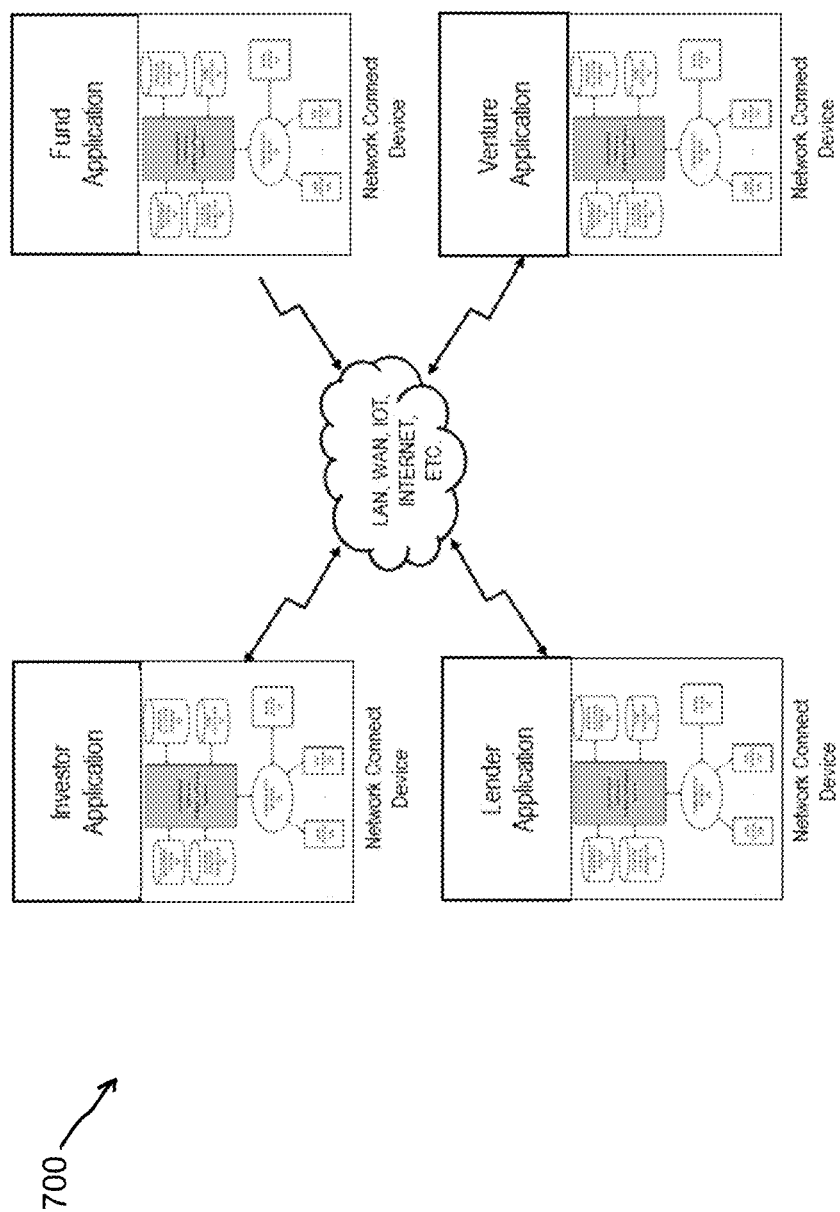
FIG. 28 is a block diagram of a decentralized ad hoc-network-based software E&M system where the user interface, data storage, and processing occur in one or more application programs that reside on one or more network-linked computing appliances that are not permanently part of any specific network of computing appliances, in accordance with embodiments of the present invention.

Referring to FIG. 27, the decentralized, cloud-based deployment embodiment 600 uses an application that connects to a server or servers using the internet. Unlike the centralized embodiment, the cloud-based embodiment is globally accessible but that means it can have higher security concerns. These concerns include off-site storage of the finished results and the possible interception of partial processing results by external actors, requiring the use of encryption. Analogous to the centralized embodiment, computation and data storage can take place at the server level and input-output screens can be placed on very small devices, like laptops, tablets/pads, and cell phones, while any computationally intense processing such as simulation or modeling can occur on the cloud-based servers. Here, data storage for the system can be stored primarily on the cloud-based server side, and the data storage of the client-side application is used to cache already accessed data so that the performance of the overall system is increased and the bandwidth requirements are decreased. Here, too, splitting the processing also means that mundane tasks can be performed using the client application hardware, freeing up processor bandwidth at the server level. Large-scale, geographically dispersed organizations are best served using this embodiment.

As shown in FIG. 28, the decentralized, ad hoc deployment embodiment 700 uses multiple small mobile devices to both carry the input-output screens and perform any intensive processing. It uses distributed computing and data storage to enable it to perform the same duties as the client-server embodiment. A minimum number of devices connected together in an ad hoc fashion, with enough redundancy that computations are not interrupted. This embodiment is the least expensive of the network-connected models of the E&M system to deploy because there is no set of operator-controlled servers and no centralized client-server system, but since it only works well if there are sufficient devices, high-density areas are the best locations for deployment. High density can be achieved either in large metropolitan areas or through the use of the Internet of Things (IoT). Small groups of geographically constrained high-net-worth individuals are best served using this embodiment.

Figure 29:
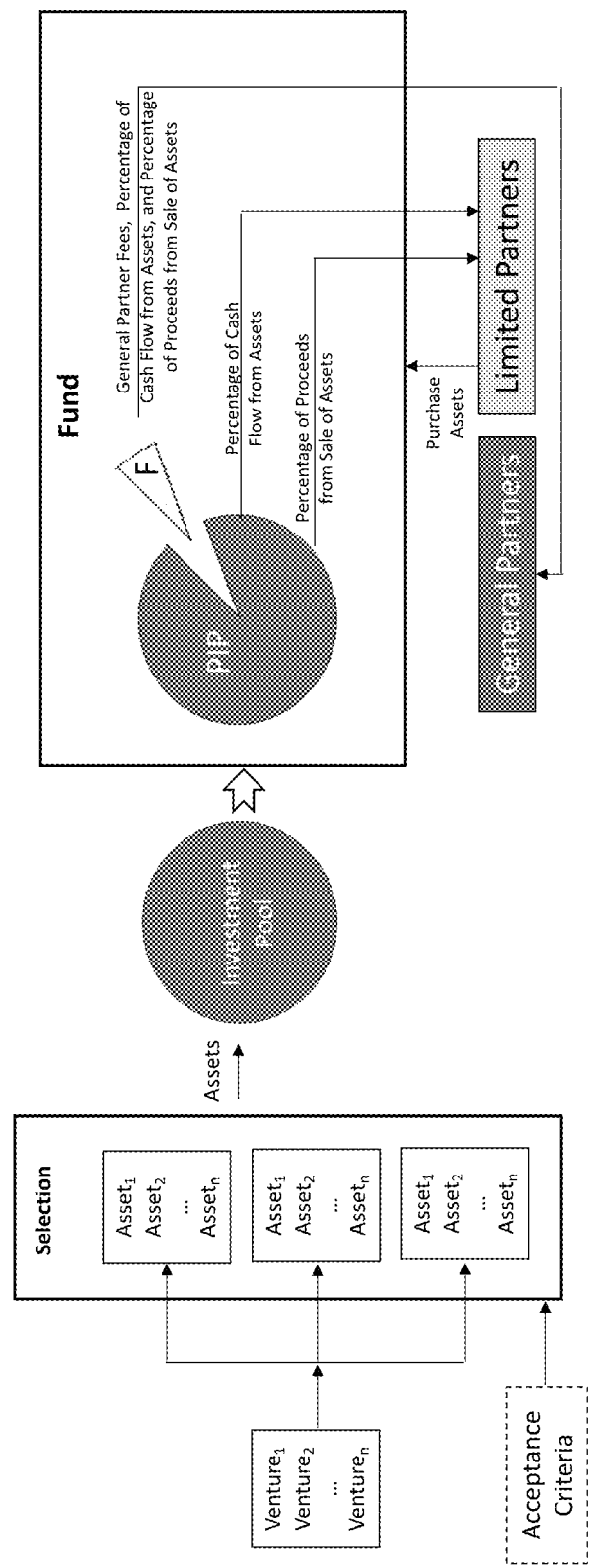
FIG. 29 is a diagram of the workflow showing a conventional limited partnership (LP) arrangement, in accordance with embodiments of the present invention.

As shown in the workflow of FIG. 29, in conventional limited partnership software, the assets of multiple ventures are pooled. It should be noted that the various ventures must not already be associated with a fund. The assets of the various ventures are manually analyzed and those that meet the criteria for inclusion within a to-be-created private equity fund are grouped together into an investment pool. The general partners (GPs) identify their fees and their percent of the cash flow to be generated by the assets of the investment pool. The GPs also identify some number of units for sale by them, and those units are associated with the investment pool assets and organized as a fund. The units are purchased by the limited partners (LPs). The bulk of the proceeds is then used by the GPs to purchase the assets on behalf of the fund and called the principal invested in the portfolio (PIP). During the life of the fund, the assets may generate cash flow. This generated cash flow is shared by both the LPs and the GPs on a pari passu basis. The fund exists until its maturity date then the assets, if any, are sold and the proceeds of the sale distributed to both the LPs and the GPs. There are four primary differences between the operational embodiments of private equity fund software enhanced using the current invention, the E&M System, and conventional private equity fund software utilizing the traditional pari passu limited partnership. First, both the assets of ventures already managed using a traditional fund management software and the assets of unmanaged ventures can be input into the E&M System. Combining the assets of multiple ventures, whether from multiple managed funds or from both managed and unmanaged ventures, can lower risk and increase returns if done properly. Second, the E&M System uses a combination of simulation and system-operator-given acceptance criteria to automatically analyze the cash flows and select the best-fitting ventures and their associated assets for pooling. The pooled assets are associated with PIP units, analogous to the traditional private equity limited partnerships but the association in this case is automatic, and are made available for purchase. Third, cash flows from investment pool assets are automatically modeled by the E&M System, generating a new fund structure, prioritized units, bond/derivative data, and PIP units. New funds consist of PIP units, PIP-asset-associated prioritized units organized as rRAVs, bonds used for reduced outlay investing (R.O.I.), and derivatives used for increased rate of return (I.R.O.R.) enhancement. Fourth, while a traditional private equity fund includes a single category of limited partner investors associated with PIP-unit assets, a fund enhanced by the E&M System can consist of multiple limited partner investor categories, each with its own risk/return expectations and each associated with a different prioritized unit type. These software enhancements are shown applied to conventional private equity fund software in FIG. 31.

Figure 31:
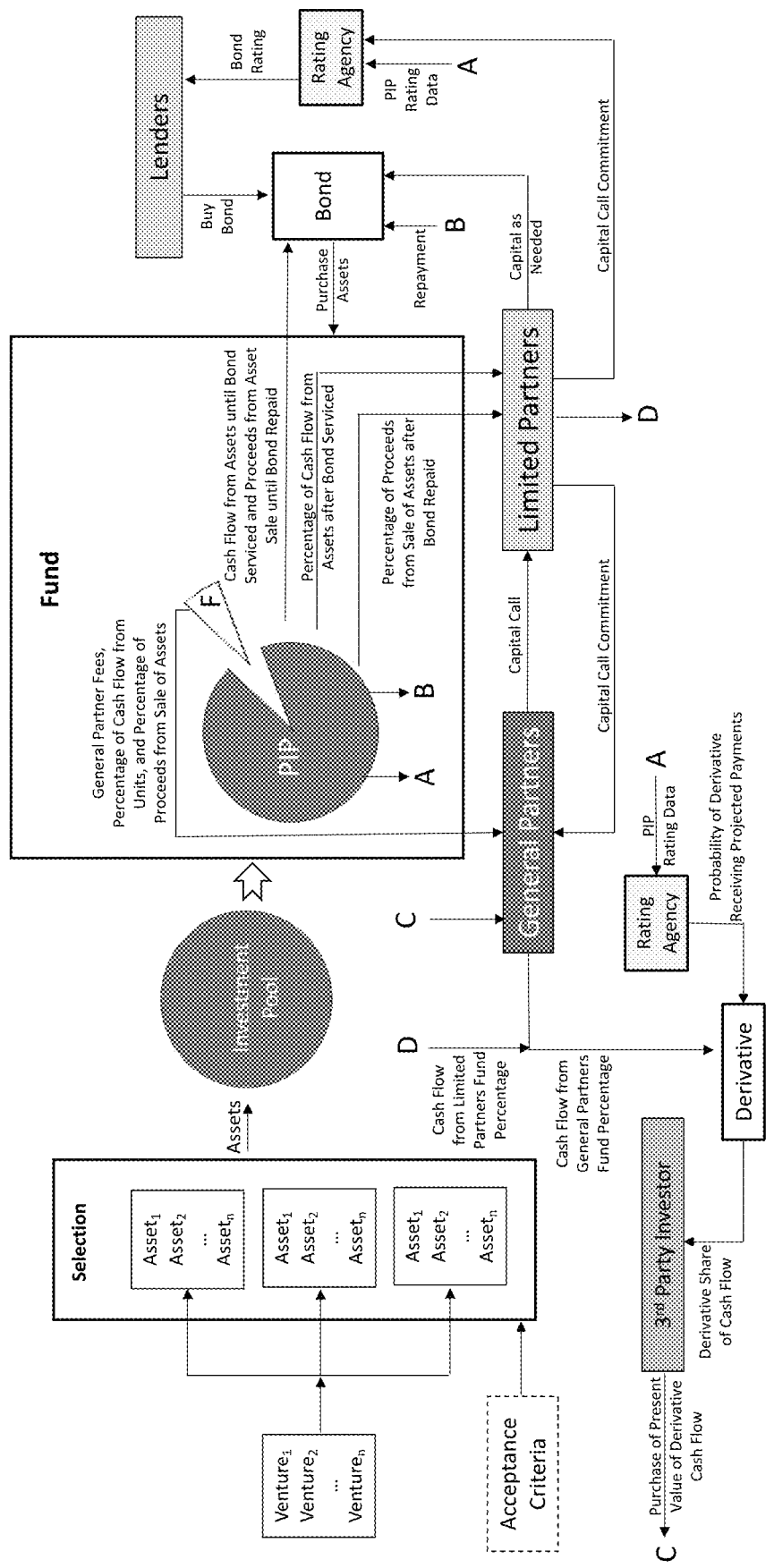
FIG. 31 is a diagram of the workflow of a conventional limited partnership where the limited partners benefit from the reduced outlay investing (R.O.I.) method and the general partners benefit from the increased rate of return (I.R.O.R.) method, in accordance with embodiments of the present invention Limited partners can benefit from both the R.O.I. and I.R.O.R. methods separately or together.

The automatic simulation of the ventures by the E&M System provides a multi-year projection, from some starting date to some maturity date, of the cash flows that can be expected from various assets. Once these cash flow projections, their pay periods, and the probability of the occurrence of a payment is combined with the given acceptance criteria, the best-fitting ventures, along with their associated assets, are automatically selected to be included in the investment pool that will form the basis of a to-be-created private equity fund. The investment pool data is then used with a system operator-given proposed fund structure and economic data for bond/derivative, default, reserve, and risk/return modeling to generate a new fund structure, prioritized units, PIP units, and bond/derivative data. The modeling also determines the acceptable GP fees, cash flow percentage, and percentage of asset sale proceeds from the system-created and GP-sold PIP units. PIP-unit assets are associated with prioritized units organized as rRAVs. Prioritized units are associated with investor categories, labeled here primarily as A units and B units. System-generated new funds consist of rRAVs, bonds used for R.O.I., and derivatives used for rate of return enhancement. Except for the simplest use of the present invention for enhanced conventional limited partnerships, as shown in FIG. 31, all uses of the present invention share the common steps of the input of both fund-managed and unmanaged ventures, automatic simulation and selection of ventures for pooling, and the automatic modeling to generate new structured funds in which PIP-unit assets are associated with prioritized units which are associated with investor categories.

Figure 30:
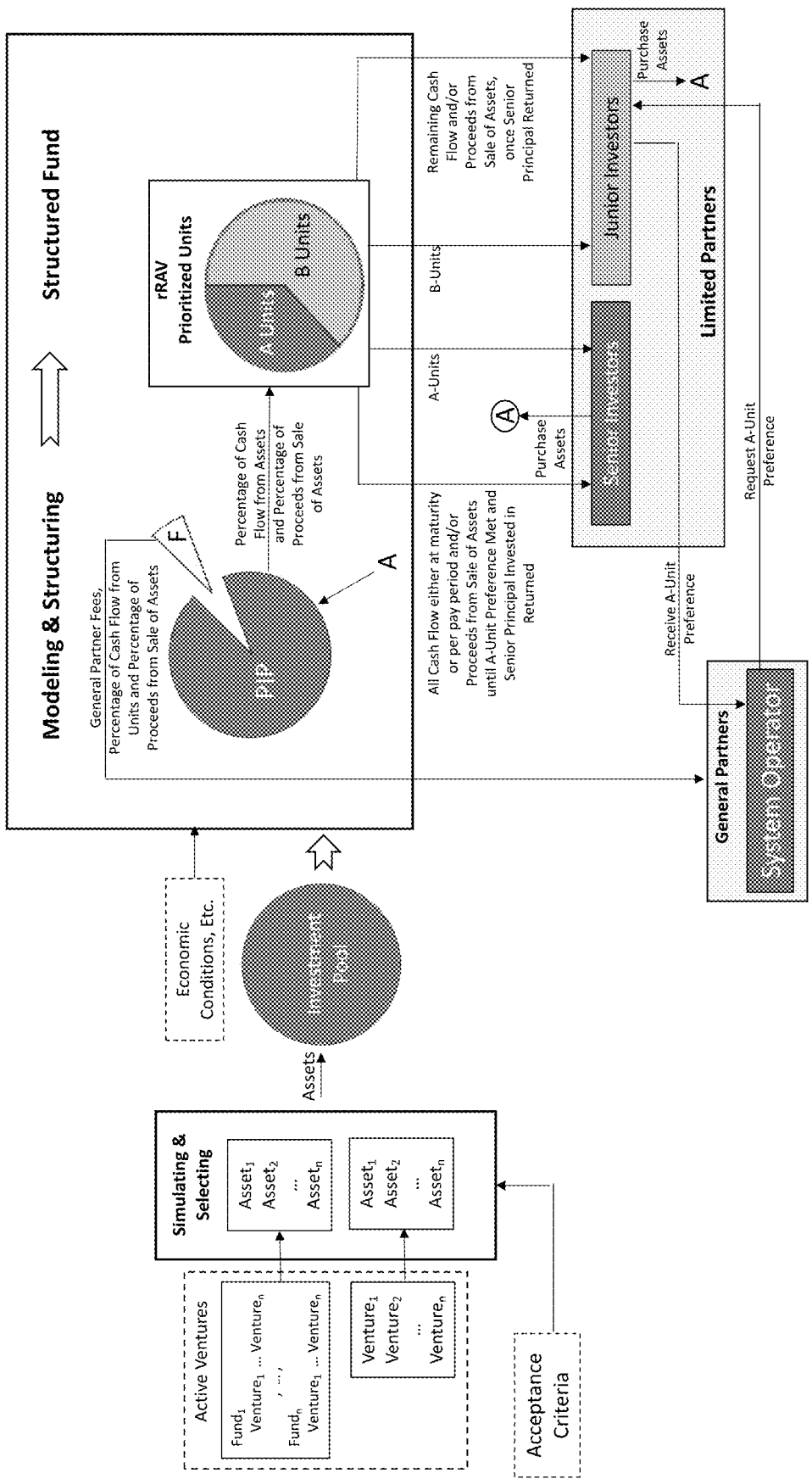
FIG. 30 is a diagram of the workflow for an A/B structure where A-unit holders receive all cash flow and/or proceeds from the sale of assets until A-unit obligations are met, then B-unit holders receive all remaining cash flows and/or proceeds from the sale of assets, in accordance with embodiments of the present invention. Alternatively, A-unit holders receive all cash flow until its preference has been met for the current pay period and the proceeds from the sale of assets until the principal used to purchase "A" units has been paid.
Figure 32:
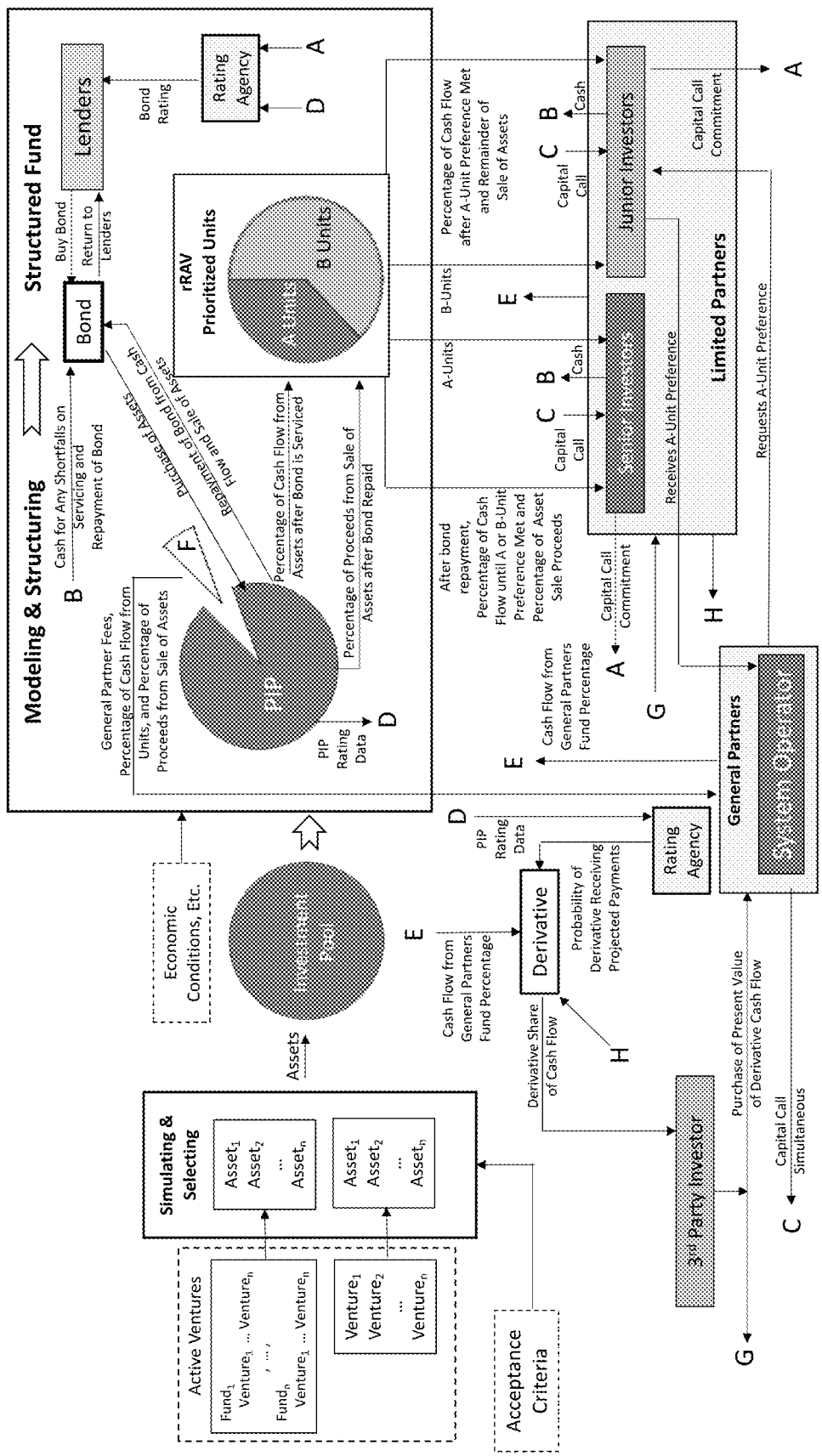
FIG. 32 is a diagram of the workflow for an A/B structure with an A-unit preference, enhanced using the I.R.O.R method from the expected percentage of cash flow (to GPs, LPs, or both) and the R.O.I. method for capital calls, in accordance with embodiments of the present invention. The I.R.O.R and R.O.I methods can be used separately or together.

The workflows of FIG. 30 and FIG. 32 use A/B structures and show the limited partners comprised of junior and senior investor categories, although as stated before, any number of investor categories can apply. The senior investors obtain A units and the junior investors B units. A-unit obligations, or senior preferences, decrease risk for A-unit holders by paying a fixed percentage of cash flows or asset sale proceeds before other unit holders receive their cash flows or proceeds, either per pay period or at some maturity date as in FIG. 30. Any time there is a preference given to one investor category over another, there is an agreement facilitated by the GPs between the categories. Further, the percentage of the fund's cash flow and proceed sales plus the fees given to the GPs from the LPs require an agreement between all of the fund's associated LPs and the GPs.

Each investor category has its own cash flow preferences, asset sale preferences, capital call preferences, cash flow percentage, and asset sale proceeds percentage and/or conditions. The A/B structure units are associated with PIP units which are purchased either directly by senior and junior limited partners or by the use of bond proceeds where the senior and junior limited partners give capital call commitments in lieu of cash. The cash flows from the associated PIP assets flow through the associated units of the A/B structure to the associated senior and junior limited partners. If a bond is used, then the various categories of investors give a capital call commitment for some percentage of the bond used to purchase the PIP assets. Once the PIP assets are purchased, the cash flows associated with prioritized units are transferred to the investor whose capital call commitment was used for the purchase, in a manner analogous to the direct purchase of assets. Transferring prioritized units to investors rather than the pari passu distribution of cash flow values increases the flexibility of the E&M System.

General partners and limited partners have different options, depending on the results of the modeling and structuring of the selected assets by the E&M System. Different options decrease risk, which is the same as decreasing the error margins of the projected data values, and/or increase returns by offsetting costs, which is the same as augmenting data values in the system. These options allow the system to manipulate the outputs of the conventional fund software to automatically add new functionality.

The workflow of FIG. 32 shows a number of further software enhancements applied to limited partnership software by the E&M System using the A/B structure as well as the R.O.I. and I.R.O.R. techniques, giving general and limited partners multiple additional options to decrease risk and increase returns. While limited partners back bonds with capital call commitments, both limited and general partners can use their cash flows to define a derivative for sale to a third party, with either or both benefitting from an increased rate of return.

Figure 33:
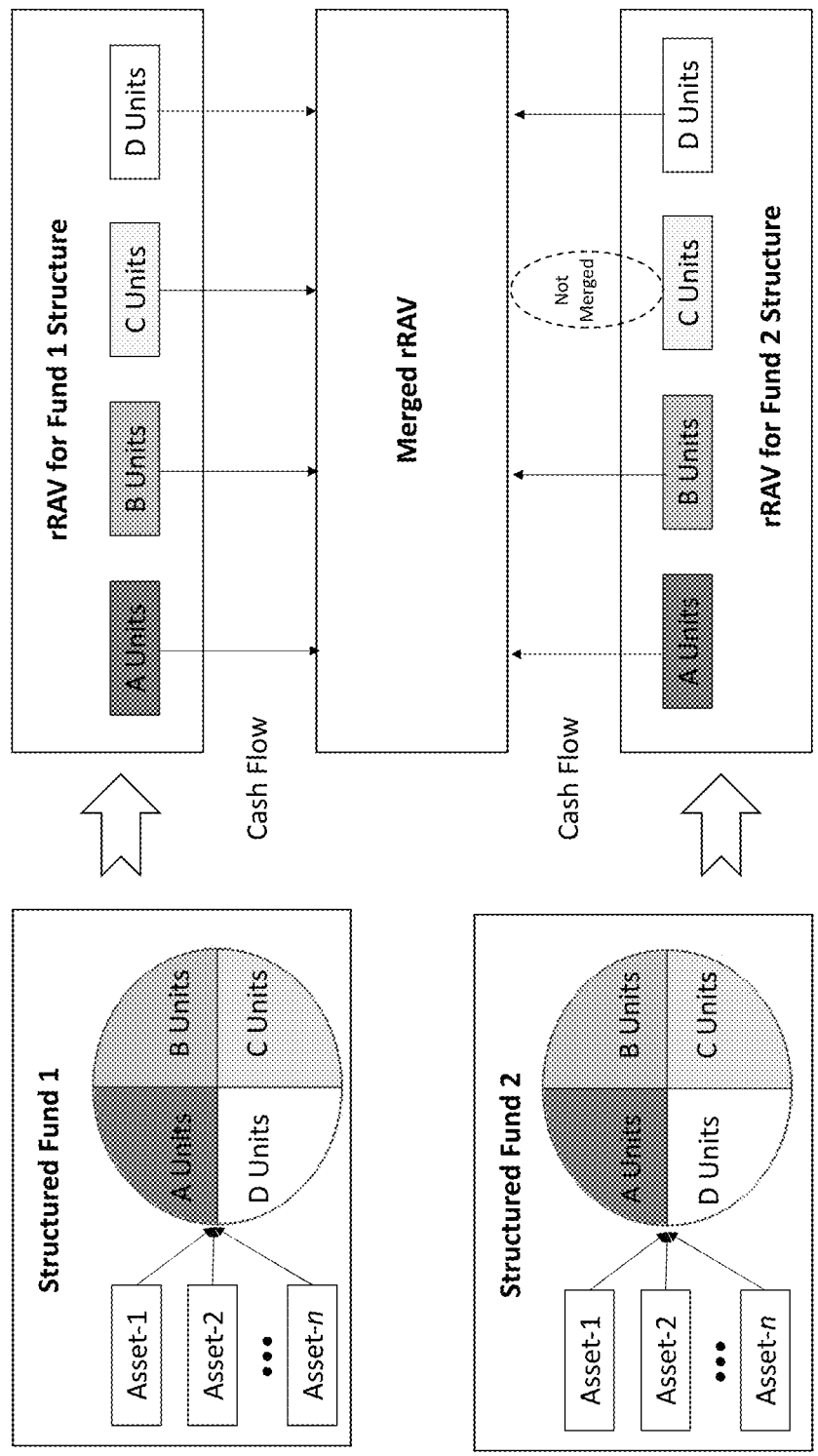
FIG. 33 is a diagram showing some or all of the cash flows from two funds structured in separate Risk/Return Allocation Vehicles (rRAVs) automatically being merged into a new rRAV by the system, in accordance with embodiments of the present invention.

Instead of showing another A/B fund structure, the workflow of the operational embodiment in FIG. 33 shows A/B/C/D fund structures, indicating the expandability of these structured funds. This method assumes that one or more structured funds are currently generating cash flows. Some or all of the unit cash flow returns from one or more rRAVs are automatically merged into a new rRAV that can effectively serve as the basis of a new fund, eliminating the need to select ventures. The cash flows of the merged rRAV can be modeled to create a new set of risk/returns. This embodiment makes it possible to automatically generate a new investment opportunity.

Figure 34:
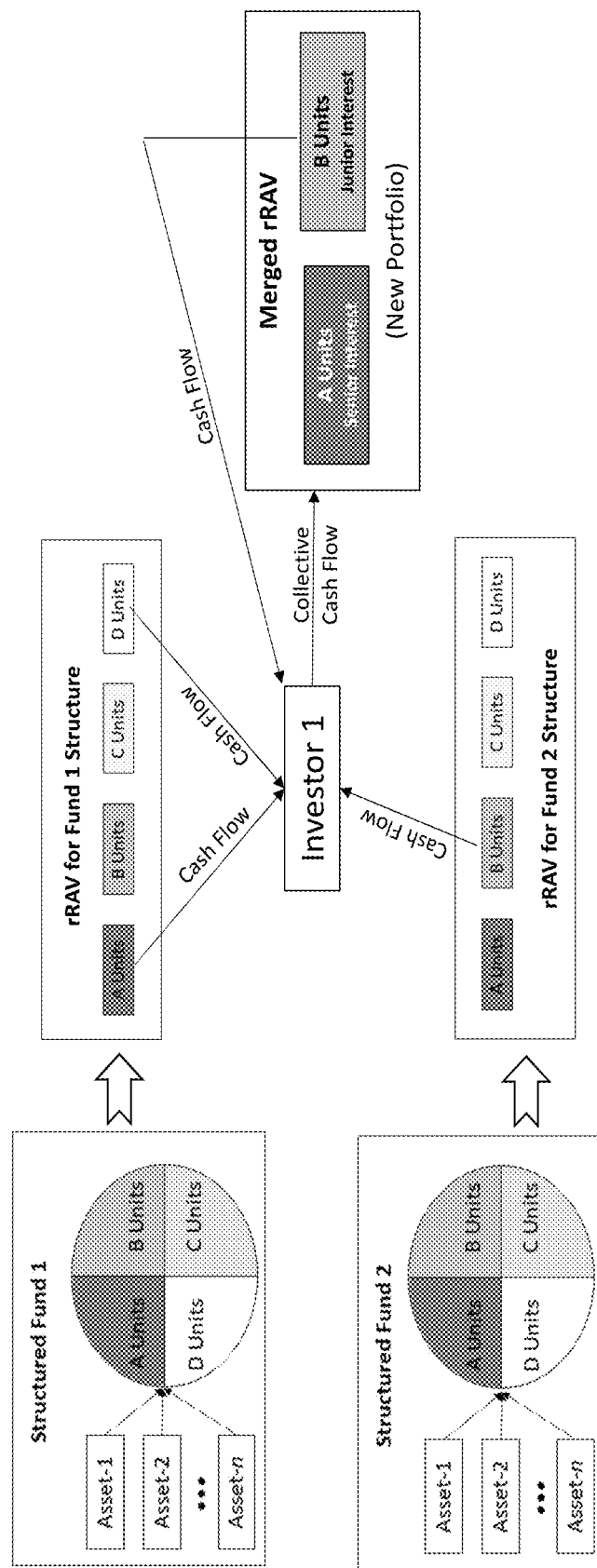
FIG. 34 is a diagram showing cash flows and payments from one or more-unit types of one or more rRAVs directed by an investor to a new merged rRAV that can serve as the basis of another fund, in accordance with embodiments of the present invention.

The workflow of the operational embodiment in FIG. 34 also shows A/B/C/D fund structures, but unlike the system-directed merging shown in FIG. 33, the merging here is investor-directed. This embodiment offers the opportunity for cash flow merging to the LPs, whether senior or junior, to direct some or all of their cash flow returns to be merged into a new rRAV.

Figure 35:
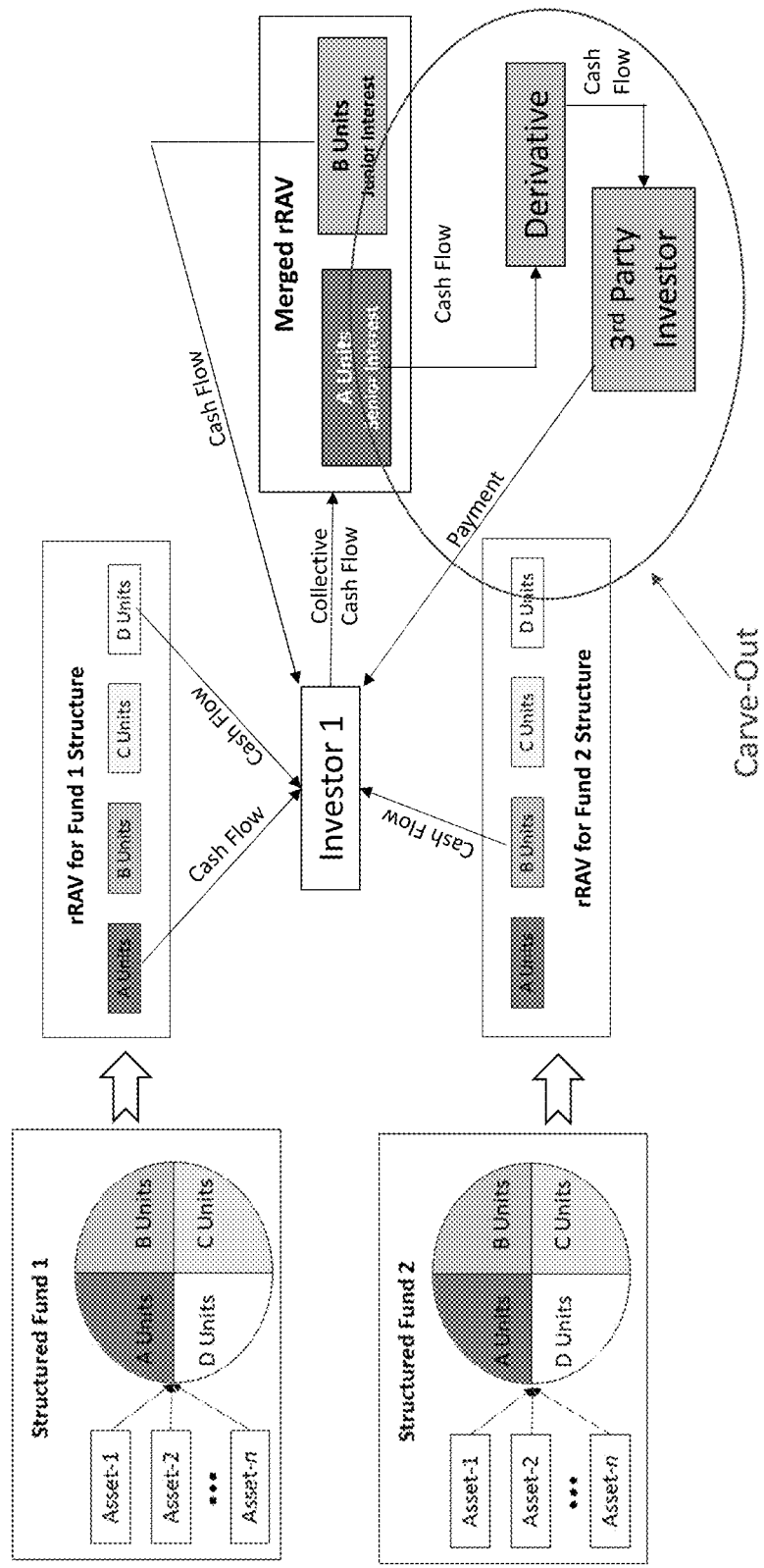
FIG. 35 is a diagram showing an investor-directed merged rRAV with a cash flow carve-out used to create a derivative that can be sold to a third party, in accordance with embodiments of the present invention.
Figure 36A:
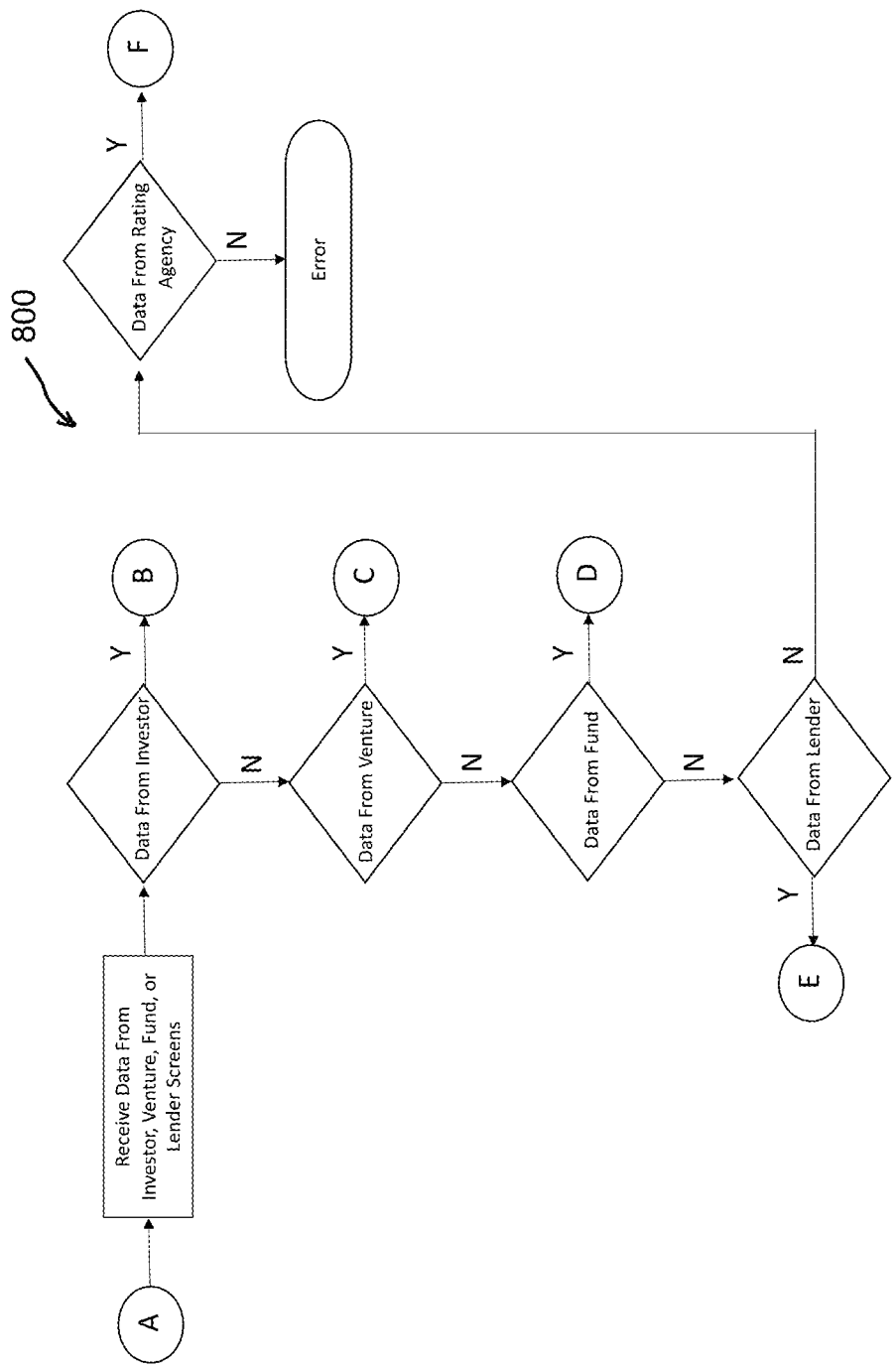
FIGS. 36A-36J depict a multi-figure, multi-page flow chart of the software E&M system used in a private equity fund management environment, in accordance with embodiments of the present invention.
Figure 36B:
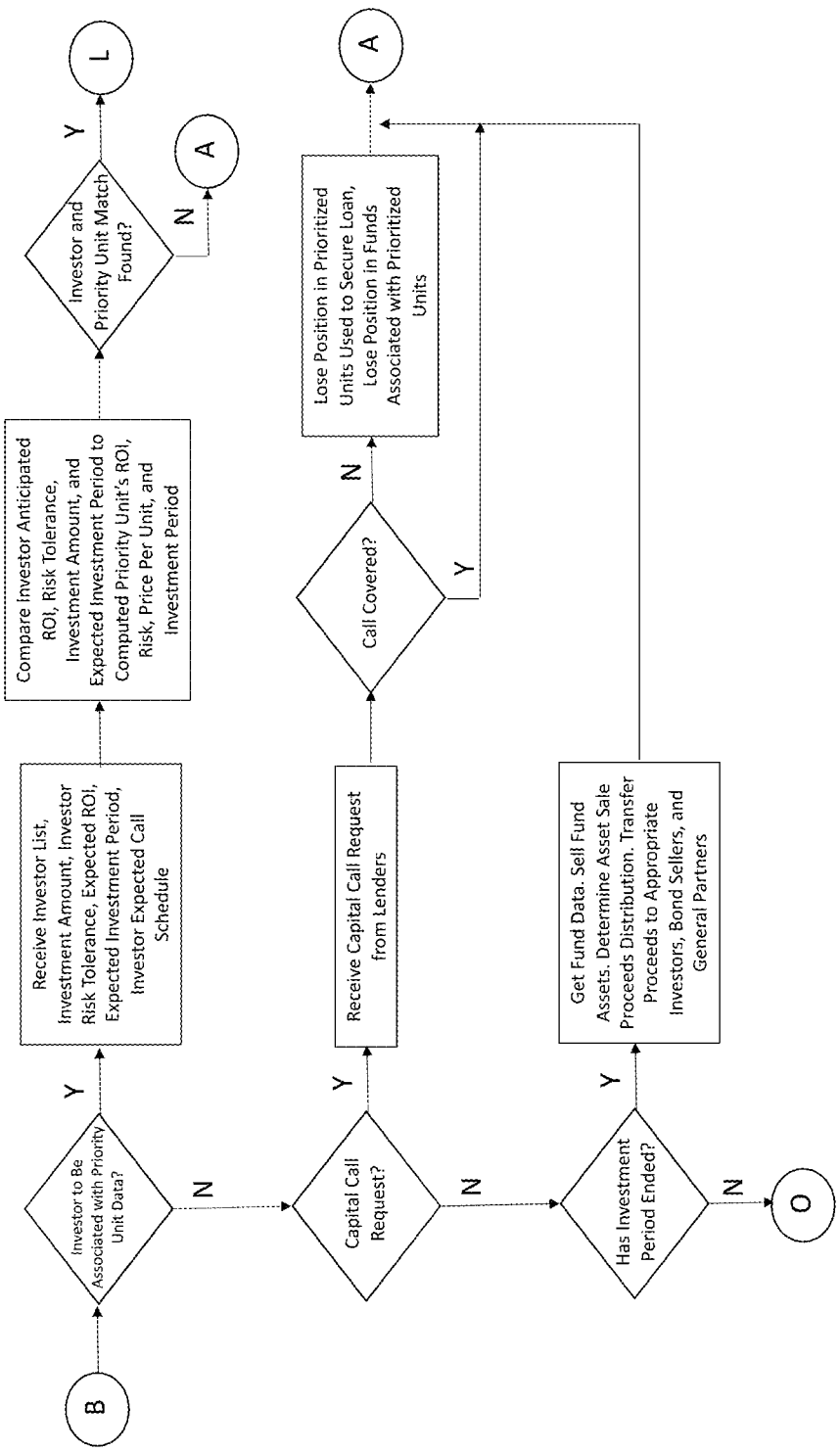
Figure 36C:
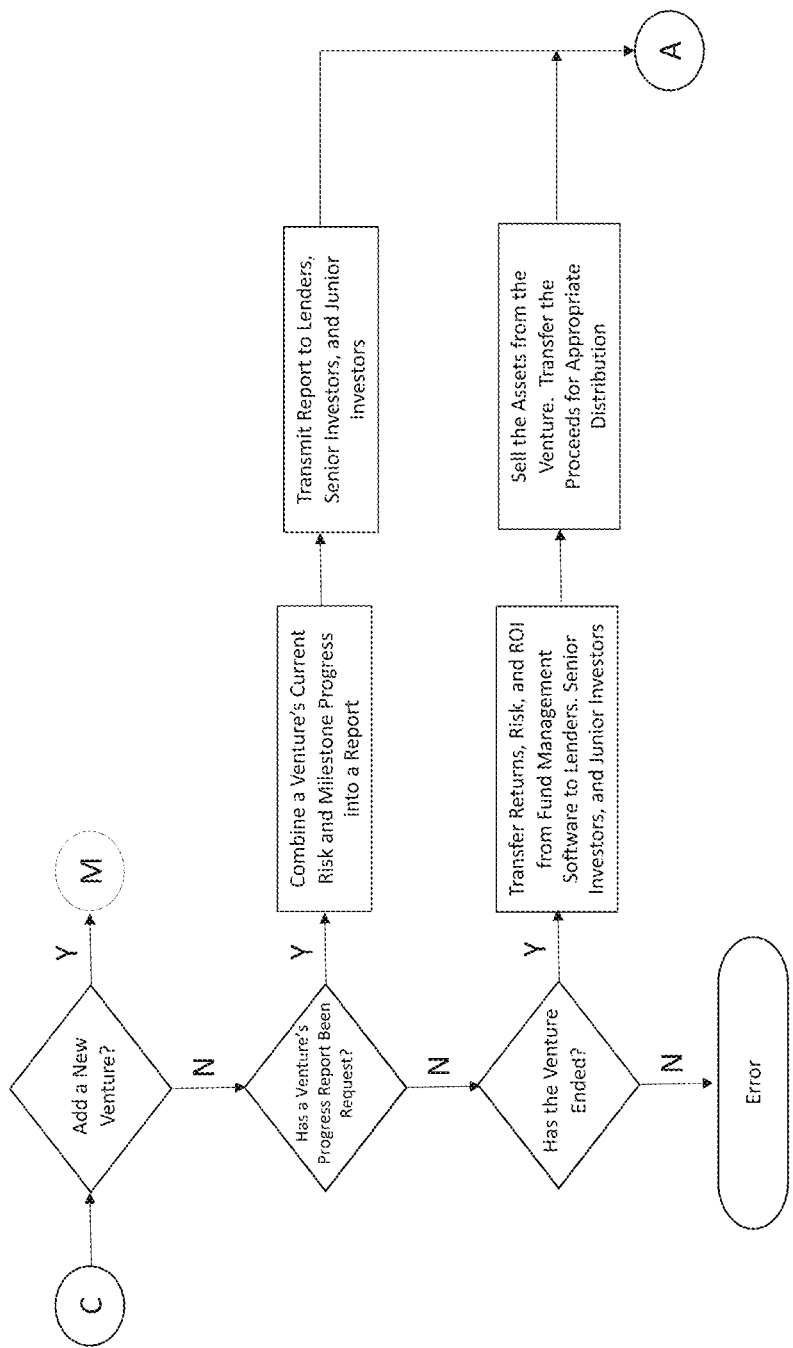
Figure 36D:
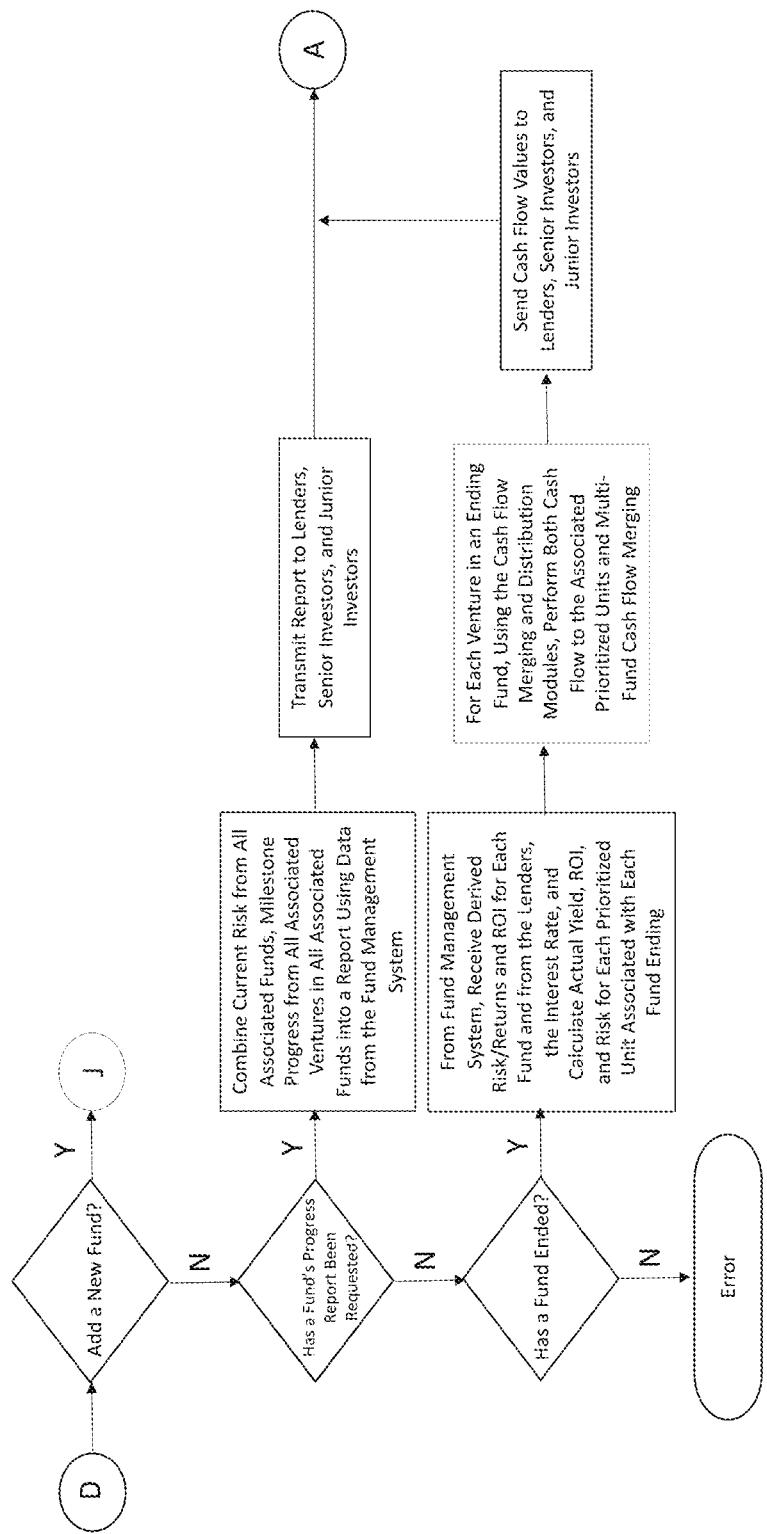
Figure 36E:
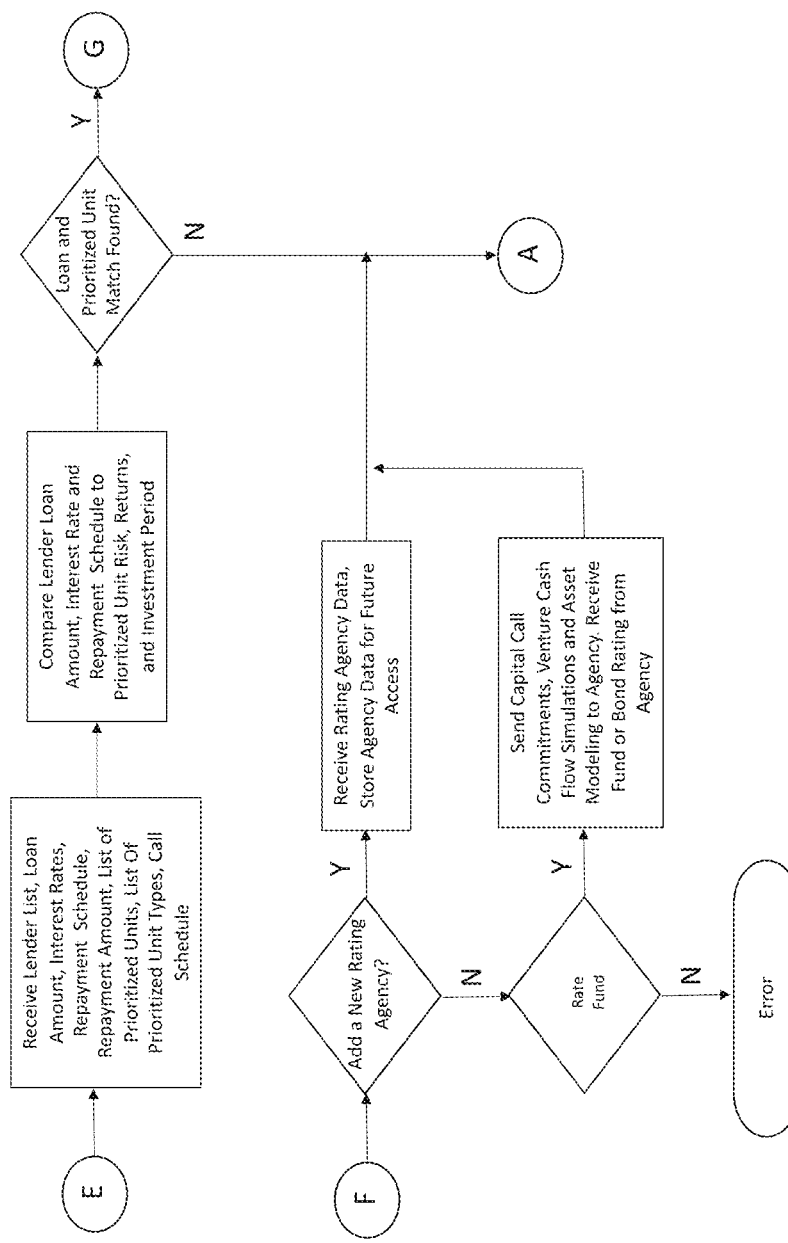
Figure 36F:
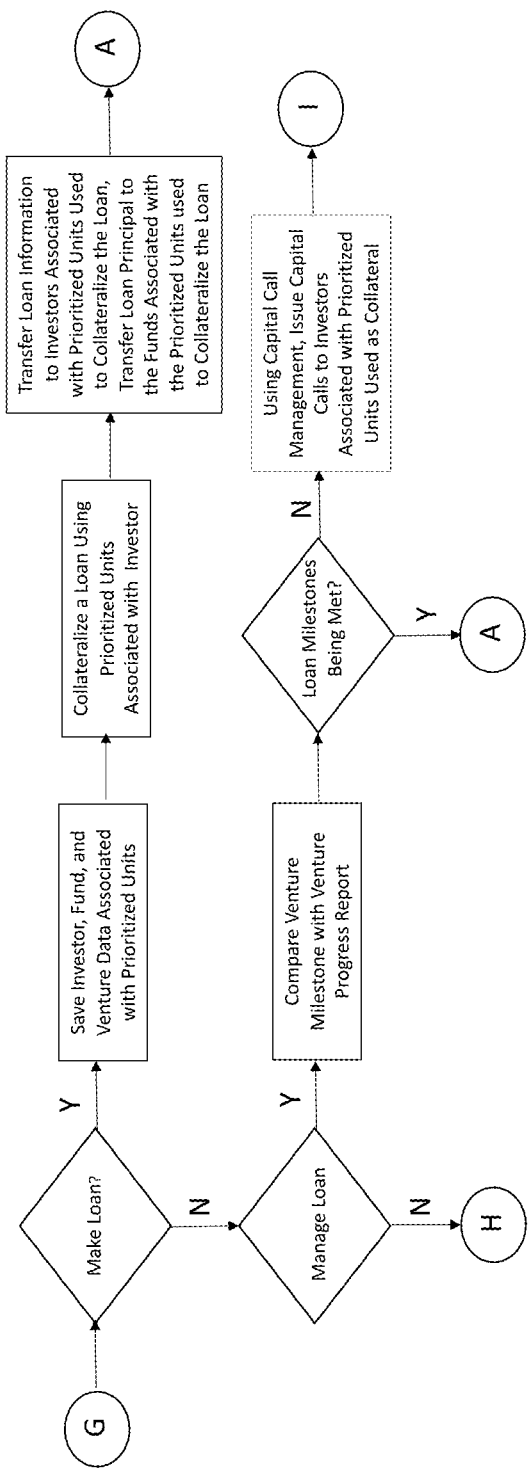
Figure 36G:
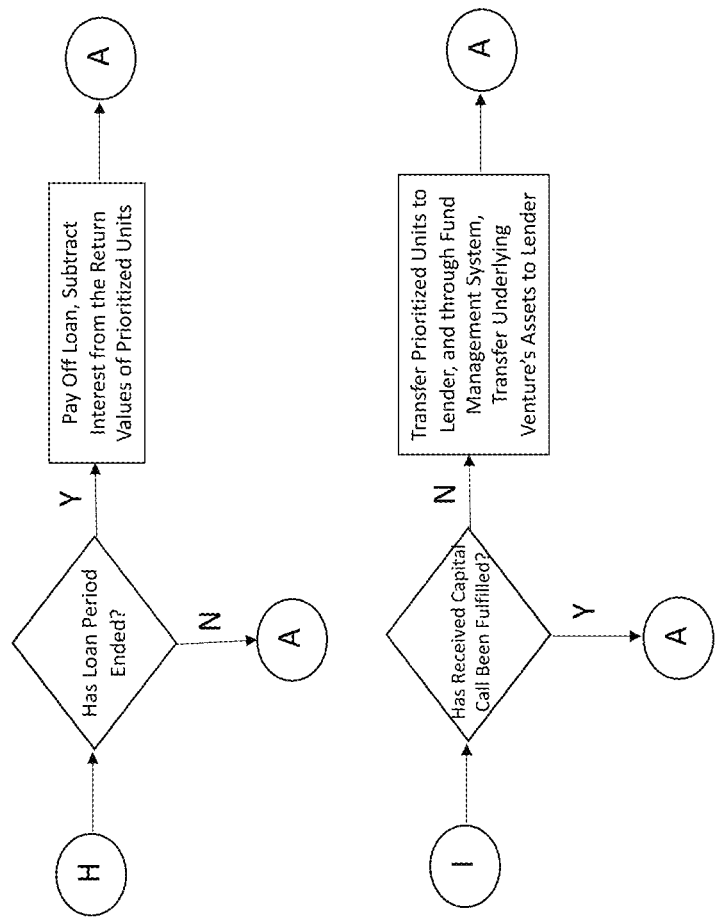
Figure 36H:
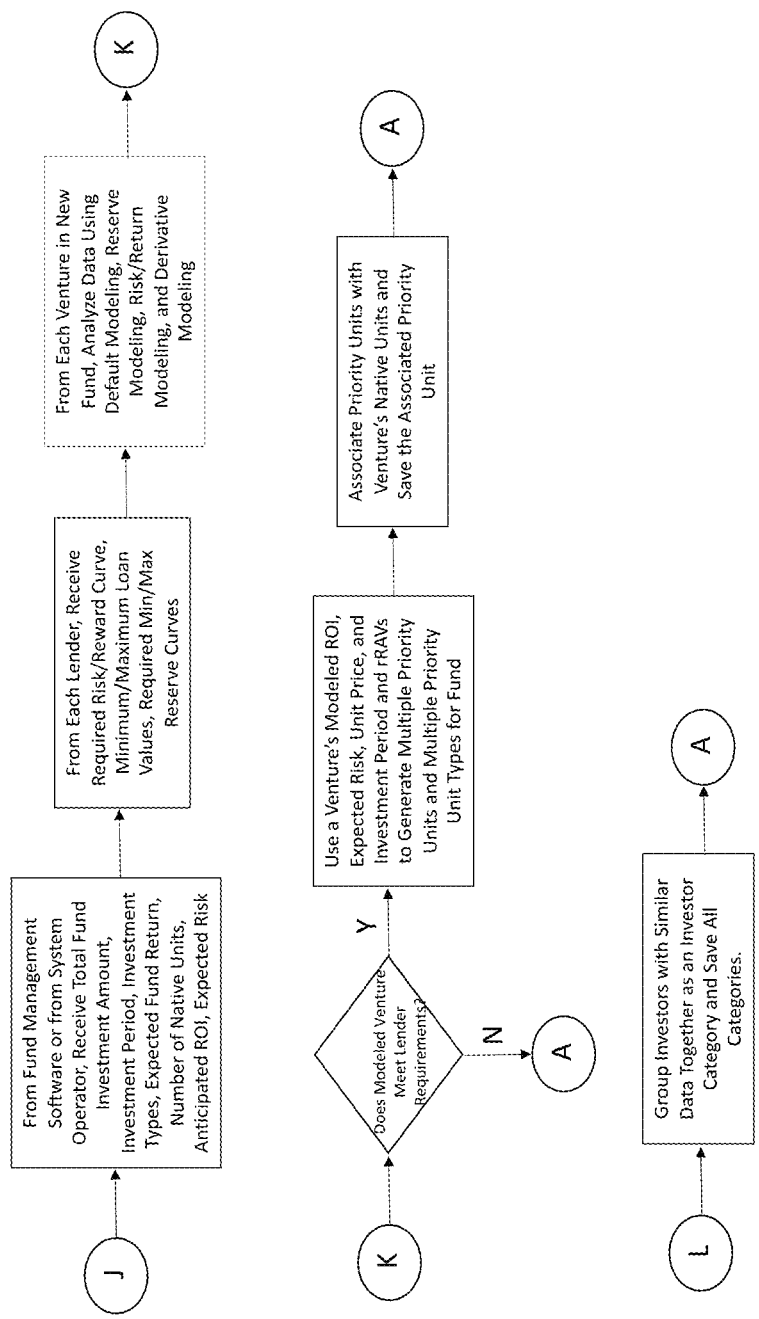
Figure 36I:
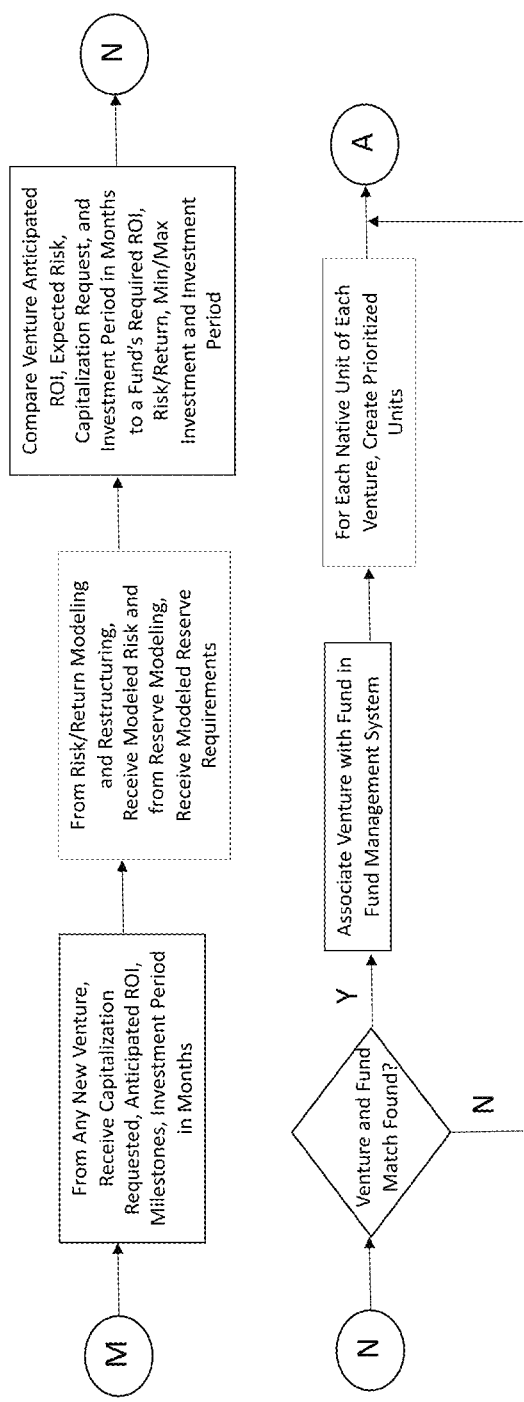
Figure 36J:
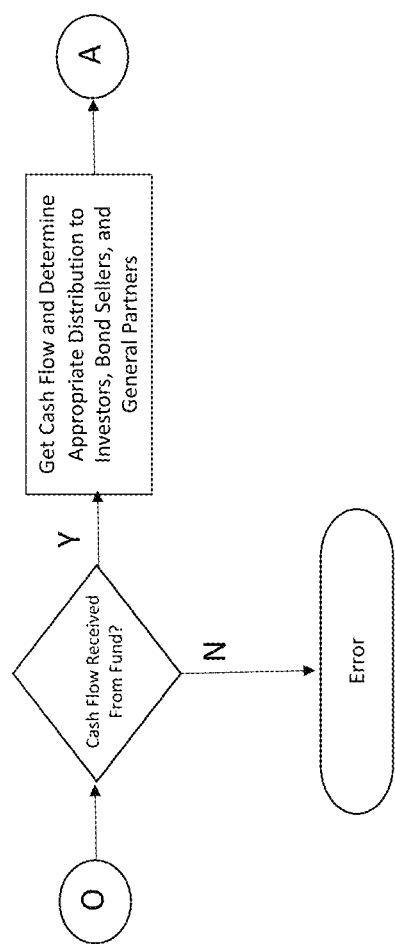

The investor-directed rRAV merging in FIG. 35 offers a carve-out opportunity. With this carve-out, the cash flows of the senior units of the new rRAV are used by the primary investor to create a derivative which is purchased by third-party investors, allowing the primary investor to obtain immediate returns while retaining the A-unit assets. The sale value of the derivative is the discounted value of the cash flow over the remaining life of the fund.

FIGS. 36A-36J combine to provide a detailed flow chart of an exemplary fund software enhancement and management software system 800 that depicts and describes the steps and methodology of embodiments of the present invention, including the systems 50, 200, and 300 detailed herein (e.g., FIGS. 7-8A).

This system and method is used to store and retrieve data concerning various fund investors, ventures that are capitalized via the fund, and fund operators. The typical fund management software contains information on a venture's risk, return on investment, milestones, milestone progress, capital on hand, capital requirements, and maturity. This information is at least accessible to the system and system operator. The system operator's interface, or a dedicated interface if available, can be used by the present inventive systems to access this same information.

For such financial software, standard information, such as a fund's underlying venture capital requirements, anticipated risk, native investment units (stocks), and anticipated return on investment, is used by the E&M System to generate a fund structure that allows for the creation of a set of risk/returns based on the venture's native risk/returns instantiated as a set of derived investment units called prioritized units. These prioritized units are associated with a set of native assets, thus allowing the standard fund management software to continue in its traditional role. The prioritized units are then associated with a new set of funds and bonds that are used to leverage the return on investment of the prioritized units and therefore the underlying native values.

Certain concepts, systems, and methods of a stand-alone deployment embodiment of the present invention comprise externally (external software E&M system—e.g., external to the existing or conventional software application) controlling, enhancing, and managing private equity fund management software, without changing the source code of the fund management software, using a single stand-alone computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a centralized client-server deployment embodiment of the present invention comprise externally controlling, enhancing, and managing private equity fund management software, without changing the source code of the fund management software, using a centralized client-server computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a decentralized cloud-based deployment embodiment of the present invention comprise externally controlling, enhancing, and managing private equity fund management software, without changing the source code of the fund management software, using a decentralized cloud-based computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a decentralized ad hoc network-based deployment embodiment of the present invention comprise externally controlling, enhancing, and managing private equity fund management software, without changing the source code of the fund management software, using a decentralized ad hoc network-based computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a stand-alone deployment embodiment of the present invention comprise internally (embedded software E&M system—e.g., embedded in the existing or conventional software application) controlling, enhancing, and managing private equity fund management software by embedding some or all of the present invention into the source code of the fund management software, using a stand-alone computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a centralized client-server deployment embodiment of the present invention comprise internally controlling, enhancing, and managing private equity fund management software by embedding some or all of the present invention into the source code of the fund management software, using a centralized client-server computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a decentralized cloud-based deployment embodiment of the present invention comprise internally controlling, enhancing, and managing private equity fund management software by embedding some or all of the present invention into the source code of the fund management software, using a decentralized cloud-based computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Certain concepts, systems, and methods of a decentralized ad hoc network-based deployment embodiment of the present invention comprise internally controlling, enhancing, and managing private equity fund management software by embedding some or all of the present invention into the source code of the fund management software, using a decentralized ad hoc network-based computing system. The system and method can comprise: providing primary components including fund management software control, venture control, new fund modeling, system control, investor control, and parallel engine control; receiving both managed investor and venture data from private equity funds and unmanaged investor and venture data from investor and venture screens; simulating cash flow and venture asset value changes and, using a set of acceptance criteria, automatically selecting and pooling those assets, using parallel technology as needed; modeling the pooled asset data using market conditions and a proposed fund structure to generate a new structured fund comprised of the principal invested in the portfolio, prioritized unit types, and any bond or derivative data, using parallel technology as needed; associating principal invested in the portfolio unit assets with prioritized units that are associated with investor categories, each with its own investment expectations; and managing cash flow and asset sale proceed payments to investor categories and general partners, capital call commitments, and bond and derivative payments, as determined.

Any combination of the above concepts or teachings can be jointly combined or formed to a new embodiment. The disclosed details and embodiments can be used to solve at least (but not limited to) the issues mentioned above and herein.

Further, any of the following concepts or teachings can be employed or combined, all or in part, with any or all of the above-described systems, methods, and/or embodiments.

In various embodiments, a method comprises further identifying a private equity fund structure with two (or more) prioritized units, A and B, wherein A-unit holders receive all cash flow and asset sale proceeds until the A-unit preference is met then B-unit holders receive the remainder.

In various embodiments, A-unit holders receive all cash flow until its preference is met for each pay period and the asset sale proceeds until the A-unit preference is met, and B-unit holders receive the remaining cash flow and asset sale proceeds, including appreciation.

In various embodiments, a method comprises further enhancing a conventional private equity fund structure by using a bond to purchase PIP assets instead of the direct purchase of PIP assets by limited partners, a reduced outlay investing method, effectively increasing the return on investment.

In various embodiments, a method comprises further enhancing a conventional private equity fund structure by using the expected percentage of cash flow to investors for a derivative, the sale of which increases the rate of return to those investors, an increased rate of return investment method.

In various embodiments, the expected percentage of cash flow to the general partners is used for a derivative, the sale of which increases the rate of return to the general partners.

In various embodiments, the expected percentage of cash flow to the limited partners is used for a derivative, the sale of which increases the rate of return to the limited partners.

In various embodiments, the expected percentage of cash flow to both the general and limited partners is used for a derivative, the sale of which increases the rate of return to both the general and limited partners.

In various embodiments, a method comprises further enhancing a conventional private equity fund structure by using both the bond purchase of PIP assets and the expected percentage of cash flow to investors for a derivative, reducing outlay by limited partners and increasing the rate of return for investors.

In various embodiments, the expected percentage of cash flow to the general partners is used for a derivative, increasing the rate of return for general partners.

In various embodiments, the expected percentage of cash flow to the limited partners for a derivative, increasing rate of return for limited partners.

In various embodiments, the expected percentage of cash flow to both the general and limited partners is used for a derivative, increasing the rate of return for both the general and limited partners.

In various embodiments, a method comprises further identifying a structured private equity fund structure with two (or more) prioritized units, A and B, wherein A-unit holders receive all cash flow and asset sale proceeds until the A-unit preference is met then B-unit holders receive any remainder, enhanced by using the bond purchase of PIP assets.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a structured private equity fund structure with two (or more) prioritized units, A and B, wherein B-unit holders receive all cash flow and asset sale proceeds until the B-unit preference is met then A-unit holders receive any remainder, enhanced by using the bond purchase of PIP assets.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a private equity fund structure with two (or more) prioritized units, A and B, with an A-unit cash flow and asset sale preference, enhanced by using the expected percentage of cash flow to investors for a derivative, the sale of which increases the rate of return to those investors.

In various embodiments, the expected percentage of cash flow to the general partners is used for a derivative, the sale of which increases the rate of return to the general partners.

In various embodiments, the expected percentage of cash flow to the limited partners is used for a derivative, the sale of which increases the rate of return to the limited partners.

In various embodiments, the expected percentage of cash flow to both the general and limited partners is used for a derivative, the sale of which increases the rate of return to both the general and limited partners.

In various embodiments, a method comprises further identifying a private equity fund structure with two (or more) prioritized units, A and B, wherein A-unit holders receive all cash flow and asset sale proceeds until the A-unit preference is met, enhanced by using both the bond purchase of PIP assets and the expected percentage of cash flow to investors for a derivative, the sale of which increases the rate of return to those investors.

In various embodiments, the expected percentage of cash flow to the general partners is used for a derivative, the sale of which increases the rate of return to the general partners.

In various embodiments, the expected percentage of cash flow to the limited partners is used for a derivative, the sale of which increases the rate of return to the limited partners.

In various embodiments, the expected percentage of cash flow to both the general and limited partners is used for a derivative, the sale of which increases the rate of return to the both the general and limited partners.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a private equity fund structure with two (or more) prioritized units, A and B, with a B-unit cash flow and asset sale preference, enhanced by using the expected percentage of cash flow to investors for a derivative, the sale of which increases the rate of return to those investors.

In various embodiments, the expected percentage of cash flow to the general partners is used for a derivative, the sale of which increases the rate of return to the general partners.

In various embodiments, the expected percentage of cash flow to the limited partners is used for a derivative, the sale of which increases the rate of return to the limited partners.

In various embodiments, the expected percentage of cash flow to both the general and limited partners is used for a derivative, the sale of which increases the rate of return to both the general and limited partners.

In various embodiments, a method comprises further identifying a private equity fund structure with two (or more) prioritized units, A and B, wherein B-unit holders receive all cash flow and asset sale proceeds until the B-unit preference is met, enhanced by using both the bond purchase of PIP assets and the expected percentage of cash flow to investors for a derivative.

In various embodiments, the expected percentage of cash flow to the general partners is used for a derivative, the sale of which increases the rate of return to the general partners.

In various embodiments, the expected percentage of cash flow to the limited partners is used for a derivative, the sale of which increases the rate of return to the limited partners.

In various embodiments, the expected percentage of cash flow to both the general and limited partners is used for a derivative, the sale of which increases the rate of return to both the general and limited partners.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a private equity fund structure with two (or more) prioritized units, A and B, with an A-unit cash flow and asset sale preference, enhanced by using the difference between A-unit preference and the received A-unit percentage of PIP cash flows for a derivative, the sale of which increases the rate of return to the general partners.

In various embodiments, a method comprises further identifying a structured private equity fund structure with two (or more) prioritized units, A and B, wherein A-unit holders receive all cash flow and asset sale proceeds until the A-unit preference is met, enhanced by using both the bond purchase of PIP assets and a derivative created using the difference between A-unit preference and the received A-unit percentage of PIP cash flows.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a private equity fund structure with two (or more) prioritized units, A and B, with a B-unit cash flow and asset sale preference, enhanced by using the difference between B-unit preference and the received B-unit percentage of PIP cash flows for a derivative, the sale of which increases the rate of return to the general partners.

In various embodiments, a method comprises further identifying a structured private equity fund structure with two (or more) prioritized units, A and B, wherein B-unit holders receive all cash flow and asset sale proceeds until the B-unit preference is met, enhanced by using both the bond purchase of PIP assets and a derivative created using the difference between B-unit preference and the received B-unit percentage of PIP cash flows.

In various embodiments, A- and B-unit holders have committed to receive capital calls simultaneously.

In various embodiments, A-unit holders have committed to receiving capital calls first, and B-unit holders have committed to receiving calls if bond obligations are unmet by A-unit holders.

In various embodiments, B-unit holders have committed to receiving capital calls first, and A-unit holders have committed to receiving calls if bond obligations are unmet by B-unit holders.

In various embodiments, a method comprises further identifying a private equity fund structure with multiple prioritized units, A, B, C and D wherein the cash flows from one or more prioritized units of one or more rRAVs are automatically merged into a new rRAV.

In various embodiments, a method comprises further identifying a private equity fund structure with multiple prioritized units, A, B, C and D, wherein an investor directs the cash flows of one or more prioritized units in one or more rRAVs to a new, investor-controlled rRAV.

In various embodiments, the investor-controlled rRAV is used for a derivative to increase the rate of return.

While various embodiments have been described above, it should be understood that they have been presented by way of example only, and not limitation. Thus, the breadth and scope of the present disclosure should not be limited by any on the above-described embodiments or examples. Moreover, any combination of the above-described elements in all possible variations thereof is encompassed by the disclosure unless otherwise indicated herein or otherwise clearly contradicted by context.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While the present invention has been described in connection with various aspects and examples, it will be understood that the present invention is capable of further modifications. This application is intended to cover any variations, uses or adaptation of the invention following, in general, the principles of the invention, and including such departures from the present disclosure as come within the known and customary practice within the art to which the invention pertains.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A method of software enhancement and management, comprising:
   inputting one or more data transformation algorithms, wherein the one or more data transformation algorithms do not include software application source code;
   simulating behavior of the one or more data transformation algorithms to determine which of the one or more data transformation algorithms to decompose, and decomposing the one or more data transformation algorithms into sets of time-affecting linear pathways (TALPs), wherein each TALP is associated with input variable attribute value ranges and timings;
   selecting one or more TALPS based on acceptance criteria including input and output value ranges and timings;
   constructing a time complexity estimation polynomial and a space complexity estimation polynomial for each of the selected one or more TALPs decomposed from the one or more data transformation algorithms by executing each of the one or more selected TALPS using each value in a set of initial input control values from the one or more TALP-associated input variable attribute value ranges, such that a specific time complexity estimation polynomial and a specific space complexity estimation polynomial are associated with each of the selected one or more TALPs and stored in a TALP pool;
   modeling outcomes with actual expected input data values using the specific time complexity estimation polynomial and the specific space complexity estimation polynomial from the TALP pool associated with for tach of the selected one or more TALPs; and
   defining TALP groupings for solution sets including optimized and discretized modeled outcomes.

2. The method of claim 1, wherein the one or more data transformation algorithms do not include software enhancements.

3. The method of claim 1, further including parallelizing each of the selected one or more TALPs using time complexity.

4. The method of claim 1, further including interfacing a fund management software control component with the one or more data transformation algorithms.

5. The method of claim 4, wherein the one or more data transformation algorithms include fund management algorithms.

6. The method of claim 1, further including generating a time complexity estimation polynomial that approximates a time complexity function and generating a space complexity estimation polynomial that approximates a space complexity function for each of the selected one or more TALPs.

7. The method of claim 1, further including generating an advanced speedup polynomial from the time complexity estimation polynomial for each of the selected one or more TALPs.

8. The method of claim 1, further including creating merged TALPs.

9. A software enhancement and management system, comprising:
   a memory;
   a processor operatively coupled with the memory, wherein the processor is configured to execute program code to:
      input one or more data transformation algorithms, wherein the one or more data transformation algorithms do not include software application source code;
      simulate behavior of the one or more data transformation algorithms to determine which of the one or more data transformation algorithms to decompose, and decompose the one or more data transformation algorithms into sets of time-affecting linear pathways (TALPs), wherein each TALP is associated with input variable attribute value ranges and timings;
      select one or more TALPS based on acceptance criteria including input and output value ranges and timings;
      construct a time complexity estimation polynomial and a space complexity estimation polynomial for each of the selected one or more TALPs decomposed from the one or more data transformation algorithms by executing each of the one or more selected TALPs using each value in a set of initial input control values from the one or more TALP-associated input variable attribute value ranges, such that a specific time complexity estimation polynomial and a specific space complexity estimation polynomial are associated with each of the selected one or more TALPs and stored in a TALP pool;

model outcomes with actual expected input data values using the specific time complexity estimation polynomial and the specific space complexity estimation polynomial from the TALP pool associated with the selected one or more TALPs; and define TALP groupings for solution sets including optimized and discretized modeled outcomes.

10. The system of claim 9, wherein the processor is further configured to execute program code to parallelize each of the selected one or more TALPs using time complexity.

11. The system of claim 9, wherein the processor is further configured to execute program code to interface a fund management software control component with the one or more data transformation algorithms.

12. The system of claim 11, wherein the one or more data transformation algorithms include fund management algorithms.

13. The system of claim 9, wherein the processor is further configured to execute program code to generate a time complexity estimation polynomial that approximates a time complexity function and generate a space complexity estimation polynomial that approximates a space complexity function for the selected one or more TALPs.

14. A method of software enhancement and management, comprising:
receiving one or more data transformation algorithms and simulating behavior of the one or more data transformation algorithms to determine decomposition of the one or more data transformation algorithms, wherein the one or more data transformation algorithms do not include software application source code;
decomposing the one or more data transformation algorithms into a plurality of time-affecting linear pathways (TALPs);
determining if one or more of the plurality of TALPs meet an acceptance criteria with certain input and output values and timings;
gathering the determined one or more of the plurality of TALPs for processing;
generating time complexity estimation polynomials and space complexity estimation polynomials for the plurality of TALPs decomposed from the one or more transformation algorithms by executing the plurality of TALPs using each value in a set of initial input control values from associated input variable attribute value ranges, such that each of the plurality of TALPs with a specific associated time complexity estimation polynomial and a specific space complexity estimation polynomial are stored in a TALP pool; and
spreading one or more input data variable values over stored TALPs from the TALP pool to discretize and optimize outputs to reach a predetermined goal.

15. The method of claim 14, wherein the predetermined goal is timing variable values.

16. The method of claim 14, wherein the predetermined goal is output variable values.

17. The method of claim 14, wherein the predetermined goal is a combination of timing and output variable values.

18. The method of claim 14, further including parallelizing each of the determined one or more TALPS of the plurality of TALPs using time complexity estimation polynomials.

19. The method of claim 18, wherein the parallelizing is performed by a software parallel engine component.

20. The system of claim 9, wherein the processor is further configured to execute program code to generate an advanced speedup polynomial from the time complexity estimation polynomial for each of the selected one or more TALPs.engine component.

* * * * *

UNITED STATES PATENT AND TRADEMARK OFFICE
CERTIFICATE OF CORRECTION

| | |
|---|---|
| PATENT NO. | : 11,687,328 B2 |
| APPLICATION NO. | : 17/887402 |
| DATED | : June 27, 2023 |
| INVENTOR(S) | : Scott Andrew Smith et al. |

It is certified that error appears in the above-identified patent and that said Letters Patent is hereby corrected as shown below:

In the Claims

Claim 1: Delete:
"1. A method of software enhancement and management, comprising:
 inputting one or more data transformation algorithms,
  wherein the one or more data transformation algorithms do not include software application source code;
 simulating behavior of the one or more data transformation algorithms to determine which of the one or more data transformation algorithms to decompose, and decomposing the one or more data transformation algorithms into sets of time-affecting linear pathways (TALPs), wherein each TALP is associated with input variable attribute value ranges and timings;
 selecting one or more TALPS based on acceptance criteria including input and output value ranges and timings;
 constructing a time complexity estimation polynomial and a space complexity estimation polynomial for each of the selected one or more TALPs decomposed from the one or more data transformation algorithms by executing each of the one or more selected TALPs using each value in a set of initial input control values from the one or more TALP-associated input variable attribute value ranges, such that a specific time complexity estimation polynomial and a specific space complexity estimation polynomial are associated with each of the selected one or more TALPs and stored in a TALP pool;

Signed and Sealed this
First Day of October, 2024

Katherine Kelly Vidal
*Director of the United States Patent and Trademark Office*

CERTIFICATE OF CORRECTION (continued)
U.S. Pat. No. 11,687,328 B2 modeling outcomes with actual expected input data values
        using the specific time complexity estimation polynomial and the specific space complexity estimation polunomial from the TALP pool associated with for tach of the selected one or more TALPs; and
    defining TALP groupings for solution sets including optimized and discretized modeled outcomes."

And replace with:
-- 1. A method of software enhancement and management, comprising:
    inputting one or more data transformation algorithms,
        wherein the one or more data transformation algorithms do not include software application source code;
    simulating behavior of the one or more data transformation algorithms to determine which of the one or more data transformation algorithms to decompose, and decomposing the one or more data transformation algorithms into sets of time-affecting linear pathways (TALPs), wherein each TALP is associated with input variable attribute value ranges and timings;
    selecting one or more TALPS based on acceptance criteria including input and output value ranges and timings; constructing a time complexity estimation polynomial and a space complexity estimation polynomial for each of the selected one or more TALPs decomposed from the one or more data transformation algorithms by executing each of the one or more selected TALPs using each value in a set of initial input control values from the one or more TALP-associated input variable attribute value ranges, such that a specific time complexity estimation polynomial and a specific space complexity estimation polynomial are associated with each of the selected one or more TALPs and stored in a TALP pool;
    modeling outcomes with actual expected input data values using the specific time complexity estimation polynomial and the specific space complexity estimation polynomial from the TALP pool associated with the selected one or more TALPs; and
    defining TALP groupings for solution sets including optimized and discretized modeled outcomes. --

Claim 20: Delete:
"20. The system of claim 9, wherein the processor is further configured to execute program code to generate an

CERTIFICATE OF CORRECTION (continued)
U.S. Pat. No. 11,687,328 B2 advanced speedup polynomial from the time complexity estimation polynomial for each of the selected one or more TALPs.engine component."

And replace with:
-- 20. The system of claim 9, wherein the processor is further configured to execute program code to generate an advanced speedup polynomial from the time complexity estimation polynomial for each of the selected one or more TALPs. --